US012798857B2

(12) United States Patent
Hayashi

(10) Patent No.: US 12,798,857 B2
(45) Date of Patent: Nov. 17, 2026

(54) LID, CONTAINER WITH LID, AND COMBINATION OF LID AND CONTAINER

(71) Applicant: KY7 Inc., Tokyo (JP)

(72) Inventor: Hiroyoshi Hayashi, Tokyo (JP)

(73) Assignee: KY7 INC., Tokyo (JP)

( * ) Notice: Subject to any disclaimer, the term of this patent is extended or adjusted under 35 U.S.C. 154(b) by 0 days.

(21) Appl. No.: 19/104,125

(22) PCT Filed: Aug. 15, 2023

(86) PCT No.: PCT/JP2023/029543
§ 371 (c)(1),
(2) Date: Feb. 14, 2025

(87) PCT Pub. No.: WO2024/038861
PCT Pub. Date: Feb. 22, 2024

(65) Prior Publication Data

US 2026/0054905 A1 Feb. 26, 2026

Related U.S. Application Data

(60) Provisional application No. 63/416,691, filed on Oct. 17, 2022, provisional application No. 63/398,133, filed on Aug. 15, 2022.

(30) Foreign Application Priority Data

Aug. 31, 2022 (JP) ................................ 2022-138805

(51) Int. Cl.
*B65D 77/20* (2006.01)
*B32B 3/26* (2006.01)
(Continued)

(52) U.S. Cl.
CPC .......... *B65D 77/2032* (2013.01); *B32B 3/266* (2013.01); *B32B 5/022* (2013.01);
(Continued)

(58) Field of Classification Search
CPC . B65D 3/22; B65D 3/12; B65D 51/18; B65D 65/38; B65D 65/40; B65D 77/2076;
(Continued)

(56) References Cited

U.S. PATENT DOCUMENTS 3,079,057 A * 2/1963 Colarusso .......... B65D 77/2024 229/5.83
3,151,800 A * 10/1964 Griese, Jr. .......... B65D 77/2056 220/657
(Continued)

FOREIGN PATENT DOCUMENTS

JP H04-102563 A 4/1992
JP 2010-235131 A 10/2010
(Continued)

OTHER PUBLICATIONS

Nov. 15, 2022 International Search Report issued in International Patent Application No. PCT/JP2022/033811.
(Continued)

*Primary Examiner* — Robert J Hicks
(74) *Attorney, Agent, or Firm* — Oliff PLC

(57) ABSTRACT

A lid, a container with a lid, and a combination of a lid and a container that can suppress the contents from protruding onto lid through a through portion and covers the opening of the container. The lid has a body formed to be joinable to a container having an opening and an edge forming the outer periphery of the opening, and has at least one water-repellent breathable sheet, wherein the body has a joining region corresponding part corresponding to the region joined to the container along the edge of the container, and a lid region corresponding part formed from the inside of the joining region corresponding part, the lid region corresponding part having a through portion, and at least a part of at least one
(Continued)

of the breathable sheets faces at least a part of the surface of the lid region corresponding part that opposes the container.

31 Claims, 47 Drawing Sheets

(51) Int. Cl.
*B32B 5/02* (2006.01)
*B65D 65/38* (2006.01)
*D04H 1/04* (2012.01)

(52) U.S. Cl.
CPC ......... *B65D 65/38* (2013.01); *B65D 77/2076* (2013.01); *D04H 1/04* (2013.01); *B32B 2255/02* (2013.01); *B32B 2262/062* (2013.01); *B32B 2307/724* (2013.01); *B32B 2307/73* (2013.01); *B32B 2435/02* (2013.01); *B65D 2565/382* (2013.01); *B65D 2565/388* (2013.01); *B65D 2577/2025* (2013.01); *B65D 2577/2091* (2013.01); *D10B 2401/021* (2013.01); *D10B 2505/10* (2013.01)

(58) Field of Classification Search
CPC ........... B65D 77/2072; B65D 77/2032; B65D 77/2028; B65D 2251/0093; B65D 2565/382; B65D 2565/381; B65D 2565/388; B65D 2577/2025; B65D 2577/20; B65D 2577/2091; B65D 2577/2075; B65D 2577/205; B32B 3/266; B32B 3/26; B32B 5/022; B32B 5/02; B32B 2255/02; D10B 2401/021; D10B 2505/10
USPC ......... 220/254.3, 254.1, 257.1, 257.2, 256.1, 220/359.3, 359.2, 359.1; 229/404, 400
See application file for complete search history.

(56) References Cited

U.S. PATENT DOCUMENTS

| | | | | | |
|---|---|---|---|---|---|
| 4,976,367 | A * | 12/1990 | Hoefler | B65D 17/502 222/394 |
| 5,197,618 | A * | 3/1993 | Goth | B65D 51/20 229/123.1 |
| 2005/0247713 | A1* | 11/2005 | Niederer | B65D 77/2032 220/359.2 |
| 2015/0158643 | A1* | 6/2015 | Coker | B65D 53/08 220/359.2 |
| 2022/0330711 | A1* | 10/2022 | Cohen | A47G 9/0253 |

FOREIGN PATENT DOCUMENTS

| | | | |
|---|---|---|---|
| JP | 2011-084329 | A | 4/2011 |
| JP | 2014-084128 | A | 5/2014 |
| JP | 2016-204033 | A | 12/2016 |
| WO | 2020/166715 | A1 | 8/2020 |

OTHER PUBLICATIONS

Nov. 15, 2022 Written Opinion issued in International Patent Application No. PCT/JP2022/033811.
Oct. 31, 2023 International Search Report issued in International Patent Application No. PCT/JP2023/029543.
Oct. 31, 2023 Written Opinion issued in International Patent Application No. PCT/JP2023/029543.
Sep. 29, 2022 Office Action issued in Japanese Patent Application No. 2022-141788.
Apr. 10, 2023 Office Action issued in Japanese Patent Application No. 2022-141788.
Aug. 14, 2023 Decision to Grant a Patent issued in Japanese Patent Application No. 2022-141788.
Jun. 11, 2024 Office Action issued in Taiwanese Patent Application No. 112130691.

* cited by examiner

A

B

A

B

A

B

A

B

A

B

LID, CONTAINER WITH LID, AND COMBINATION OF LID AND CONTAINER

TECHNICAL FIELD

The present invention relates to a lid, a container with a lid, and a combination of a lid and a container.

BACKGROUND ART

It is widely practiced to provide a container with an opening at the top, containing food and beverages (hereinafter referred to as 'contents'), in a closed state by attaching a lid.

As a method of attaching a lid to a container, a method (sealing method) is known in which the lid is joined to the edge forming the outer periphery of the opening at the top end of the container using methods such as heat pressing. As a structure for consuming contents from a container with a lid, as shown in Patent Document 1, there are structures where the lid is peeled off (removed) from the edge of the container, or where a through-hole is provided in the lid, allowing a member (such as a straw) to be inserted to extract the contents (making it a part of the insertion port).

When the lid has a top surface, a bend, and a side wall, a method of attaching the lid to the container is known as the fitting method, where structural parts such as the combination of the bend, top surface, and side wall are fitted to the edge of the container, forming a state where the lid is in contact with the edge forming the outer periphery of the opening at the top end of the container. As a method of forming such a lid, a method is known where a blank material for forming the lid is shaped. Even when the lid is configured to be attached to the container by the fitting method, as mentioned above, a through-hole may be provided in the lid, allowing a member to be inserted to extract the contents.

CITATION LIST

Patent Literature

Patent Literature 1: JP 2014-84128 A

SUMMARY OF THE INVENTION

Technical Problem

There is room for improvement in suppressing the contents from jumping out onto the lid through the through-hole when the lid covers the opening of the container. Particularly, when the contents release steam or gas, such as hot beverages or cold carbonated drinks, there is a need for improvement in the lid to suppress the contents from being carried out through the through-hole along with the released steam or gas due to the increase in internal pressure of the container with the lid.

When the lid forms a top surface, a bend, and a side wall by shaping a blank material, there is a possibility of shape recovery due to the restoring force of the paper-based material after forming parts such as the side wall and bend. If shape recovery occurs at the bend, even if the lid is fitted to the container, the contact between the lid and the container may loosen, creating gaps, and the contents adhering to the opposite surface of the lid may move outward along the opposite surface, causing the container's contents to leak through the gaps.

Additionally, as a lid attached to the container, it is required to use those made of paper-based materials from the perspective of reducing environmental impact. When the lid is made of paper-based material, it is difficult for the lid to have cushioning or elasticity. Therefore, when the lid is made of paper-based material, dimensional errors in the lid may particularly increase the risk of content leakage from the through-hole or from the gap between the lid and the container, as mentioned above.

The present invention has been made in view of such problems, and aims to provide a lid, a container with a lid, a combination of a lid and a container, and a method of manufacturing the lid, capable of suppressing the risk of content leakage from the through-hole.

Another object of the present invention is to provide a lid, a container with a lid, a combination of a lid and a container, and a method of manufacturing the lid, capable of suppressing content leakage from the gap between the lid and the container, even when the lid has a top surface, a bend, and a side wall.

Solution to Problem

The present invention is summarized in the following inventions (1) to (31).

(1) A lid comprising a body formed to be in contact with a container having an opening and an edge that forms an outer periphery of the opening, at least one breathable sheet with water repellency, wherein the body has a contact region corresponding part corresponding to the region contacted by the container along the peripheral edge of the container, and a lid region corresponding part configured on an inner part surrounded by the contact region corresponding part, wherein the lid region corresponding part has a penetration part, and at least a part of at least one of the breathable sheets faces at least a part of the surface of the lid region corresponding part.

(2) The lid according to (1), wherein the breathable sheet is horizontally provided with respect to an opposite surface to the container in the lid region corresponding part.

(3) The lid according to (1), a surface roughness of the breathable sheet is a greater than that of at least a part of the lid region corresponding part.

(4) The lid according to (1), wherein there is a gap between the breathable sheet and the lid region corresponding part.

(5) The lid according to (1), wherein the breathable sheet is a nonwoven fabric sheet.

(6) The lid according to (5), wherein the fibers constituting the nonwoven fabric sheet have pulp fibers.

(7) The lid according to (1), wherein the breathable sheet is a fiber sheet treated with a water-repellent treatment.

(8) The lid according to (1), wherein multiple breathable sheets are provided, and multiple breathable sheets are laminated.

(9) The lid according to (1), wherein the breathable sheets are provided in a plurality, the plurality of breathable sheets have overlapping portions in the lid region corresponding part, and the plurality of breathable sheets are provided in positions offset from each other.

(10) The lid according to (1), wherein a notch portion is formed in the breathable sheet to overlap with at least a part of the position corresponding to the penetration part.

(11) The lid according to (10), wherein the notch portion is formed in a straight line.

(12) The lid according to (1), wherein the breathable sheet is provided to cover at least a part of the penetration part.

(13) The lid according to (1), wherein the breathable sheet is partially joined to the lid region corresponding part.

(14) The lid according to (1), wherein the breathable sheet further covers at least a part of the contact region corresponding part.

(15) The lid according to (1), wherein an insertion port is provided in the lid region corresponding part, the penetration part forms the insertion port.

(16) The lid according to (1), wherein multiple penetration parts are provided, an insertion port is provided in the lid region corresponding part, in the insertion port, a weakening part guiding the division position in the lid region corresponding part is formed, the weakening part has multiple penetration parts and at least one continuous part formed between at least two of the penetration parts.

(17) The lid according to (16), wherein the weakening part forms multiple penetration parts radially around the continuous part.

(18) The lid according to (1), wherein the penetration part is formed in a slit shape.

(19) The lid according to (1), wherein at least the lid region corresponding part and the contact region corresponding part are formed of paper-based material.

(20) The lid according to (1), wherein the joint between the breathable sheet and the lid region corresponding part is an ultrasonic welding part.

(21) The lid according to (1), wherein the breathable sheet is configured such that when stress is applied to peel the center of the breathable sheet from the lid region corresponding part, the rupture of the breathable sheet occurs before the destruction of the joint between the breathable sheet and the lid region corresponding part.

(22) The lid according to (1), wherein the breathable sheet faces the non-opposite surface of the container among the lid region corresponding parts.

(23) The lid according to (1), wherein the lid region corresponding part includes a base part with a small opening having a smaller opening area than the opening of the container, a small lid part for opening and closing the small opening, and a hinge part connecting the base part and the small lid part, the small lid part is configured to be rotatable with respect to the base part around the hinge part, the penetration part is formed at the boundary position between the outer peripheral edge of the small lid part and the opening edge of the small opening.

(24) The lid according to (23), wherein a knob part is provided on the upper surface side of the small lid part.

(25) The lid according to (1), wherein the breathable sheet has multiple fibers.

(26) The lid according to (1), wherein the breathable sheet is arranged so that it can flex in a direction away from the body from the outer peripheral edge of the breathable sheet towards the inside of the breathable sheet.

(27) A lid having a body formed to be contactable with a container having an opening and an edge forming the outer periphery of the opening, and having at least one water-repellent breathable sheet, wherein the body has a cover wall part covering the opening when the body is attached to the container and a side wall part surrounding the cover wall part, the cover wall part having a contact region corresponding part that contacts the edge of the container from above along the edge of the container, and a lid region corresponding part formed from the inside of the contact region corresponding part, the lid region corresponding part having a through portion, and at least a part of at least one of the breathable sheets faces at least a part of the surface of the lid region corresponding part.

(28) The lid according to (27), wherein when stress is applied to peel the center of the breathable sheet from the lid region corresponding part, it is configured such that the rupture of the breathable sheet occurs before the destruction of the joint between the breathable sheet and the lid region corresponding part.

(29) The lid according to (27), wherein the breathable sheet is further provided on the side wall part.

(30) A container with a lid, comprising:

the lid according to any one of (1) to (29), the container having the opening formed at the upper end, the lid is joined to the container.

(31) A combination of a lid and a container, comprising:

the lid according to any one of (1) to (29); and the container having the opening formed at the upper end.

Advantageous Effects of Invention

According to the present invention, a lid, a container with a lid, and a combination of a lid and a container are provided, which can suppress the contents from jumping out onto the lid through the penetration part when the lid has a penetration part and covers the opening of the container.

BRIEF DESCRIPTION OF DRAWINGS

FIG. 15 FIGS. 15A and 15B are bottom views each showing an example of a lid according to the first embodiment.

FIG. 17 FIG. 17A is a plan view showing an example of a lid according to the second embodiment. FIG. 17B is a bottom view showing an example of a lid according to the second embodiment. FIG. 17C is a cross-sectional view schematically showing the state of the M-M line longitudinal section of FIG. 17A.

Figure 34:
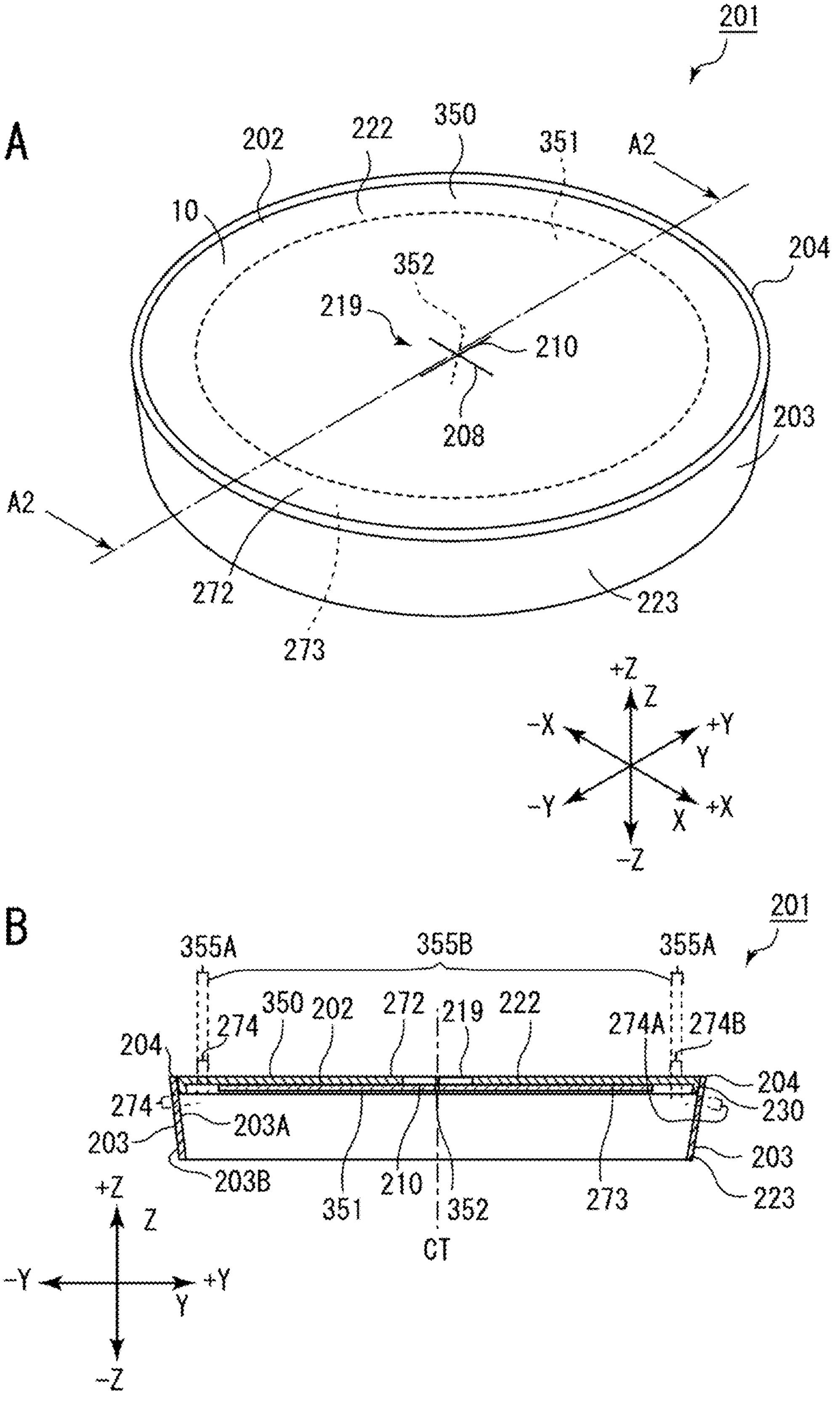
FIG. 34A is an external perspective view showing an example of a lid according to the seventh embodiment. FIG.

34B is a cross-sectional view schematically showing the A2-A2 line longitudinal section of FIG. 34A.

Figure 35:
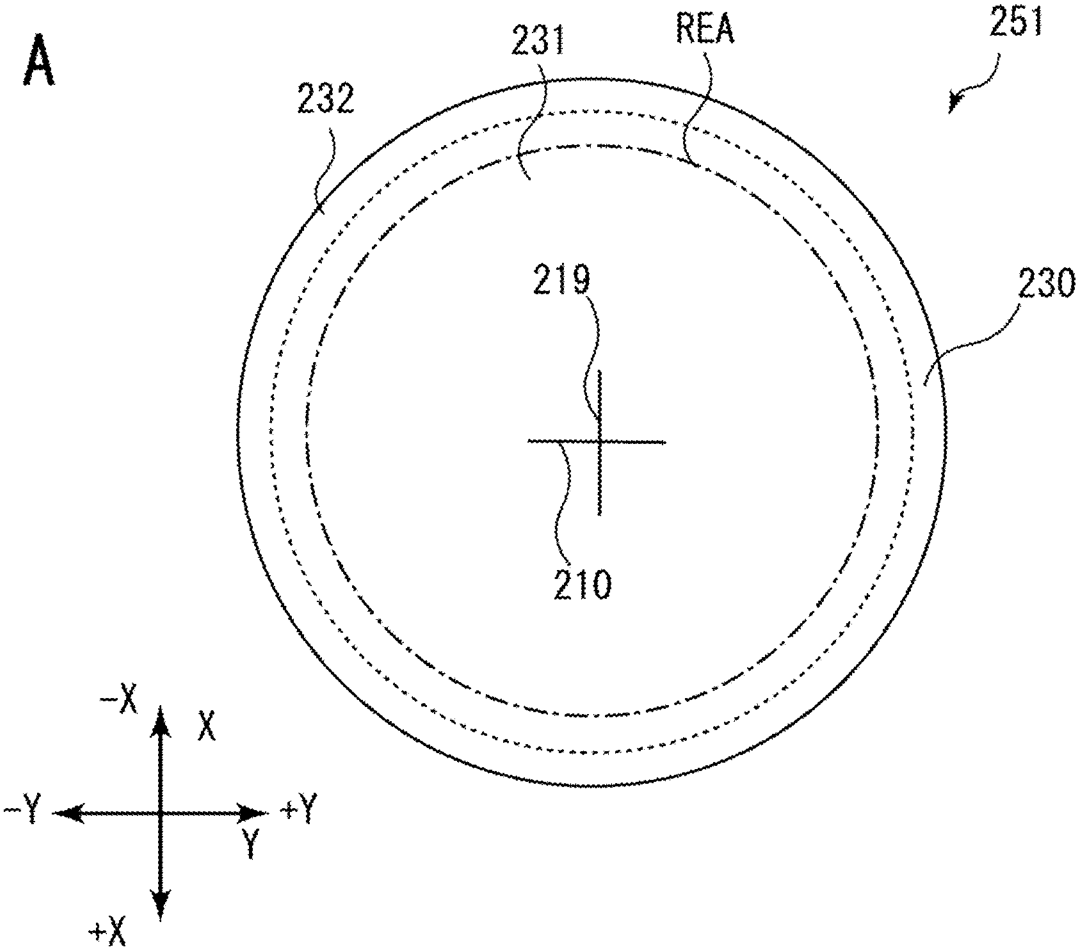
Figure 35:
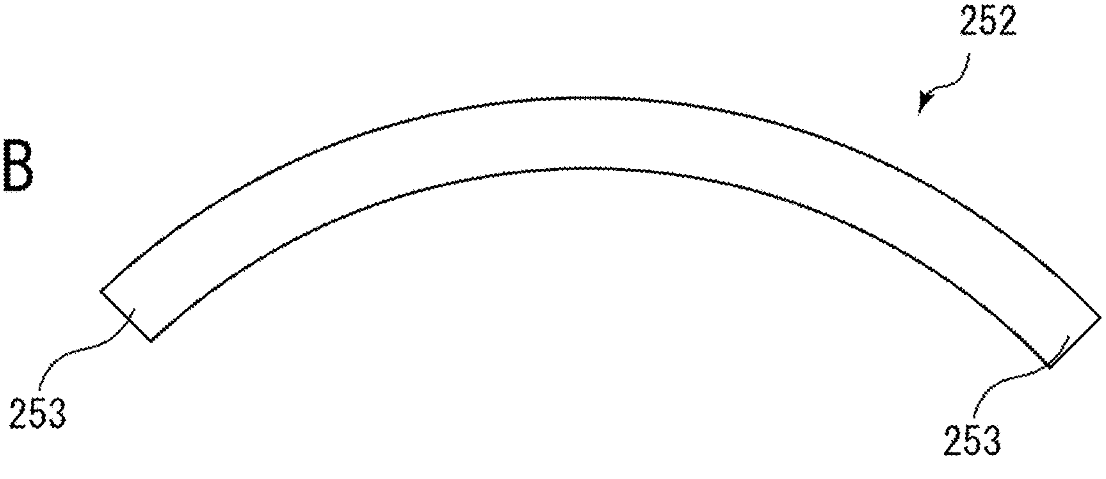

FIGS. 35A and 35B are plan views showing an example of a blank material of a lid according to the first modification of the seventh embodiment.

Figure 36:
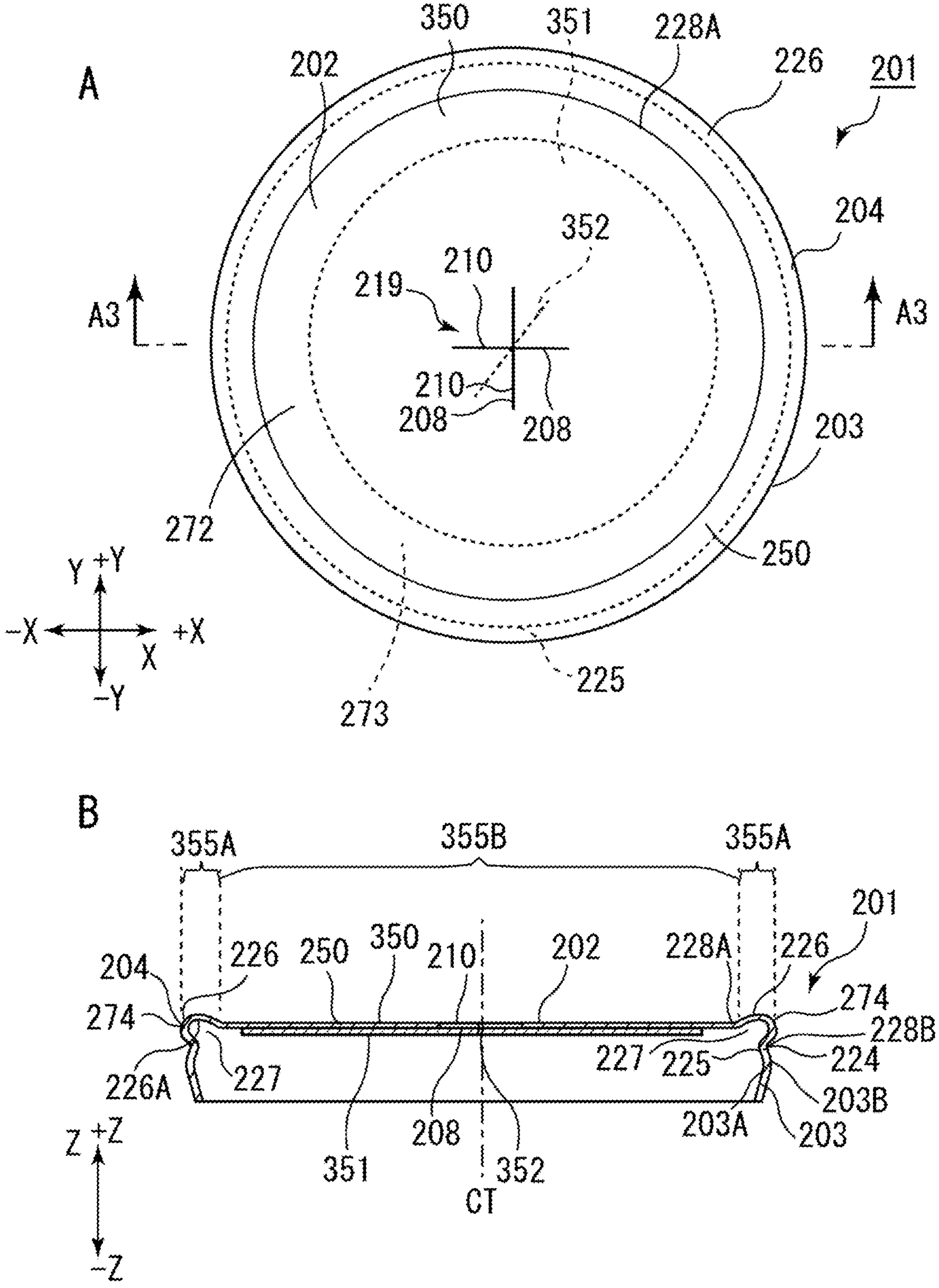

FIG. 36A is a plan view showing an example of a lid according to the fourth modification of the seventh embodiment. FIG. 36B is a cross-sectional view schematically showing the A3-A3 line longitudinal section of FIG. 36A.

Figure 37:
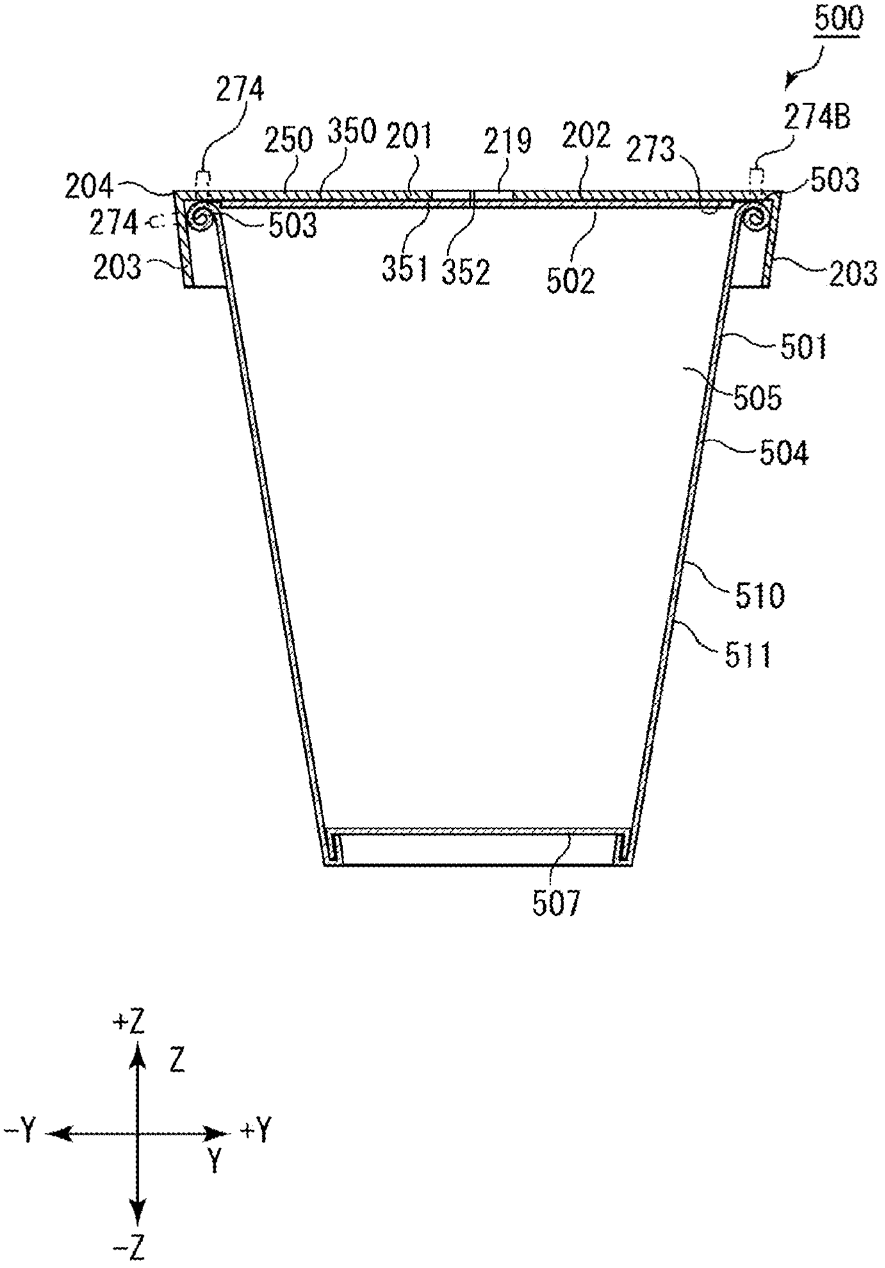

FIG. 37 is a cross-sectional view showing an example of a container with a lid.

Figure 38:
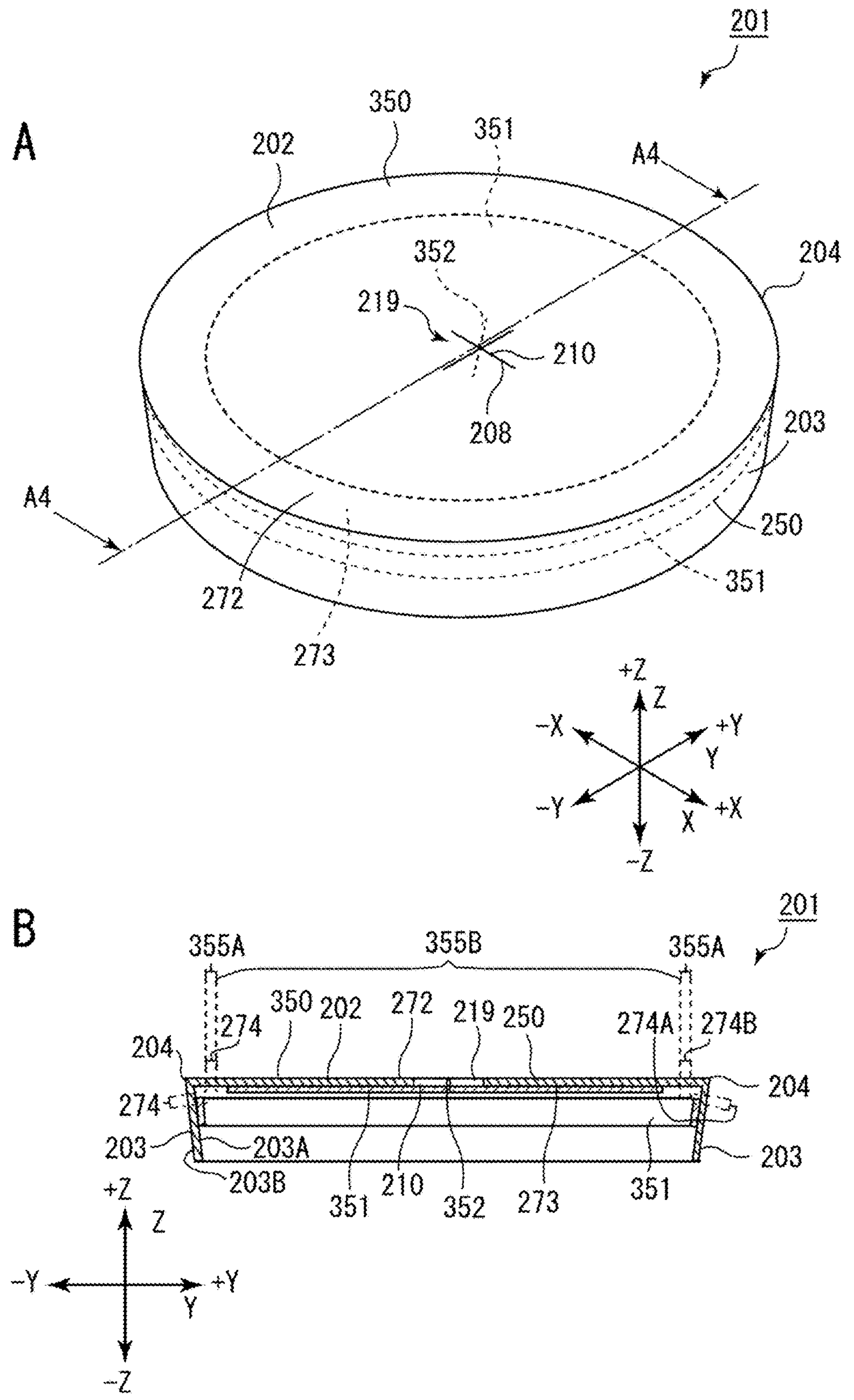

FIG. 38A is an external perspective view showing an example of a lid according to the fifth modification of the seventh embodiment. FIG. 38B is a cross-sectional view schematically showing the state of the A4-A4 line longitudinal section of FIG. 38A.

Figure 39:
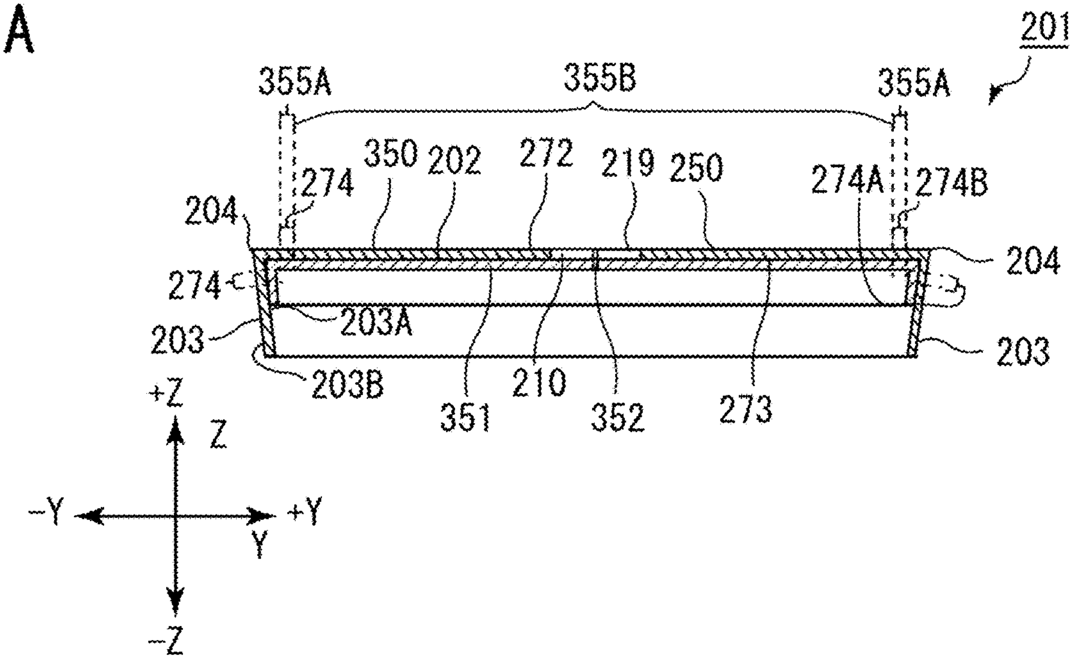
Figure 39:
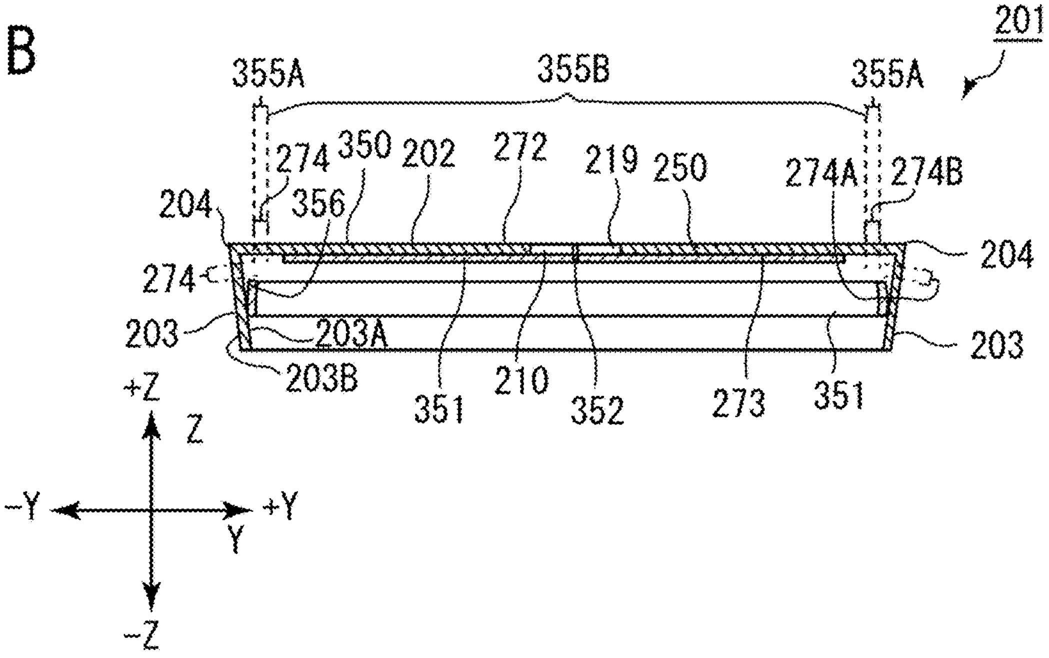

FIGS. 39A and 39B are cross-sectional views each schematically showing the state of an example of a lid according to the fifth modification of the seventh embodiment.

Figure 40:
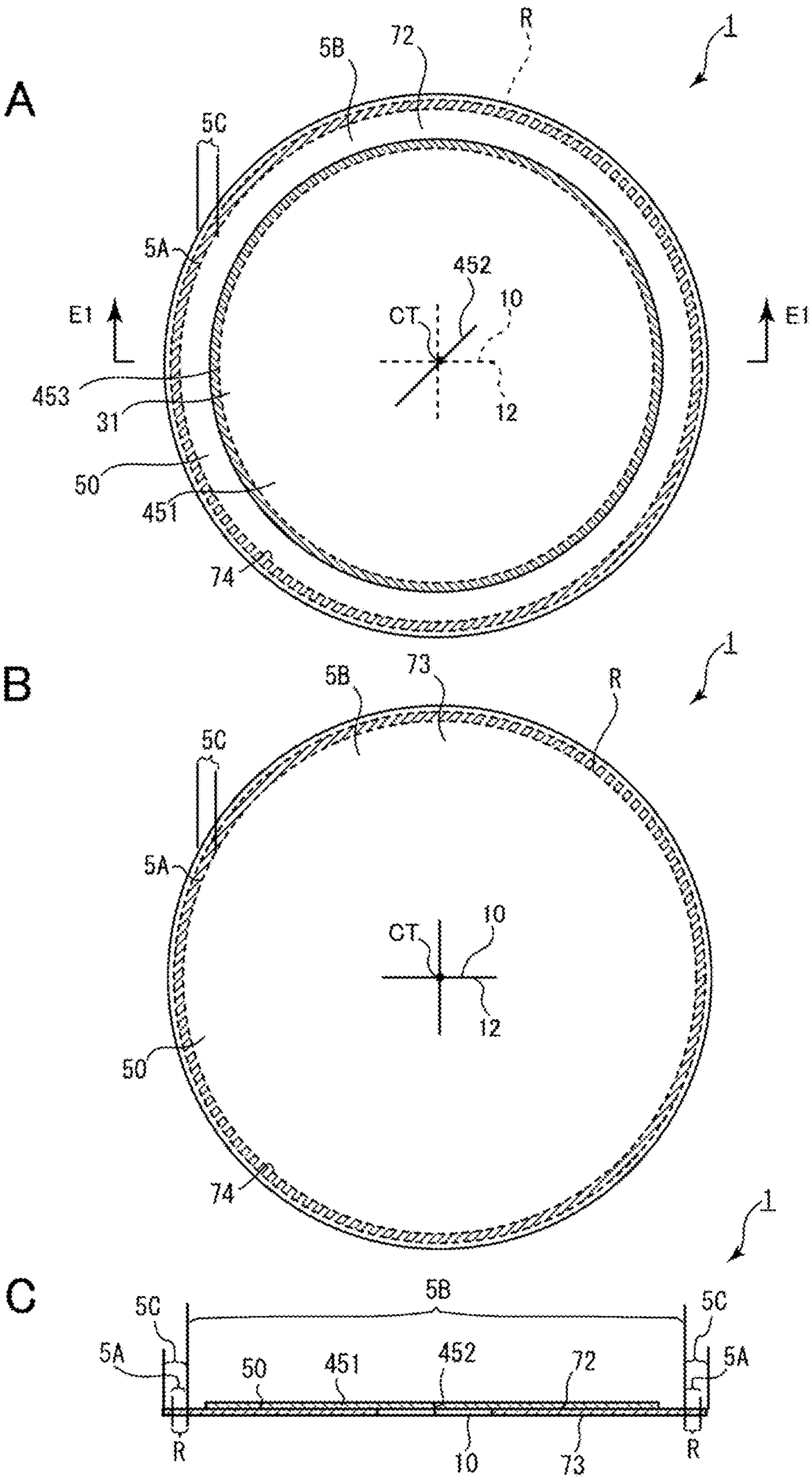

FIG. 40A is a plan view showing an example of a lid according to the tenth embodiment. FIG. 40B is a bottom view showing an example of a lid according to the tenth embodiment. FIG. 40C is a cross-sectional view schematically showing the state of the E1-E1 line longitudinal section of FIG. 40A.

Figure 41:
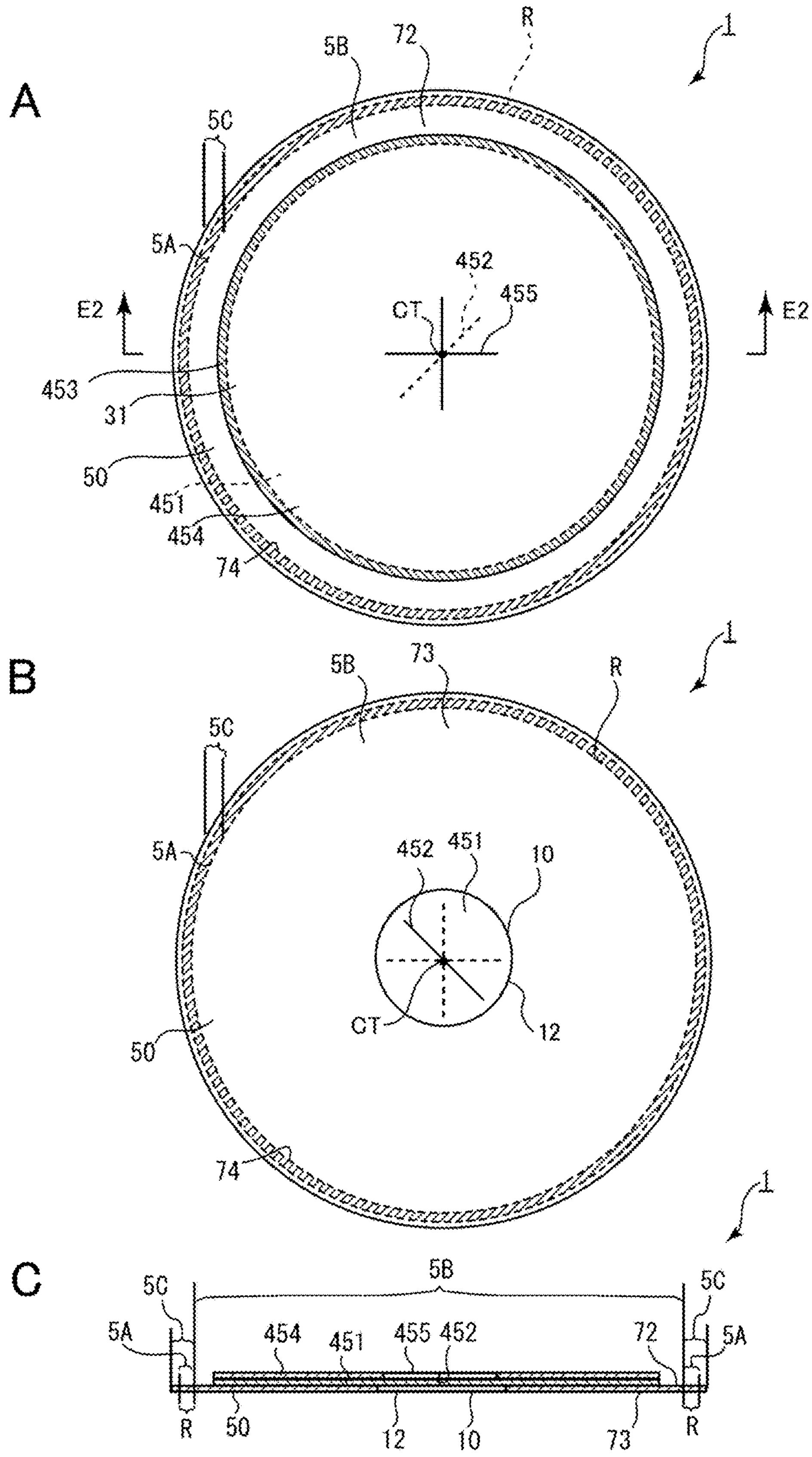

FIG. 41A is a plan view showing an example of a lid according to the tenth embodiment. FIG. 41B is a bottom view showing an example of a lid according to the tenth embodiment. FIG. 41C is a cross-sectional view showing the state of the E2-E2 line longitudinal section of FIG. 41A.

Figure 42:
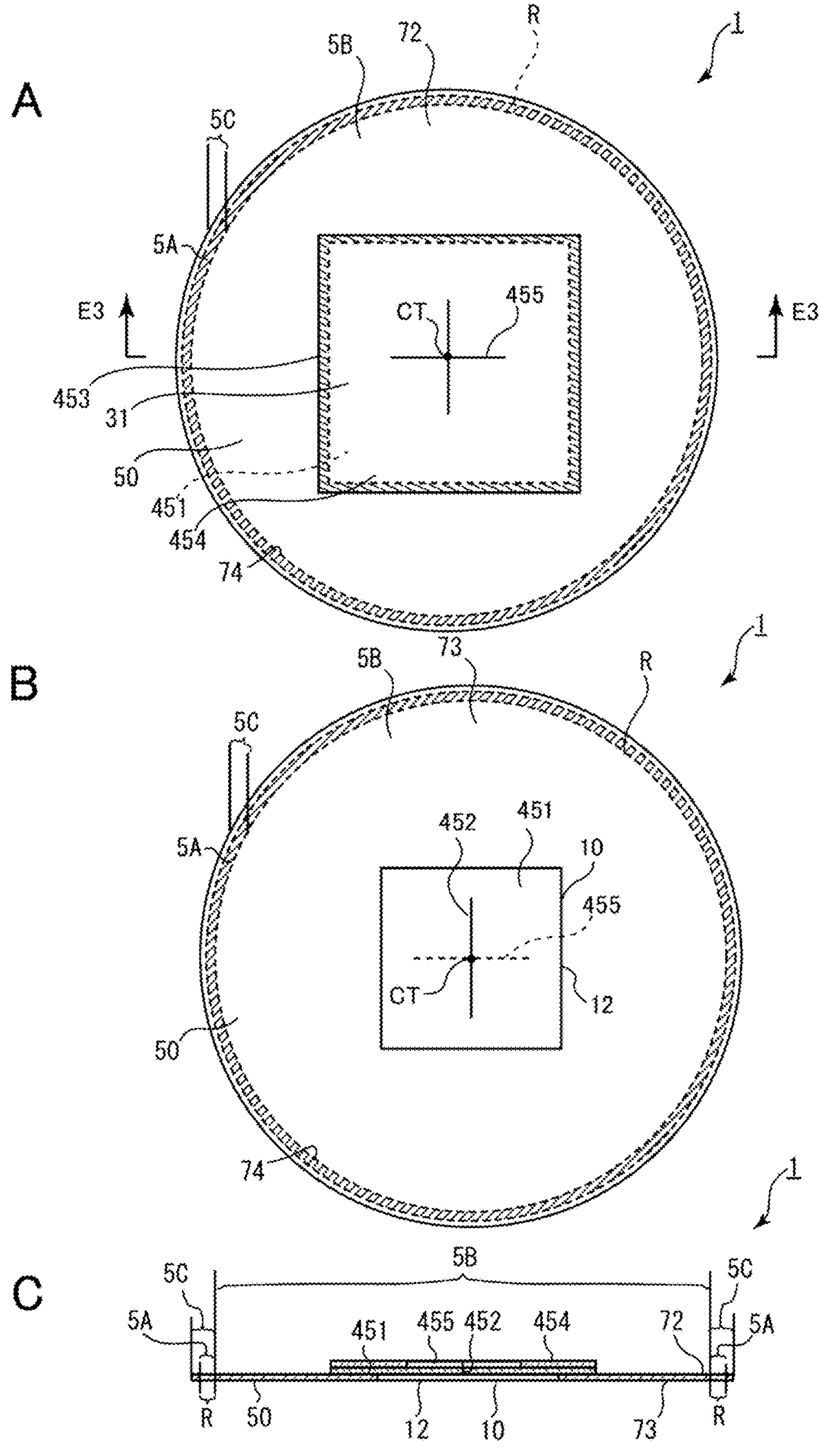

FIG. 42A is a plan view showing an example of a lid according to the tenth embodiment. FIG. 42B is a bottom view illustrating an example of a lid according to the tenth embodiment. FIG. 42C is a cross-sectional view schematically showing the state of the E3-E3 line longitudinal section of FIG. 42A.

Figure 43:
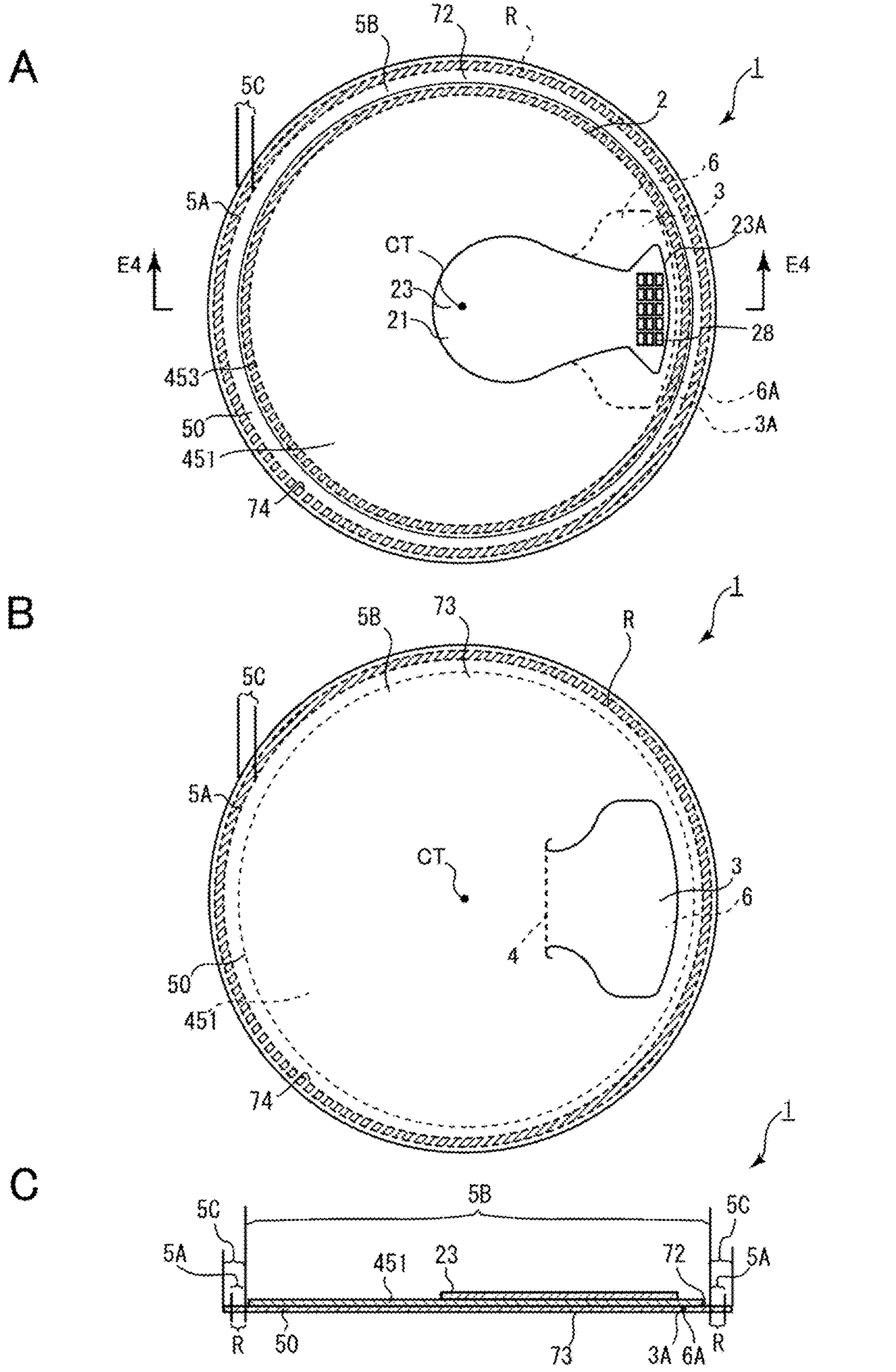

FIG. 43A is a plan view illustrating an example of a lid according to the tenth embodiment. FIG. 43B is a bottom view illustrating an example of a lid according to the tenth embodiment. FIG. 43C is a cross-sectional view schematically showing the state of the E4-E4 line longitudinal section of FIG. 43A.

Figure 44:
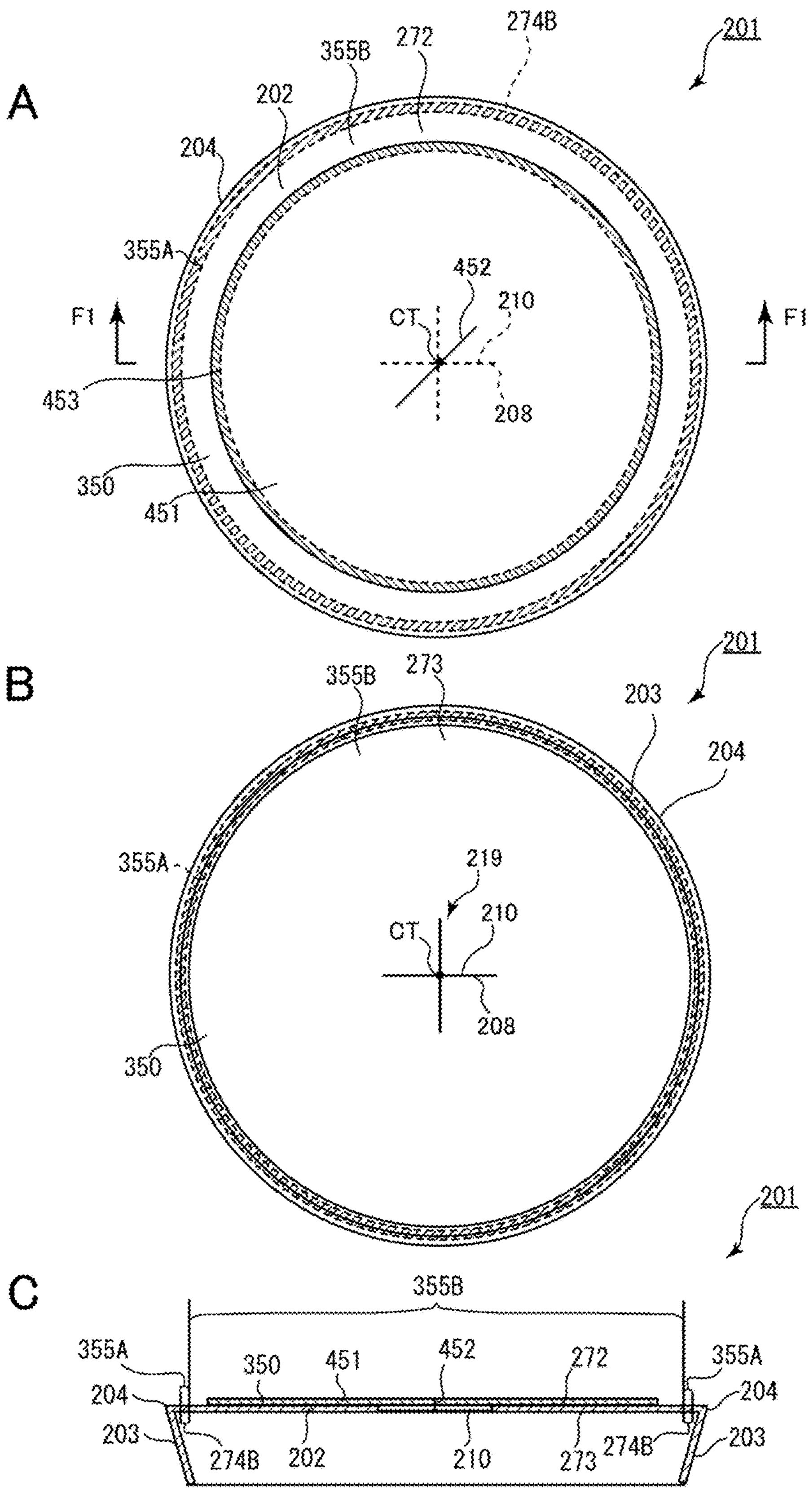

FIG. 44A is a plan view illustrating an example of a lid according to the eleventh embodiment. FIG. 44B is a bottom view illustrating an example of a lid according to the eleventh embodiment. FIG. 44C is a cross-sectional view schematically showing the state of the F1-F1 line longitudinal section of FIG. 44A.

Figure 45:
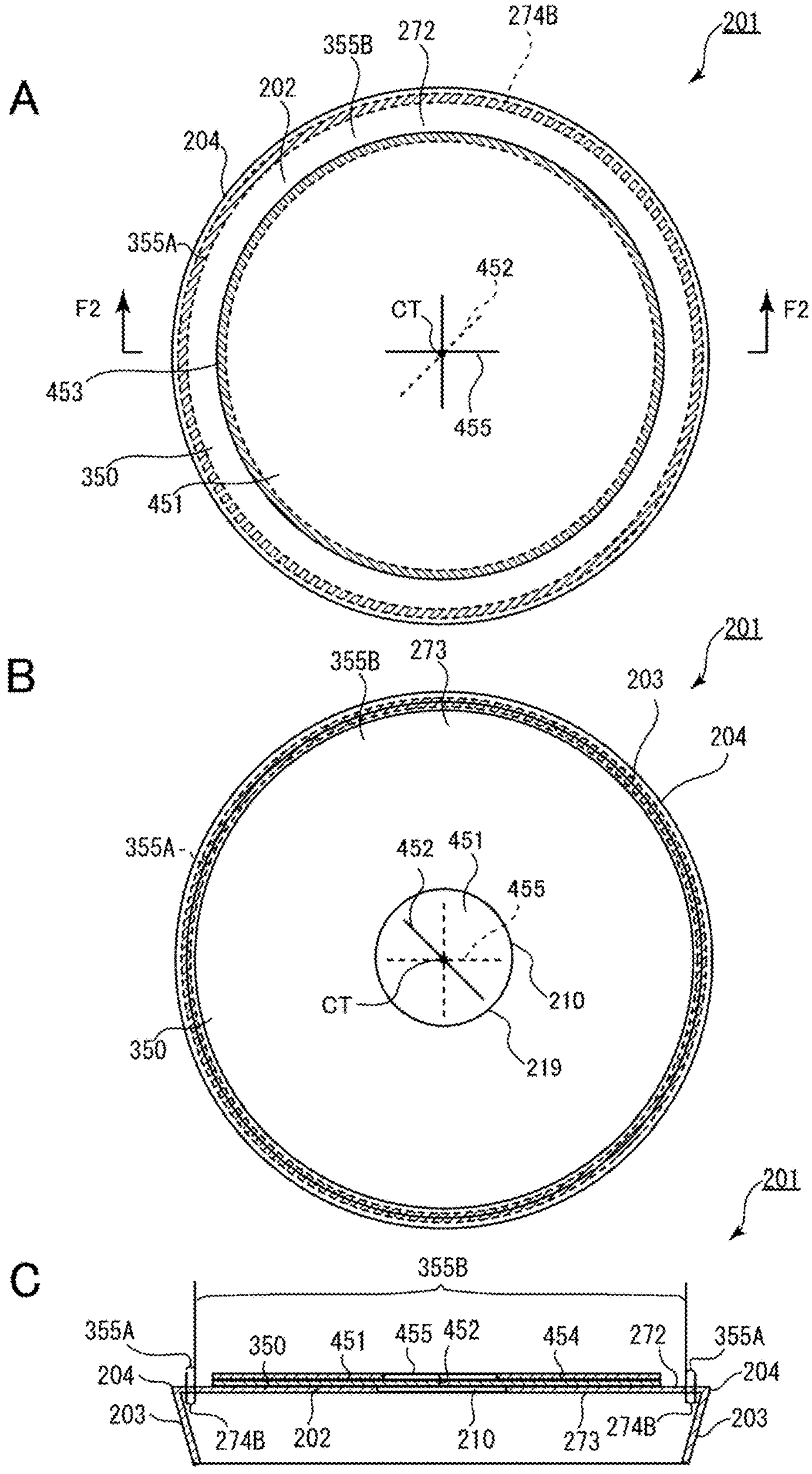

FIG. 45A is a plan view illustrating an example of a lid according to the eleventh embodiment. FIG. 45B is a bottom view illustrating an example of a lid according to the eleventh embodiment. FIG. 45C is a cross-sectional view schematically showing the state of the F2-F2 line longitudinal section of FIG. 45A.

Figure 46:
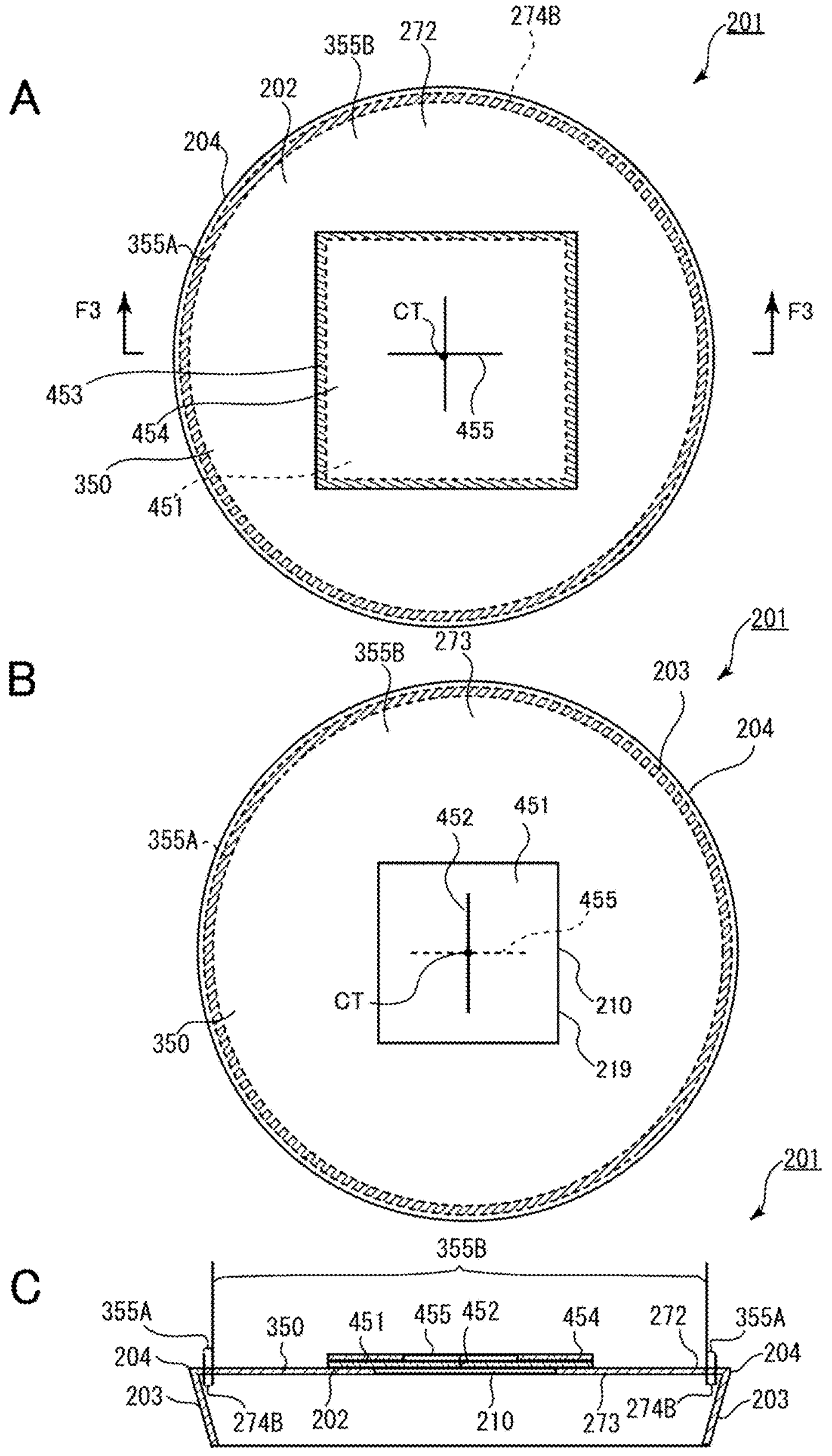

FIG. 46A is a plan view illustrating an example of a lid according to the eleventh embodiment. FIG. 46B is a bottom view illustrating an example of a lid according to the eleventh embodiment. FIG. 46C is a cross-sectional view schematically showing the state of the F3-F3 line longitudinal section of FIG. 46A.

Figure 47:
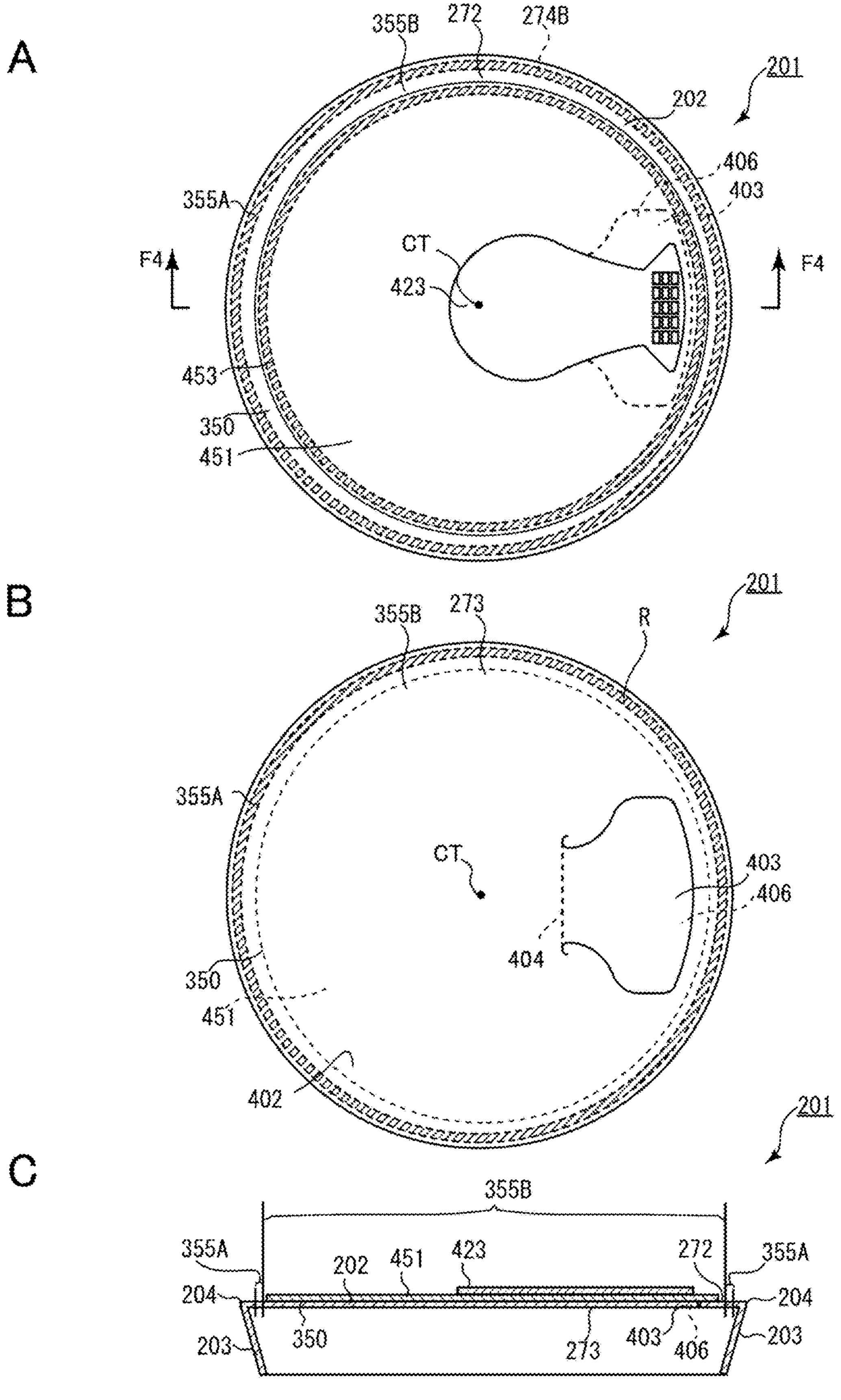

FIG. 47A is a plan view illustrating an example of a lid according to the eleventh embodiment. FIG. 47B is a bottom view illustrating an example of a lid according to the eleventh embodiment. FIG. 47C is a cross-sectional view schematically showing the state of the F4-F4 line longitudinal section of FIG. 47A.

DESCRIPTION OF EMBODIMENTS

Hereinafter, the lid according to the present invention will be described in detail with reference to the drawings. It should be noted that the lid according to the present invention is described using a lid for a container (cup) for various beverages such as coffee cups as an example, but it is not limited to lids for containers for beverages and can also be applied as a lid for containers that store food items other than beverages. Furthermore, the lid according to the present invention can be applied to containers that can store various items other than food and drink, such as liquid items like ink, and other items not mentioned above. Moreover, the lid according to the present invention is described below using examples where the shape is circular when viewed in plan, but the shape of the lid is not limited to circular when viewed in plan and can be applied to various shapes other than circular, such as elliptical, rectangular, triangular, polygonal, chamfered rectangular, chamfered polygonal, etc.

Hereinafter, the embodiments and application examples related to the present invention will be sequentially described with reference to the drawings in the order of the first embodiment, second embodiment, third embodiment, fourth embodiment, fifth embodiment, sixth embodiment, seventh embodiment, eighth embodiment, ninth embodiment, tenth embodiment, eleventh embodiment, and application examples. In this specification and drawings, components having substantially the same functional configuration are denoted by the same reference numerals, and redundant descriptions are omitted.

The following description is a preferred specific example of the present invention, and the content of the present invention is not limited to these embodiments and the like. In the following description, for the sake of convenience, directions such as front and back, left and right, up and down, and the direction of the horizontal plane are indicated, but the content of the present invention is not limited to these directions. The relative size ratios and the like shown in each of FIGS. 1 to 47 are described for convenience and do not limit the actual size ratios unless specifically stated otherwise.

1 FIRST EMBODIMENT

1-1. Structure

The lid 1 according to the first embodiment has a main body 50, and the main body 50 is formed so as to be able to cover the opening 102 of a container and join the container 101. The lid 1 is formed to be contactable with a container 101 having an opening 102 formed at the upper end and an edge 103 forming the outer periphery of the opening 102, as will be described later with reference to FIGS. 4A, 4B, etc. It should be noted that when it is said to be contactable, it includes cases where a joined state can be formed and cases where it can be contacted in a detachable state. Also, contact in the case of being contactable includes both direct contact and indirect contact via an adhesive or adhesive agent. Furthermore, joining in the case of being joinable refers to a state where the lid 1 is fixed to the container 101 in such a way that fusion, adhesion, or adhesion, and relative rotation of the lid 1 with respect to the container 101 (rotation with a line parallel to the thickness direction of the lid region corresponding part 5B of the lid 1 as the rotation axis) and separation are restricted. In the example of the first embodiment shown in FIGS. 4A, 4B, etc., the lid 1 is formed to be joinable to the container 101.

FIGS. 4A and 4B are perspective and cross-sectional views showing an example of a container 150 with a lid in which the lid 1 shown in FIGS. 1A to 1C is joined to the container 101. The lid 1 can be used by being joined along the edge 103. In the lid 1, the area joined to the edge 103 under the plan view is referred to as the joint region R. FIG. 1A is a plan view showing an example of the lid 1. It should be noted that as the container 101, one having flexibility at the edge 103 of the opening 102 is more preferably used. However, these do not prohibit the container 101 from being a container with little or no flexibility, such as a metal container.

In the examples of FIGS. 1A to 1C, the joint region R corresponds to a region formed generally annularly along the opening 102 in a shape corresponding to the opening 102 of the container 101.

In this specification, the exposed surface 72 of the lid 1 refers to the surface that is exposed outward in the state of the container 150 with the lid, and the opposite surface 73 of the lid 1 refers to the surface opposite to the exposed surface 72. Therefore, the opposite surface 73 refers to the surface of the main body 50 of the lid 1 that faces the container 101 in the state of the container 150 with the lid. For the main body 50 and the lid region corresponding part 5B, the surface facing the same direction as the exposed surface 72 of the lid 1 is simply referred to as the exposed surface, and the surface facing the same direction as the opposite surface 73 of the lid 1 is simply referred to as the opposite surface.

The lid 1 has a main body 50 (lid main body) and a breathable sheet 51.

(Main Body)

The main body 50 is not particularly limited in its material and can use various resins (natural resins, synthetic resins, etc.) or fiber materials. From the viewpoint of reducing environmental impact, it is preferable that the main body 50 includes or is formed from paper-based materials. From the viewpoint of ease of molding, the main body 50 may be made of resin such as synthetic resin. When using resin, it is preferable to use biodegradable resin considering the viewpoint of suppressing environmental impact as much as possible.

(Paper-based Material)

As for paper-based materials, in addition to those made only of pulp, they may include fibers such as non-pulp-based natural fibers, synthetic fibers, and recycled fibers, but it is preferable to contain 50% by mass or more of pulp, more preferably 70% by mass or more, and even more preferably 80% by mass or more, with those consisting of 100% by mass of pulp being particularly preferred. Paper-based materials can also be used as composite materials with materials such as non-woven fabrics, wood-based materials such as wood foil, and aluminum foil, but when using composite materials, it is preferable for the entire composite material to contain 50% by mass or more of pulp, particularly those containing 80% by mass or more of pulp. The higher the pulp content, the more easily the paper-based material is biodegraded, which is preferable. The term "pulp" here includes pulp fibers and fibers made from pulp (such as recycled fibers). The main body 50 may have a single-layer structure or a structure with multiple layers laminated. When the main body 50 has a structure with multiple layers laminated, at least one of the layers constituting the main body 50 should be a paper-based material layer formed from paper-based material (including layers with paper-based material), and the other layers excluding the at least one layer mentioned above may be paper-based material layers or non-paper-based material layers. As for non-paper-based material layers, examples include resin layers made of resin such as polyethylene. Therefore, the main body 50 may have a structure in which a resin layer is formed by coating resin or the like on at least one surface of the paper-based material layer. Examples of such structures include so-called coated paper.

The main body 50 is not prohibited from containing various resins. However, when the main body 50 contains various resins, it is preferable to select biodegradable resins with fewer environmental pollution issues among the various resins. Examples of biodegradable resins include microbially produced biodegradable resins such as polyhydroxyalkanoate (PHA) and PHA-based copolymers; natural biodegradable resins such as cellulose derivatives like cellulose acetate and starch-based resins with starch as the main raw material like corn starch; lactic acid-based resins such as polylactic acid (PLA), polylactic acid/polycaprolactone copolymers, polylactic acid/polyether copolymers, succinate-based resins such as polybutylene succinate (PBS), polybutylene succinate adipate (PBSA), polyethylene terephthalate succinate (PETS), chemically synthesized biodegradable resins such as polycaprolactone, polyvinyl alcohol (PVA), and others like polyglycolic acid (PGA), polybutylene adipate/terephthalate, and biodegradable polyolefins (trade names: Biorecover, Cra Drop, etc.).

Figure 1:
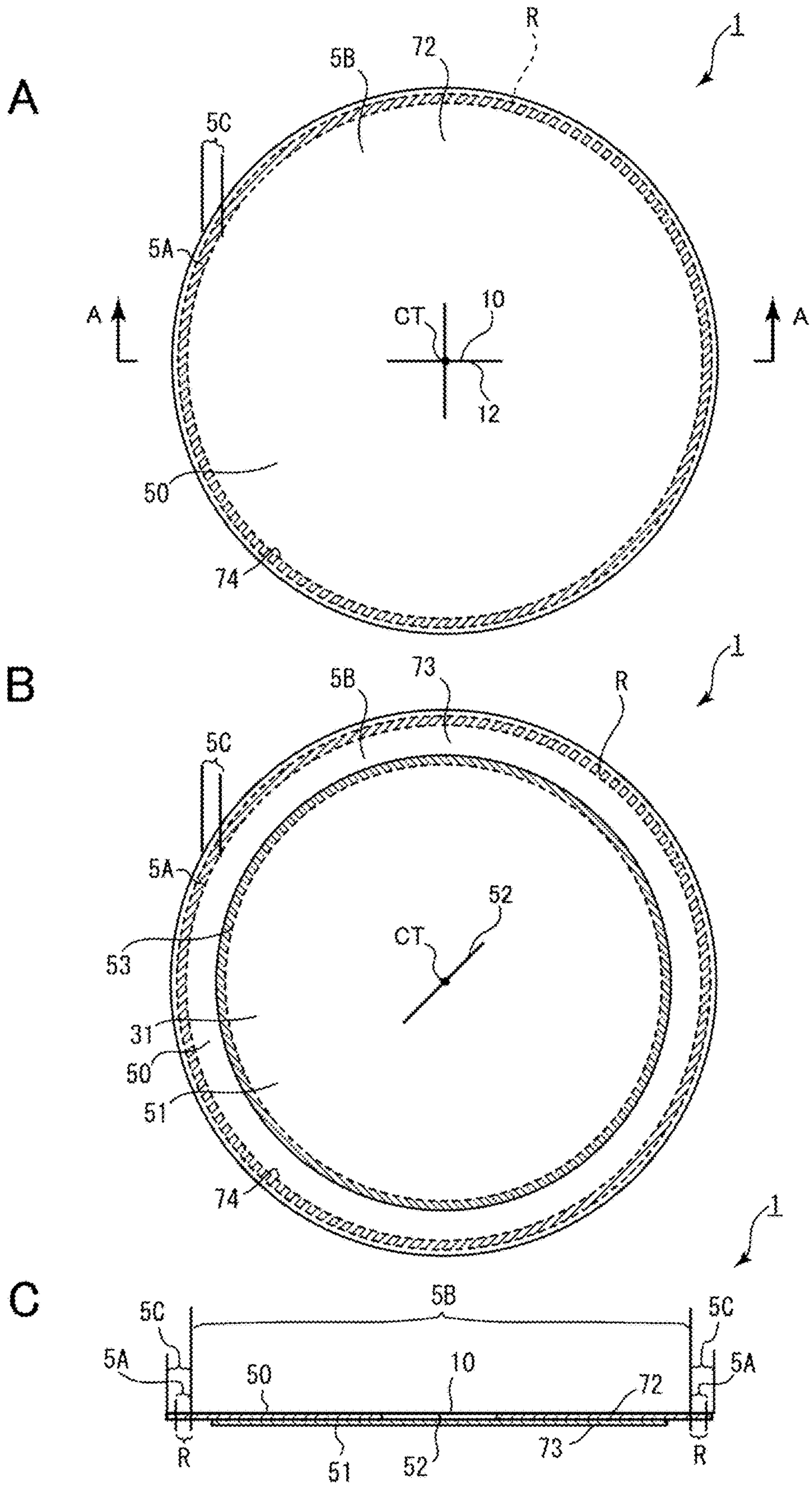
FIG. 1A is a plan view showing an example of a lid according to the first embodiment.
FIG. 1B is a bottom view showing an example of a lid according to the first embodiment.
FIG. 1C is a cross-sectional view schematically showing the state of the A-A line longitudinal section of FIG. 1A.
Figure 2:
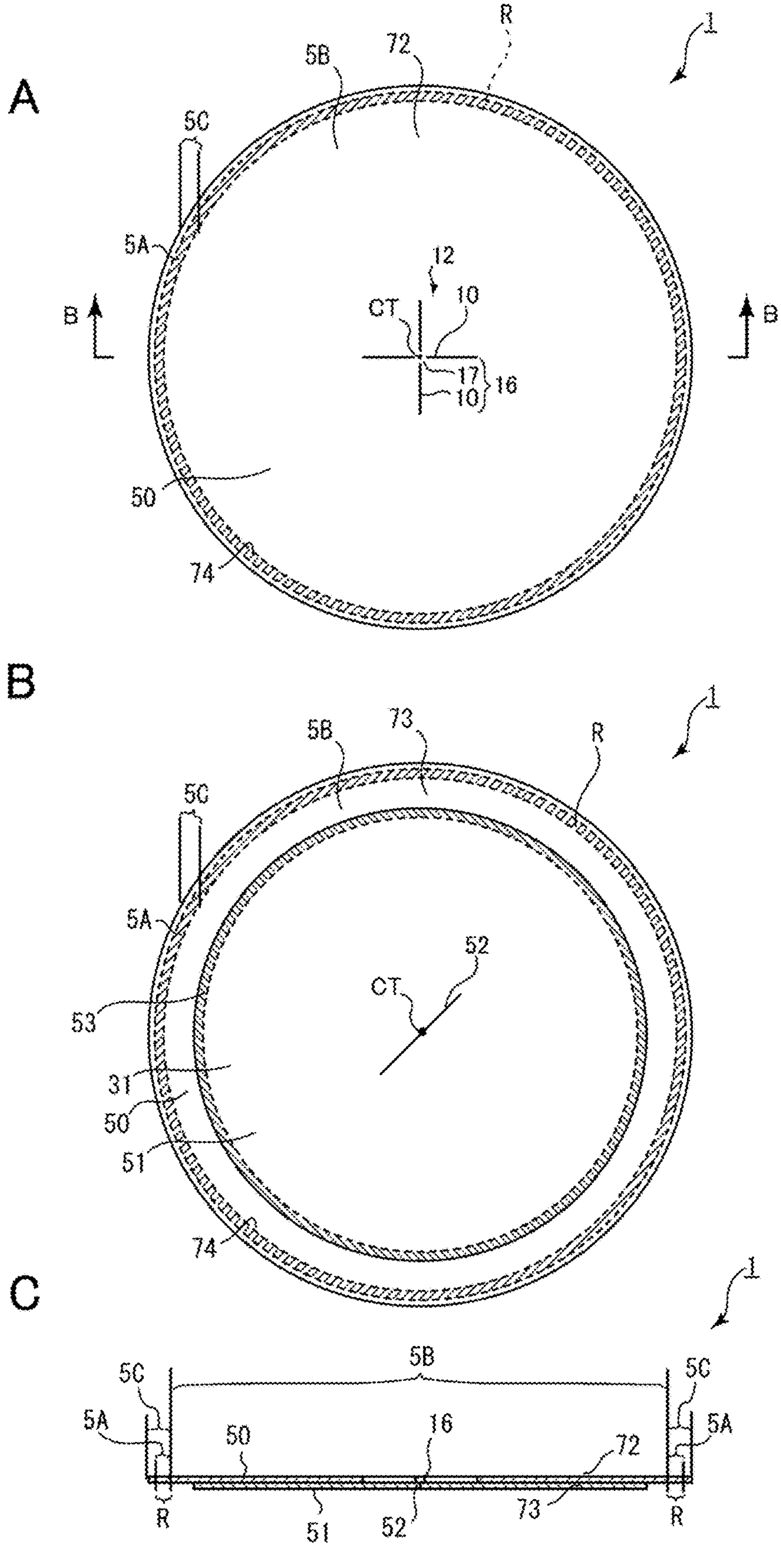
FIG. 2A is a plan view showing an example of a lid according to the first embodiment.
FIG. 2B is a bottom view showing an example of a lid according to the first embodiment.
FIG. 2C is a cross-sectional view schematically showing the state of the B-B line longitudinal section of FIG. 2A.

The lid 1 has a contact region corresponding part. The contact region corresponding part corresponds to the region of the lid 1 that contacts the container 101 along the edge 103 of the container 101. In the example of FIG. 1, the contact region corresponding part corresponds to the region that contacts the container 101 from above the edge 103. Also, in the example of FIG. 1, the lid 1 has a joining region corresponding part 5A as the contact region corresponding part. Furthermore, as shown in FIG. 1, the lid 1 includes a lid region corresponding part 5B and an outer region corresponding part 5C. The lid region corresponding part 5B is composed of the part that covers the opening 102. The outer region corresponding part 5C is composed of the part outside the lid region corresponding part 5B.

(Joining Region Corresponding Part)

The joining region corresponding part 5A corresponds to the region of the lid 1 that is joined to the container 101 along the edge 103 of the container 101. That is, the joining region corresponding part 5A is the part of the lid 1 corresponding to the joint region R (the region facing the edge 103 of the container 101 and the region joined to the container 101). In the container with lid 150, the joining region corresponding part 5A is the part of the lid 1 that forms the joint 151 between the lid 1 and the container 101. As will be described later, it is preferable from the viewpoint of enhancing the bonding strength between the lid 1 and the container 101 that the joint 151 serves as the adhesive part between the lid 1 and the container 101. Specifically, in a plan view of the lid 1 (in the example of FIG. 1, when the Z-axis direction (vertical direction) is the line of sight), the part forming the joint region R is defined as the joining region corresponding part 5A. The joining region corresponding part 5A is usually formed in an annular shape as shown in FIG. 1. Particularly, as shown in FIG. 1, when the edge 103 of the container 101 is generally annular, the joint region R becomes annular, and the joining region corresponding part 5A also becomes generally annular under the plan view of the lid 1. The outer edge of the joining region corresponding part 5A is determined according to the position of the outer edge of the joint region R. The outer edge of the joining region corresponding part 5A may be located at the outer peripheral edge of the lid 1 (in this case, the joining region corresponding part 5A and the outer region corresponding part 5C coincide), or it may be located inside the outer peripheral edge of the lid 1 as shown in the example of FIG. 1. If the joint region R between the lid 1 and the container 101 is not continuously formed, the part sandwiched between adjacent joint regions R and the part facing the edge 103 are also included in the joining region corresponding part 5A, which will be described later.

(Lid Region Corresponding Part)

The lid region corresponding part 5B is the part composed of the portion that covers the opening 102. In the example of FIG. 1, the lid region corresponding part 5B is the part inside from the inner edge of the joining region corresponding part 5A of the lid 1. The lid region corresponding part 5B is the part that covers the opening 102 in the container with lid 150. The part that covers the opening 102 refers to the part that covers at least a portion of the opening 102, and includes cases where it has a part that can be partially opened, such as the insertion port 12, as will be described later.

(Outer Region Corresponding Part)

As shown in the example of FIG. 1, the part outside the lid region corresponding part 5B of the lid 1 is the outer region corresponding part 5C, which is the same part as the joining region corresponding part 5A or includes the joint region R.

In the main body 50 of the lid 1, the lid region corresponding part 5B has a penetration part 10 inside from the peripheral edge 74, which is the outer peripheral edge of the lid region corresponding part 5B. However, this does not prohibit a part of the penetration part 10 from being formed outside the lid region corresponding part 5B.

(Penetration Part)

In the main body 50, at least the lid region corresponding part 5B has a penetration part 10 formed. In the example of FIG. 1, the penetration part 10 is formed at a position closer to the center CT inside the lid region corresponding part 5B. However, this is just one example, and the position of the penetration part 10 is not limited to this.

The penetration part 10 has a structure (penetrated structure) that is cut from one side to the other side of the lid 1 (from the exposed surface 72 to the opposite surface 73) in the vertical direction (thickness direction of the main body 50), and is a so-called notch portion. The notch portion is the part formed in a slit shape. The shape of the penetration part 10 is not particularly limited, and in the example of FIG. 1, it is formed in a cross shape, but these are just examples and do not limit the shape of the penetration part 10. The shape of the penetration part 10 may be formed in a C-shape, U-shape, or other shapes.

The shape of the penetration part 10 is not limited to being formed in the slit shape mentioned above. The penetration part 10 may be formed in an annular shape. In this case, the penetration part 10 may be a hole part where the member forming the main body 50 (paper-based material, etc.) is pushed open, or it may be a part where the member forming the main body 50 is punched.

(Insertion Port)

In the example of FIG. 1, the main body 50 has an insertion port 12 for inserting a straw or the like from the outside, and this insertion port 12 is a structural part formed by the penetration part 10. That is, in the example of FIG. 1, the penetration part 10 forms a structural part that functions as an insertion port 12 for inserting a straw or the like from the outside.

The penetration part 10 is not limited to forming the structure of the insertion port 12, and may also form a structure for forming a vent to reduce the internal pressure of the container 101 in the state of the container with lid 150, or an opening for forming a drinking spout (an opening formed inside from the lid region corresponding part 5B).

(Shape of the Main Body in the Thickness Direction)

In the example of FIG. 1A, the main body 50 of the lid 1 is formed in a flat plate shape, but this is just one example, and the main body 50 may have irregularities formed.

(Breathable Sheet)

In the lid 1, at least one breathable sheet 51 is provided. The breathable sheet 51 is joined to the main body 50. The breathable sheet 51 is arranged on the side of the opposite surface 73 of the main body 50 facing the container 101. The breathable sheet 51 is arranged to cover the position where the penetration part 10 is formed, assuming a state where no notch portion 52 is formed in the breathable sheet 51.

(Breathability)

The breathable sheet 51 preferably has a degree of breathability that allows gases such as carbon dioxide and vapors (such as water vapor) to pass from one side to the other side of the breathable sheet 51. Gases such as carbon dioxide and vapors (such as water vapor) may be collectively referred to as ""gases, etc."" In the example of FIG. 1, the breathable sheet 51 has breathability that allows gases, etc., to pass from the side facing one side (the opposite surface 73 of the lid 1) to the other side (the exposed surface 72 of the lid 1) (the side facing the main body 50).

At least one breathable sheet 51 is arranged so that at least a part of at least one breathable sheet 51 faces at least a part of the opposite surface 73 of the lid region corresponding part 5B facing the container 101.

(Installation Region of the Breathable Sheet)

Regarding the installation region of the breathable sheet 51 on the main body 50, at least a part of at least one side of the breathable sheet 51 faces at least a part of the opposite surface (the surface facing the same direction as the opposite surface 73 of the lid 1) of the lid region corresponding part 5B facing the container 101.

In the example of FIG. 1, the breathable sheet 51 is provided to cover approximately the entire surface of the lid region corresponding part 5B. The breathable sheet 51 may be provided to cover the region outside the lid region corresponding part 5B. For example, the breathable sheet 51 may be provided to cover not only the lid region corresponding part 5B but also at least a part of the joining region corresponding part 5A. However, from the viewpoint of enhancing the adhesion between the container and the lid, it is preferable that the breathable sheet 51 is provided inside from the lid region corresponding part 5B.

(Joint Between the Breathable Sheet and the Lid Region Corresponding Part)

The breathable sheet 51 is partially directly or indirectly joined to the lid region corresponding part 5B. In the example of FIG. 1, the breathable sheet 51 and the lid region corresponding part 5B are directly joined. The joint 53 formed by the joining of the breathable sheet 51 and the lid region corresponding part 5B is formed along the outer periphery of the breathable sheet 51 in the example of FIG. 1 (in FIG. 1B, the joint 53 is shown as the hatched part along the outer periphery of the breathable sheet (the same in FIGS. 2 and 5)). Inside the joint 53, the breathable sheet 51 and the lid region corresponding part 5B are in a non-joined state. That is, the breathable sheet 51 is partially joined to the lid region corresponding part 5B. This is just one example, and the joint 53 may be formed in the internal region of the breathable sheet 51. However, it is preferable that the joint 53 between the breathable sheet 51 and the lid region corresponding part 5B is formed so that there is a non-joined part between the breathable sheet 51 and the lid region corresponding part 5B (the breathable sheet 51 is partially joined to the lid region corresponding part 5B). This allows for a more reliable securing of a gap (space) between the breathable sheet 51 and the lid region corresponding part 5B. Also, in the example of FIG. 1, it is formed annularly along the outer periphery of the breathable sheet 51, but it may be partially formed and may be formed at each of multiple positions along the outer periphery of the breathable sheet 51. The joint 53 may be the part where the breathable sheet 51 and the lid region corresponding part 5B are joined by an adhesive or the like, or the part where the breathable sheet 51 and the lid region corresponding part 5B are joined using ultrasound (ultrasonic joint). As a method of joining using ultrasound, ultrasonic welding can be exemplified. In such cases, the joint 53 can be an adhesive part or a fusion part. This allows for the formation of a state where the breathable sheet 51 is firmly adhered to the main body 50 at the joint 53.

It is preferable that the strength of the joint 53 between the breathable sheet 51 and the lid region corresponding part 5B is higher than the strength of the joint 151 between the lid 1 and the container 101. It is possible to suppress the risk of the breathable sheet 51 detaching from the lid region corresponding part 5B and falling into the container 101. It is preferable that the lid 1 is configured such that when stress is applied to peel the center of the breathable sheet 51 from the lid region corresponding part 5B, the breathable sheet 51 breaks before the joint 53 between the breathable sheet 51 and the lid region corresponding part 5B is destroyed. In this case as well, it is preferable that the breathable sheet 51 is partially joined to the lid region corresponding part 5B. In this case, even if liquid enters the gap between the breathable sheet 51 and the lid region corresponding part 5B in the state of the container 150 with the lid, and a strong force is applied to the joint 53, it is possible to suppress the risk of the entire breathable sheet 51 falling into the container 101.

(Gap Between the Breathable Sheet and the Main Body)

In FIG. 1A, for the sake of explanation, the breathable sheet 51 and the main body 50 are illustrated as being in close contact, but it is preferable that there is a gap between the breathable sheet 51 and the main body 50. It is preferable that at least a part of at least one surface of the breathable sheet 51 faces with a gap towards at least a part of the surface of the lid region corresponding part 5B that faces the container 101 (the surface facing in the same direction as the opposite surface 73 of the lid 1). From the perspective of ensuring a gap between the breathable sheet 51 and the main body 50, it is preferable that the breathable sheet 51 has irregularities. As a method of forming irregularities on the breathable sheet 51, embossing can be exemplified.

In the example of FIG. 1, the breathable sheet 51 is provided so as to cover substantially the entire surface of the lid region corresponding part 5B. The breathable sheet 51 may be provided to cover the region outside the lid region corresponding part 5B. For example, the breathable sheet 51 may be provided to cover not only the lid region corresponding part 5B but also at least a part of the joining region corresponding part 5A. However, from the perspective of enhancing the adhesion between the container and the lid, it is preferable that the breathable sheet 51 is provided inside from the lid region corresponding part 5B.

It is preferable that the breathable sheet 51 is arranged such that it can flex in the direction away from the main body 50 from the outer peripheral edge of the breathable sheet 51 towards the inside of the breathable sheet 51 (in the example of FIG. 27C, in the direction from the exposed surface 72 towards the opposite surface 73) as shown in FIGS. 27A to 27C. Particularly, when the breathable sheet 51 is joined to the main body 50 at the outer peripheral edge of the breathable sheet 51, by arranging the breathable sheet 51 to flex as described above, a gap 55 can be secured between the breathable sheet 51 and the main body 50, and the non-opposite surface side of the breathable sheet 51 with respect to the main body 50 can be made a convex surface 56. In this case, when the container 150 with the lid 1 contains gas such as carbon dioxide and liquid inside the container 101, even if the liquid waves, the wave can be made to collide with the convex surface 56 of the breathable sheet 51, making it easy to break the wave. It is preferable that the flexing of the breathable sheet 51 does not generally occur when the lid 1 is not in use, and when the lid 1 is used on the container 150 with the lid, and gas or liquid passes through the breathable sheet 51, the flexing of the breathable sheet 51 occurs and a gap 55 is formed. From the perspective of effectively realizing this, it is preferable to use a breathable sheet 51 that has even slight extensibility, and it is also preferable to use one that is capable of plastic deformation as the breathable sheet 51.

(Surface Roughness)

It is preferable that the breathable sheet 51 has a surface roughness (maximum height Rz) (μm) greater than at least a part of the lid region corresponding part 5B. The surface of the breathable sheet 51 with greater surface roughness may be directed towards the space part 105 side of the container 101 or towards the lid region corresponding part 5B side. It is preferable that both surfaces of the breathable sheet 51 have a surface roughness (maximum height Rz) (μm) greater than at least a part of the lid region corresponding part 5B. When the breathable sheet 51 has a large surface roughness, the leakage of liquid is effectively suppressed. When the surface of the breathable sheet 51 with greater surface roughness is directed towards the space part 105 side of the container 101, the liquid adhering to the breathable sheet 51 along with gas is more easily captured by the breathable sheet 51. When the surface of the breathable sheet 51 with greater surface roughness is directed towards the lid region corresponding part 5B side, a gap is more likely to exist between the breathable sheet 51 and the main body 50.

(Number of Breathable Sheets)

The number of breathable sheets 51 may be one or more than two. When there are two or more breathable sheets 51, multiple breathable sheets 51 may be laminated. Also, in the lid region corresponding part 5B, multiple breathable sheets 51 may have overlapping parts and may be provided in positions offset from each other. Also, in the lid region corresponding part 5B, the plurality of breathable sheets 51 may be provided in positions offset from each other without having overlapping parts.

The shape of the breathable sheet 51 is formed in a circular shape in the example of FIG. 1, but this is just one example. The shape of the breathable sheet 51 may be rectangular or elliptical, among others.

(Material of the Breathable Sheet)

It is preferable that the breathable sheet 51 is a sheet material having multiple fibers. Such a breathable sheet 51 preferably has a fiber sheet 31.

(Fiber Sheet)

As the fiber sheet 31, woven fabric sheets or non-woven fabric sheets can be exemplified. From the perspective of enhancing the effect of suppressing liquid leakage from the through part 10, it is preferable that it is a non-woven fabric sheet. In the example of FIG. 1, a non-woven fabric sheet is used as the fiber sheet 31 that becomes the breathable sheet 51.

(Non-woven Fabric Sheet)

A non-woven fabric sheet is defined in JIS L0222 as a non-woven fabric, which is "a material in which fibers are oriented in one direction or randomly, and are bonded together by entanglement, and/or fusion, and/or adhesion, excluding paper, woven fabrics, knitted fabrics, tufted fabrics, and felted fabrics." Non-woven fabric sheets include, for example, spunbond non-woven fabrics, chemical bond non-woven fabrics, airlaid non-woven fabrics, needle punch non-woven fabrics, spunlace non-woven fabrics, thermal bond non-woven fabrics, resin bond non-woven fabrics, nanofiber non-woven fabrics, and meltblown non-woven fabrics. As a non-woven fabric sheet, one that has pulp fibers as the main component of the fibers is preferable, but it is not limited to this, and those made from fibers mainly composed of non-pulp fibers such as synthetic fibers may be used. A non-woven fabric sheet with pulp fibers as the main component of the fibers contains 50% or more by mass of pulp fibers, preferably 70% or more by mass, and more preferably 80% or more by mass. Non-pulp fibers include natural fibers such as wool, silk, and cotton; synthetic fibers such as nylon, vinylon, polyester like polyethylene terephthalate, polyacrylic, polyolefins like polyethylene and polypropylene, polyurethane; regenerated fibers like rayon; and semi-synthetic fibers like acetate, but synthetic fibers are preferably used.

Non-woven fabric sheets can be used by layering the same or different types of non-woven fabric sheets, and they may be laminated from different materials.

(Fibers)

The fibers constituting the fiber sheet 31 are preferably pulp fibers, but this does not mean that the fibers are limited to pulp fibers. The fibers may be non-pulp fibers. Non-pulp fibers can include natural fiber materials other than pulp fibers, synthetic fibers, metal fibers, wood formed into fibers, glass fibers, and the like.

(Fiber Sheet Containing Pulp Fibers)

As a fiber sheet 31 containing pulp fibers, sheets using lyocell fibers such as rayon or Tencel (trademark) can be exemplified. Lyocell fibers usually refer to regenerated cellulose fibers.

The breathable sheet 51 includes those having a laminated structure in which multiple fiber sheets 31 as described above are laminated. The fiber sheet 31 also includes sheet materials having fibers other than pulp fibers, such as chemical fibers, fibers with functions such as water resistance, metal fibers, and glass fibers.

When the fiber sheet 31 contains pulp fibers, the fiber sheet 31 may consist solely of pulp fibers, or it may include various fibers such as natural fibers, synthetic fibers, and regenerated fibers as non-pulp fibers, but it is preferable that it contains 50% or more by mass of pulp fibers, more preferably 70% or more by mass, and even more preferably 80% or more by mass, with those consisting of 100% by mass of pulp being particularly preferable.

(Water Repellency)

The breathable sheet 51 is a sheet material with water repellency. When the breathable sheet 51 has water repellency, if the lid 1 is used on the container 150 with the lid and the container 101 contains liquid along with gas such as carbon dioxide as contents, it can effectively suppress the leakage of the liquid.

(Water Repellency Treatment)

The fiber sheet 31 for forming the breathable sheet 51 is preferably water-repellent, but even if the material of the fibers forming the fiber sheet 31 does not have sufficient water repellency, it is sufficient if the fiber sheet 31 has been subjected to water repellency treatment. That is, the breathable sheet 51 can preferably be used as a water-repellent treated fiber sheet 31. For example, when the breathable sheet 51 is formed from a fiber sheet 31 containing pulp fibers, specifically from sheets using lyocell fibers such as rayon or Tencel (trademark), it is preferable to use a breathable sheet 51 that has been treated for water repellency.

The water-repellent treatment is not particularly limited and can include, for example, a method (called the immersion method) where the fiber sheet 31 is immersed in a treatment liquid, then lifted and dried. Additionally, the water-repellent treatment can include a method of applying the treatment liquid to the surface of the fiber sheet 31. As for the application method, specific examples include printing methods. Examples of printing methods include roll coating, spray coating, gravure printing, and screen printing.

The breathable sheet is preferably water-repellent throughout its interior to enhance water repellency, and in this regard, immersion, spraying, and transfer methods are preferred for water-repellent treatment.

The treatment liquid can be exemplified by a liquid containing a water-repellent agent. Water-repellent agents can include, for example, fluorine-based water-repellent agents, waxes, and coating materials. Examples of waxes include microcrystalline wax, ceresin wax, rice wax, ITOH-WAX, sunflower wax, paraffin wax, candelilla wax, polyethylene wax, carnauba wax, ibota wax, montan wax, bleached montan wax, bleached beeswax, beeswax, vaseline, wood wax, white wax (haze wax), synthetic spermaceti, white wax (urushi wax), lanolin wax (hard lanolin), hydrogenated lanolin (reduced lanolin), and refined lanolin. Similar to waxes, examples include castor hardened oil, rosin, rapeseed extreme hardened oil, jojoba hardened oil, soybean hardened oil, soybean extreme hardened oil, rice extreme hardened oil, beef tallow extreme hardened oil, high erucic rapeseed extreme hardened oil, pork fat extreme hardened oil, palm oil, palm hardened oil, palm extreme hardened oil, beef tallow hardened oil, rice hardened oil, beef tallow, lard, micro-hydrogenated horse oil, soybean hardened oil, rapeseed hardened oil, coconut hardened oil, fish hardened oil, ostrich oil, coconut oil, sunflower butter, moringa butter, almond butter, macadamia nut butter, lanolin, avocado butter, olive butter, orange butter, chamomile butter, cranberry butter, pomegranate butter, tangerine butter, monoi butter, lime butter, lemon butter, camellia butter, kokum butter, shea butter, soy butter, mango butter, aloe butter, cocoa butter, murumuru butter, tucuma butter, cupuacu butter, 12-hydroxystearic acid, 12-hydroxystearic acid B, adsorbed refined vaseline, palm stearic acid, lanolin fatty acid. It should be noted that the above are examples, and other materials may be selected and used as desired.

As for coating agents, examples include fluorocarbon-based coating agents such as polytetrafluoroethylene (PTFE), polyperfluoroalkyl ether (PFPAE), and fluorocarbon polymers; silicone-based coating agents such as silicone emulsions, silicone polymers, and acrylic silicones; acrylic-based coating agents such as acrylic resin emulsions, acrylic polymers, acrylic urethanes, and acrylic silicones; urethane-based coating agents such as urethane polymers and polyurethanes; and olefin-based coating agents such as polyvinyl alcohol, polyvinyl acetate, polyolefin-based polymers, and polyolefin-based ionomers, which can be selected and used as desired. It is preferable that the specific types of water-repellent agents mentioned above (such as waxes and coating agents) are selected according to various conditions such as the temperature and acidity of the contents of container 101.

(Notch Portion)

In the lid 1 shown in the examples of FIGS. 1A to 1C, a notch portion 52 is formed so as to overlap at least a part of the position corresponding to the Penetration part 10. The notch portion 52 is a part cut through the breathable sheet 51 in its thickness direction. By having the notch portion 52, even when the Penetration part 10 forms an insertion port 12, it is possible to more reliably insert a straw or other member from the insertion port 12 toward the space 105 inside the container 101. However, FIG. 1 is an example, and the notch portion 52 may be formed so as not to overlap the position corresponding to the Penetration part 10 on the breathable sheet 51, or the formation of the notch portion 52 may be omitted.

The notch portion 52 is formed in a straight line. However, this is an example, and the shape of the notch portion 52 is not particularly limited and may be curved.

(Positional Relationship Between Breathable Sheet and Penetration Part)

It is preferable that the breathable sheet 51 is provided so as to cover at least a part of the Penetration part 10. By covering at least a part of the Penetration part 10 with the breathable sheet 51, the effect of suppressing liquid leakage can be further enhanced. In the example of FIG. 1, the breathable sheet 51 covers the entire Penetration part 10. If the breathable sheet 51 covers the entire Penetration part 10, it includes cases where the breathable sheet 51 has a notch portion 52 (including cases where the notch portion 52 overlaps the Penetration part 10). However, this does not prohibit the breathable sheet 51 from being provided so as not to cover the Penetration part 10. Even if it is provided so as not to cover the Penetration part 10, in the part covered by the breathable sheet 51, it is possible to suppress the movement of the liquid inside the container in a state where it is entrained with gas, etc., and reduce the amount of liquid moving in a state where it is entrained with gas, etc., throughout the entire space inside the container, thereby reducing the leakage of liquid from the Penetration part 10 accompanying the ejection of gas, etc., from the Penetration part 10.

(Hole Section)

It is preferable that the nonwoven fabric sheet is configured to avoid the formation of holes, but holes of irregular shape, elliptical shape, circular shape, etc., may be formed. The hole section referred to here indicates a hole structure formed so that the contact of opposing peripheries of the hole section is avoided. However, in this case, it is preferable that the hole section is formed in a position that does not overlap the Penetration part 10 when the thickness direction of the main body 50 is viewed. The hole section may be a hole punched in the nonwoven fabric sheet, but it is preferable that it is a hole formed by spreading the spacing of the fibers forming the nonwoven fabric sheet.

1-2. Manufacturing Method

Manufacturing Method Example 1

As a method for manufacturing the lid 1, for example, the lid 1 can be manufactured by going through a process of joining the breathable sheet 51 to a blank material punched and formed according to the shape of the lid 1 from a sheet material (original sheet) formed from a material according to the material of the lid 1. In this case, the blank material forms the main body 50. The blank material may be subjected to a shaping process. When the blank material is subjected to a shaping process, it is not limited to cases where the lid 1 is formed only from the blank material, but also includes cases where the lid 1 has a structure in which another member is attached to the blank material. As an example of the shaping process, a process of providing an uneven structure to the blank material by passing it through an embossing roll can be illustrated.

(Joining of Main Body and Breathable Sheet)

The breathable sheet 51 is joined to a predetermined position on the blank material forming the main body 50. Various methods can be exemplified for joining the breathable sheet 51 to the main body 50 (blank material), such as ultrasonic bonding, heat sealing, and adhesive bonding, but from the viewpoint of ease of bonding and bonding strength, ultrasonic bonding is preferred. The joining position of the main body 50 and the breathable sheet 51 is not particularly limited as long as at least a part of the breathable sheet 51 faces the main body 50. In the example of manufacturing the lid shown in FIG. 1, it is joined along the outer periphery of the breathable sheet 51 to the lid region corresponding part 5B of the main body 50 (the surface of the lid region corresponding part 5B facing the container).

The original sheet is composed of a fiber sheet 31 forming the main body 50.

Manufacturing Method Example 2

The main body 50 constituting the lid 1 may be formed by a pulp molding method. According to the pulp molding method, a slurry containing fiber raw material is molded using a mold and can be obtained by drying or pressure drying. The breathable sheet 51 is joined to a predetermined position on the obtained main body 50 as shown in the above manufacturing method example 1.

1-3. Operation and Effect

In a container with a lid, when the lid has a Penetration part and the contents stored inside the container with the lid are liquid, it is required to suppress the risk of liquid leaking from the Penetration part of the lid. Particularly, when the liquid contained in the container with a lid is a hot liquid or a liquid containing carbon dioxide, gases such as steam or carbon dioxide fill the container with a lid, and these gases spurt out from the Penetration part of the lid. When the container with a lid is moved, the liquid surface inside the container may become wavy due to the movement of the liquid, and part of the wavy liquid may be caught in the flow of gas trying to escape from the container, causing it to be carried along with the gas and ejected from the Penetration part to the outside.

In this regard, the lid 1 according to the first embodiment is provided with a breathable sheet 51 at least in the lid region corresponding part 5B on the opposite surface 73 side of the main body 50. When the container with a lid 150 is moved and the liquid caught in the airflow of gas, etc., collides with the breathable sheet 51, the liquid collides with the breathable sheet 51, the gas enters the interior of the breathable sheet 51, and the liquid can be repelled by the fibers constituting the breathable sheet 51. Additionally, depending on the state of the liquid, the gas, etc., can pass through the breathable sheet 51, and the liquid can also enter the interior of the breathable sheet 51 while being caught in the gas. At this time, part of the liquid collides with the material constituting the breathable sheet 51, and the liquid's upward momentum is further reduced. Moreover, the rising liquid particles are finely broken when passing through the breathable sheet 51, making it easier for the direction of the liquid's progress to change.

Furthermore, since the breathable sheet 51 is water-repellent, even if water adheres to the breathable sheet 51, the surface of the breathable sheet 51 is unlikely to become wet with water, making it difficult for the breathable sheet 51 to adhere to the opposite surface 73 side of the main body 50 through water, and it becomes easier to maintain a state where a gap between the breathable sheet 51 and the main body 50 is secured. Even if part of the liquid caught in the airflow of gas, etc., passes through the breathable sheet 51, a gap is formed between the lid region corresponding part 5B and the breathable sheet 51, allowing the liquid to be temporarily positioned in the gap, and it is possible to suppress the use of the liquid's momentum as a driving force to move (return) the liquid to the space section 105 side of the container 101 by colliding with the opposite surface 73 of the lid region corresponding part 5B. From this, it becomes easier to restrict the movement of the liquid, and according to the lid 1 of the first embodiment, it is possible to suppress the liquid from being ejected to the outside through the Penetration part 10 along with gases such as steam or carbon dioxide.

Also, when a gap is formed between the lid region corresponding part 5B and the breathable sheet 51, the breathable sheet 51 is more likely to bend in a direction away from the main body 50 (toward the space section 105 of the container 101). In particular, if the breathable sheet 51 is configured to bend from its outer edge toward the center, the liquid is more likely to collide with the breathable sheet 51 in a bent state, making it easier for the wavefront of the liquid surface to be disrupted. As a result, it becomes difficult for the liquid to be positioned upward, and it is possible to suppress the liquid from being ejected to the outside through the Penetration part 10 along with gases such as steam or carbon dioxide.

Next, a modification of the first embodiment will be described.

1-4. Modifications

Modification 1

In the lid 1 according to the first embodiment, as shown in FIGS. 2A to 2C, the insertion port 12 is not limited to being formed by the Penetration part 10, and the insertion port 12 may be formed by the weakened part 16. Such an embodiment is referred to as Modification 1 of the first embodiment. FIG. 2A is a plan view showing an example of the lid 1 according to Modification 1 of the first embodiment. As shown in the example of FIG. 2A, instead of forming the Penetration part 10 to create the insertion port 12 in the lid region corresponding part 5B of the lid 1, a weakened part 16 that guides the division position in the lid region corresponding part 5B may be provided. The weakened part 16 may have multiple Penetration parts 10 and at least one continuous section 17 formed between at least two Penetration parts 10. In the example of FIG. 2A, the weakened part 16 forms multiple Penetration parts 10 radially around the continuous section 17. The continuous section 17 indicates the part that is formed between multiple Penetration parts 10 and is in a non-penetrating state in the lid region corresponding part 5B. The continuous section 17 may be a half-notch portion. The weakened part 16 shown in FIG. 2A can form the insertion port 12. For example, in the weakened part shown in FIG. 2A, a straw or the like can be inserted by destroying the continuous section 17 while inserting it into the weakened part 16 from the outside.

Modification 2

In the lid 1 according to the first embodiment, as shown in FIGS. 7A to 7C, the breathable sheet 51 may be formed up to the outer region corresponding part 5C. Such an embodiment is referred to as Modification 2 of the first embodiment. FIGS. 7A to 7C are a plan view, bottom view, and sectional view, respectively, showing an example of the lid 1 according to Modification 2 of the first embodiment. In FIG. 7B, the breathable sheet 51 is formed to cover not only the lid region corresponding part 5B but also up to the outer peripheral edge 75 of the outer region corresponding part 5C. However, this is just one example, and the breathable sheet 51 may extend beyond the outer region corresponding part 5C, or it may be formed to cover up to a position inside the outer peripheral edge 75 of the outer region corresponding part 5C. According to the lid 1 of Modification 2 of the first embodiment, even if the material of the edge 103 of the container 101 has poor heat fusibility with the main body 50 of the lid 1, the edge 103 of the container 101 and the lid 1 can be firmly joined by interposing the breathable sheet 51 between them.

Modification 3

In the lid 1 according to the first embodiment, as shown in FIGS. 8A to 8C, the breathable sheet 51 may have a polygonal contour shape. Such an embodiment is referred to as Modification 3 of the first embodiment. FIGS. 8A to 8C are a plan view, bottom view, and sectional view, respectively, showing an example of the lid 1 according to Modification 3 of the first embodiment. In FIG. 8B, the breathable sheet 51 is formed in a rectangular shape.

Modification 4

In the lid 1 according to the first embodiment, as shown in FIGS. 9A to 9C, the breathable sheet 51 may form a vent hole 80. Such an embodiment is referred to as Modification 4 of the first embodiment. FIGS. 9A to 9C are a plan view, bottom view, and sectional view, respectively, showing an example of the lid 1 according to Modification 4 of the first embodiment.

(Vent Hole)

The vent hole 80 is a structural part that penetrates the main body 50 in the thickness direction of the lid 1. It is preferable that the vent hole 80 is provided at a position different from the insertion port 12. The vent hole 80 is formed in a shape that allows the passage of gases such as steam or carbon dioxide. The vent hole 80 may have a configuration similar to the Penetration part 10. In the example of FIG. 9A, the vent hole 80 is formed in a slit shape. The shape of the vent hole 80 is not limited to a slit shape and can be exemplified by circular, polygonal, elliptical shapes, etc. The shape of the vent hole 80 may be formed so that the opposite surfaces of the vent hole 80 contact each other, or it may be formed as a hole-like structure where the opposite surfaces of the vent hole 80 do not contact each other (for example, a circular punched hole, etc.).

(Arrangement of Multiple Vent Holes)

The number of vent holes 80 formed is not limited, and the main body 50 may have a single vent hole 80 formed or multiple vent holes 80 formed. For example, in FIG. 9A, four vent holes 80 are formed around the insertion port 12 in the main body 50.

Modification 5

In the lid 1 according to Modification 4 of the first embodiment, multiple vent holes 80 were formed in the breathable sheet 51 in the layout shown in FIGS. 9A to 9C, but as shown in FIGS. 10A to 10C, the multiple vent holes 80 may be in a different layout from the layout shown in FIGS. 9A to 9C. Such an embodiment is referred to as Modification 5 of the first embodiment. FIGS. 10A to 10C are a plan view, bottom view, and sectional view, respectively, showing an example of the lid 1 of the first embodiment.

In the example of FIG. 10A, when the vent hole 80 is formed in a slit shape, at least part of the vent hole 80 may be arranged so that other vent holes 80 exist on the extension line along its extending direction (the longitudinal direction of the vent hole 80). In FIG. 10A, multiple vent holes 80 are formed in the main body 50.

Modification 6

In the lid 1 according to the first embodiment, as shown in FIGS. 11A to 11C, when the breathable sheet 51 forms a vent hole 80, the insertion port 12 may be formed by the weakened part 16. Such an embodiment is referred to as Modification 6 of the first embodiment. FIGS. 11A to 11C are a plan view, a rear view, and a sectional view, respectively, showing an example of the lid 1 according to Modification 6 of the first embodiment. In the lid 1 according to Modification 6 of the first embodiment, it is preferable that the breathable sheet 51 is arranged to cover the vent hole 80.

Modification 7

In the lid 1 according to the first embodiment, as shown in FIGS. 12A to 12C, multiple breathable sheets 51 may be laminated. Such an embodiment is referred to as Modification 7 of the first embodiment. FIGS. 12A to 12C are a plan view, a rear view, and a sectional view, respectively, showing an example of the lid 1 according to Modification 7 of the first embodiment. In FIGS. 12B and 12C, breathable sheet 51A and breathable sheet 51B are laminated as multiple breathable sheets 51. The breathable sheet 51B is positioned between the breathable sheet 51A and the main body 50. As shown in FIG. 12B, it is preferable that the notch portions (notch portion 52A) of the breathable sheet 51A and the notch portions (notch portion 52B) of the breathable sheet 51B are formed in slit shapes with different longitudinal directions.

(Joint Part Between Breathable Sheet and Lid Region Corresponding Part)

In the example of FIG. 12B, a joint part 53 is formed by the joining of the breathable sheet 51 and the lid region corresponding part 5B. In the example of FIG. 12C, the joint 53 serves as a portion that connects multiple breathable sheets 51 to each other and also connects the breathable sheets 51 to the lid region corresponding part 5B. Such a joint 53 can be realized by joining, for example, using ultrasonic welding or the like, in a state where multiple breathable sheets 51 and the main body 50 are overlapped.

It is preferable that gaps are formed between the multiple breathable sheets 51 and between the breathable sheets 51 and the lid region corresponding part 5B. By forming gaps, the amount of liquid that leaks out when the gas or the like inside the container is ejected from the insertion port can be reduced.

Modification Example 8

In the lid 1 according to the first embodiment, as shown in FIGS. 13A to 13C, when multiple breathable sheets 51 are laminated, the physical shape of the breathable sheets 51 may differ. Such an embodiment is referred to as Modification Example 8 of the first embodiment. FIGS. 13A to 13C are a plan view, a rear view, and a cross-sectional view showing an example of the lid 1 according to Modification Example 7 of the first embodiment. In FIGS. 13B and 13C, the sizes of the multiple breathable sheets 51 differ, and among the multiple breathable sheets 51, those closer to the main body 50 (proximal to the lid region corresponding part 5B) are smaller in size than those farther from the main body 50 (distal to the lid region corresponding part 5B).

Additionally, among the multiple breathable sheets 51, those closer to the main body 50 (proximal to the lid region corresponding part 5B) have openings formed, while those farther from the main body 50 (distal to the lid region corresponding part 5B) may not have openings formed. In this case, a space that becomes a gap can be formed between the portion corresponding to the opening of the breathable sheet 51 located proximally to the main body 50, the breathable sheet 51 located distally to the main body 50, and the main body 50. Then, by forming a space that becomes a gap between the breathable sheet 51 located distally to the main body 50 and the main body 50, the amount of liquid that leaks out when the gas or the like inside the container is ejected from the insertion port can be more effectively reduced.

Modification Example 9

In the lid 1 according to the first embodiment, as shown in FIGS. 14A to 14C, when multiple breathable sheets 51 are laminated, the multiple breathable sheets 51 may be arranged to partially overlap. Such an embodiment is referred to as Modification Example 9 of the first embodiment. FIGS. 14A to 14C are a plan view, a rear view, and a cross-sectional view showing an example of the lid 1 according to Modification Example 9 of the first embodiment. In the examples of FIGS. 14A to 14C, multiple breathable sheets 51 are generally formed in a semicircular shape, and a part of the straight-line extending portion of the contour of one breathable sheet 51 overlaps so as to be located inside the other breathable sheet 51.

Modification Example 10

In the lid 1 according to the first embodiment, the joining position of the main body 50 and the breathable sheet 51 is not limited to the outer periphery of the breathable sheet 51. The shape of the joint 53 between the lid region corresponding part 5B and the breathable sheet 51 is not particularly limited and may be polygonal, spiral, or amorphous. The number of joints 53 is not particularly limited and may be one or more. Such an embodiment is referred to as Modification Example 10 of the first embodiment. For example, in the lid 1 according to Modification Example 10 of the first embodiment, examples such as those shown in FIGS. 15A and 15B can be mentioned. In the examples shown in FIGS. 15A and 15B, the joint 53 between the lid region corresponding part 5B and the breathable sheet 51 may be formed inside the outer periphery of the breathable sheet 51. FIGS. 15A and 15B are bottom views showing an example of the lid 1 according to Modification Example 10 of the first embodiment. In FIGS. 15A and 15B, the joining portion of the main body 50 and the breathable sheet 51 is formed inside the breathable sheet 51. In FIG. 15A, the joint 53 between the lid region corresponding part 5B and the breathable sheet 51 is formed at four locations on the outer periphery and inside of the breathable sheet 51. In FIG. 15B, the joining of the lid region corresponding part 5B and the breathable sheet 51 at the outer periphery of the breathable sheet 51 is omitted, and the joint 53 between the lid region corresponding part 5B and the breathable sheet 51 is formed at four locations inside the breathable sheet 51. In cases where the joining portion of the main body 50 and the breathable sheet 51 is formed inside the breathable sheet 51, it is preferable that the joint 53 is formed so that the breathable sheet 51 is partially joined to the main body 50. In this case, a gap is more likely to be formed between the breathable sheet 51 and the lid region corresponding part 5B of the main body 50.

Modification Example 11

Figure 16:
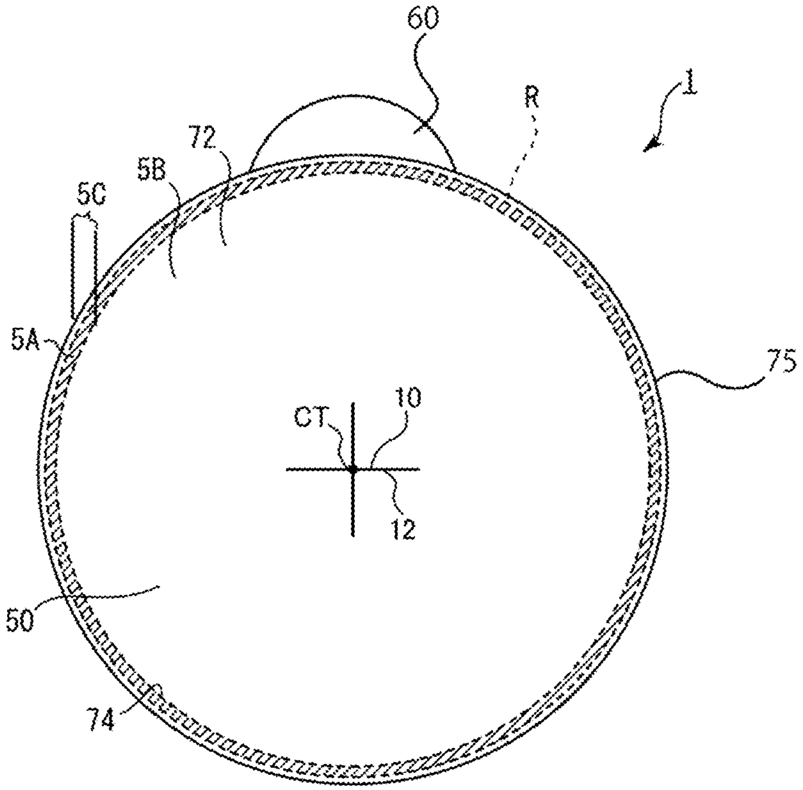
FIG. 16 is a plan view showing an example of a lid according to the first embodiment.

In the lid 1 according to the first embodiment, as shown in FIG. 16, an extension part 60 may be formed on the outer peripheral edge 75 of the outer region corresponding part 5C. Such an embodiment is referred to as Modification Example 11 of the first embodiment. FIG. 16 is a plan view showing an example of the lid 1 according to Modification Example 11 of the first embodiment. In FIG. 16, an extension part 60 is formed at a predetermined position on the outer peripheral edge 75 of the outer region corresponding part 5C. The extension part 60 is defined as a portion extending outward from the outer peripheral edge 75 of the outer region corresponding part 5C. By forming the extension part 60, it can be used as a knob part, allowing the user to carry the lid 1 without touching the lid region corresponding part 5B of the lid 1.

2 SECOND EMBODIMENT

2-1. Structure

In the lid according to the second embodiment, as shown in FIGS. 5A, 5B, and 5C, the lid region corresponding part 5B may have an opening forming part. The opening forming part includes a base part 2 having a small opening 6 with a smaller opening area than the opening 102 of the container 101, a small lid part 3 for opening and closing the small opening 6, and a hinge part 4 connecting the base part 2 and the small lid part 3, with the small lid part 3 being configured to be rotatable with respect to the base part 2 around the hinge part 4.

The small opening 6 is defined as the opening portion formed as the small lid part 3 rotates.

The base part 2 is composed of the portion excluding the small lid part 3 from the lid 1. In the example of FIG. 5A, the base part 2 is composed of the portion excluding the small lid part 3 from the lid region corresponding part 5B and the outer region corresponding part 5C.

Figure 5:
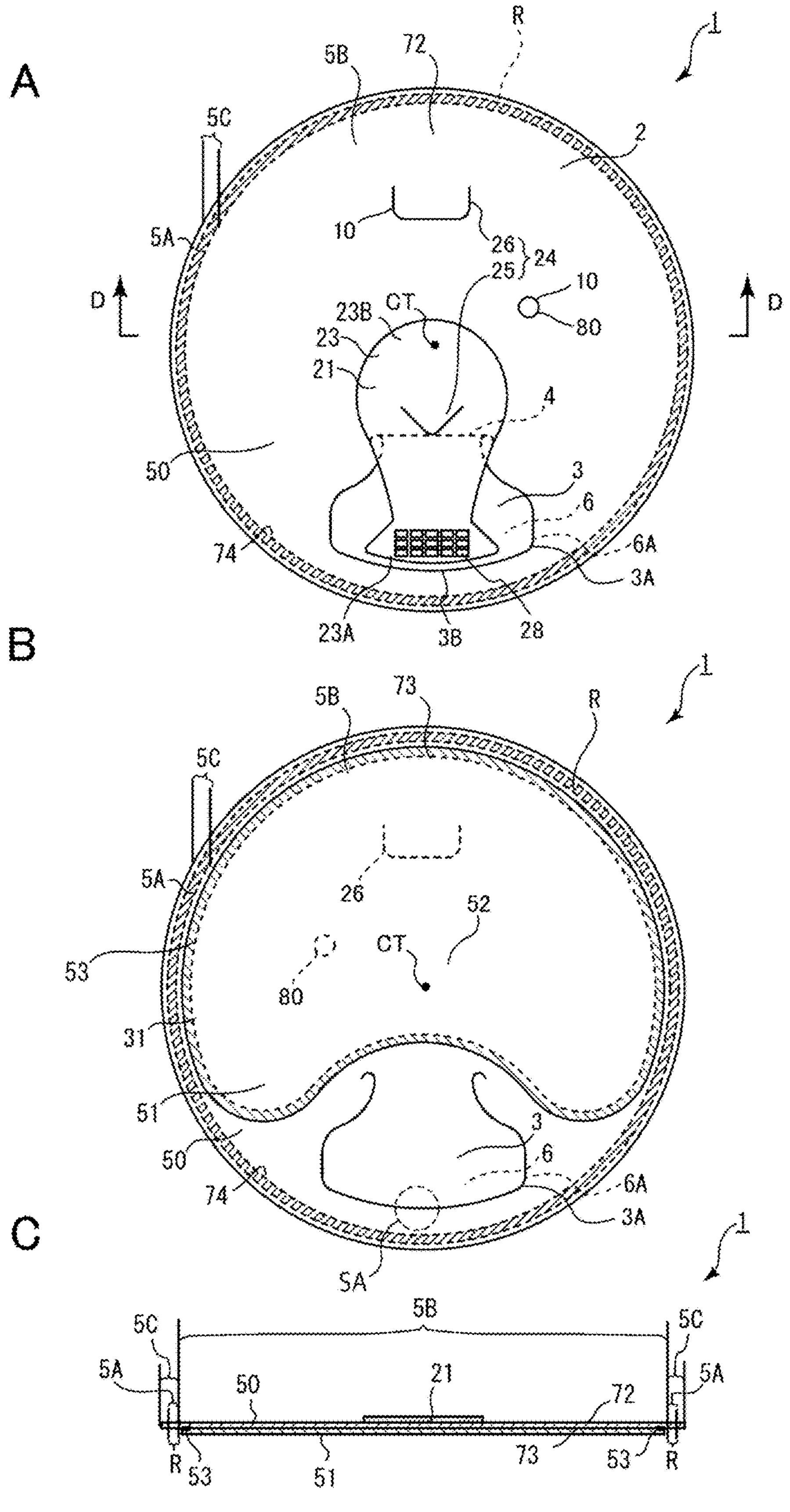
FIG. 5A is a plan view showing an example of a lid according to the second embodiment.
FIG. 5B is a bottom view showing an example of a lid according to the second embodiment.
FIG. 5C is a cross-sectional view schematically showing the state of the D-D line longitudinal section of FIG. 5A.

The small lid part 3 is defined as a portion that can be displaced with respect to the base part 2 when the lid 1 is attached to the container 101. The small lid part 3 may be a different member connected to the base part 2 by the hinge part 4, but as shown in the example of FIG. 5A, the small lid part 3 and the base part 2 may be formed continuously and integrally. However, in the case of being continuous and integral, it includes cases where there is even a slight continuous part between the small lid part 3 and the base part 2, and cases where they are partially cut by the hinge part 4. FIGS. 5A, 5B, and 5C are a plan view, a bottom view, and a cross-sectional view (longitudinal sectional view along line D-D of FIG. 5A) showing an example of the lid according to the second embodiment. The lid 1 according to the second embodiment may be the same as the first embodiment except for the configuration of the base part 2, the small lid part 63, and the hinge part 64. In the description of the second embodiment, the explanation of the parts that overlap with the first embodiment is omitted. It should be noted that in the example of FIG. 5, the formation of the insertion port 12 is omitted in the lid 1 according to the second embodiment, but this is an example, and the formation of the insertion port 12 may be made similarly to the first embodiment.

Figure 6:
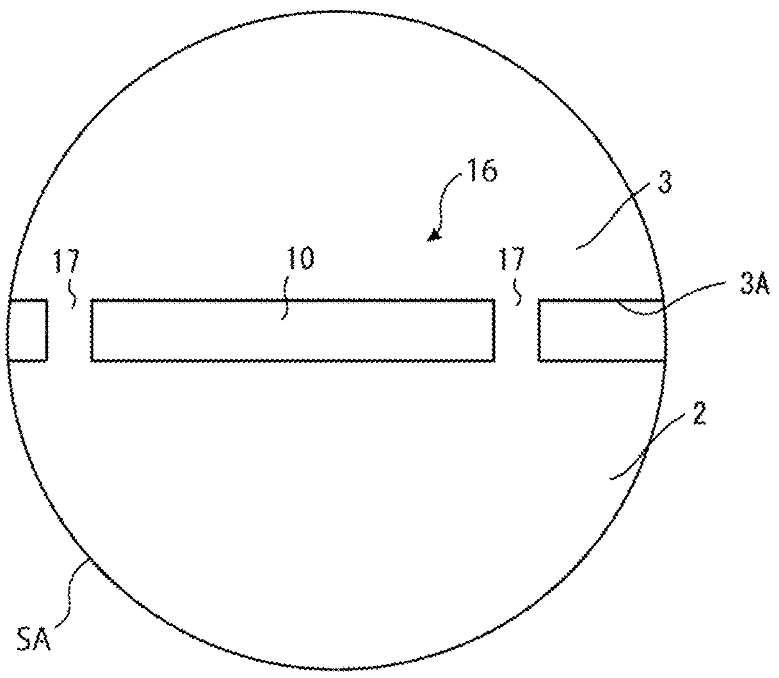
FIG. 6 is a plan view schematically showing an enlarged state of the portion of area SA of FIG. 5B.
Figure 7:
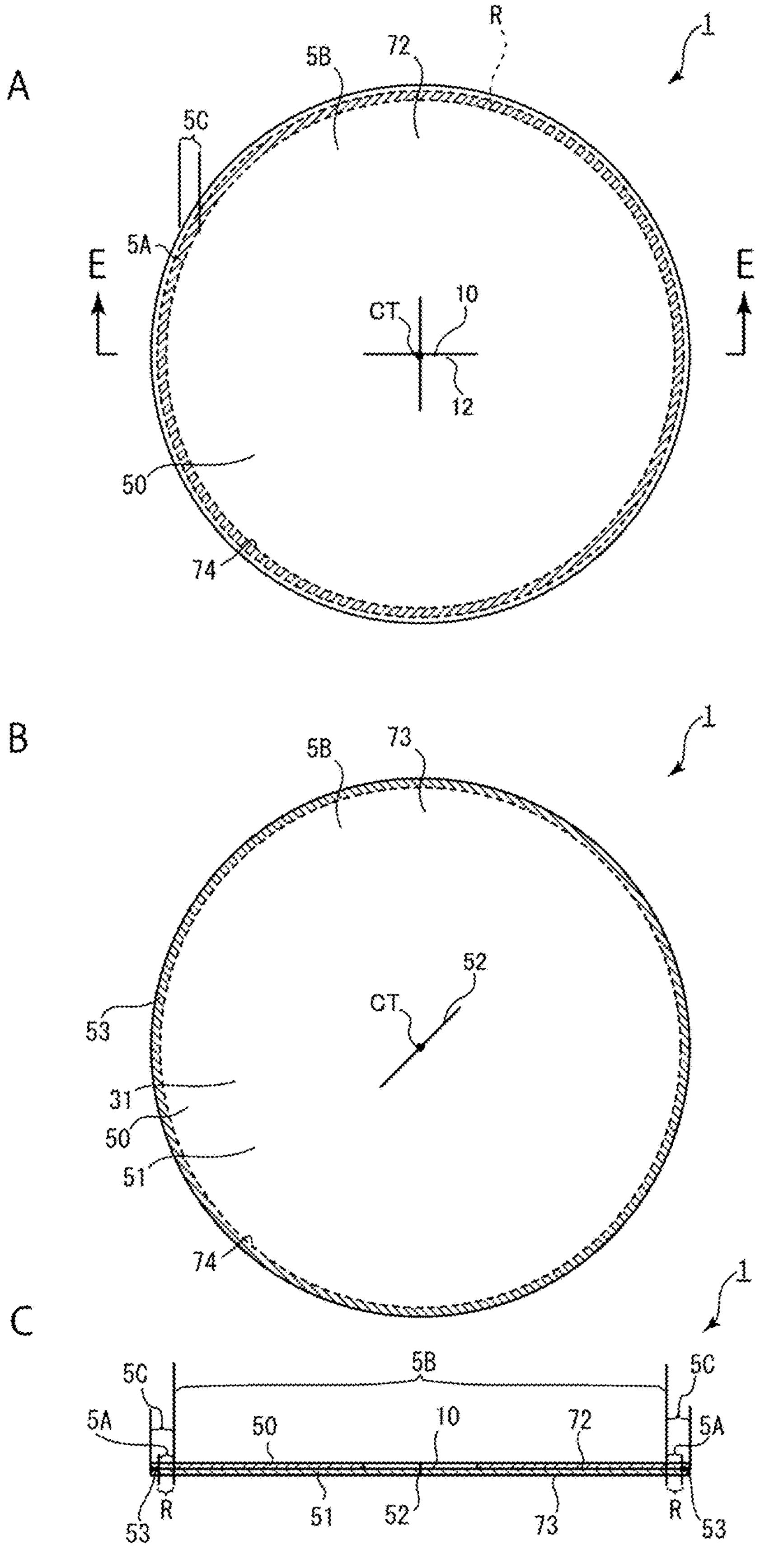
FIG. 7A is a plan view showing an example of a lid according to the first embodiment.
FIG. 7B is a bottom view showing an example of a lid according to the first embodiment.
FIG. 7C is a cross-sectional view schematically showing the state of the E-E line longitudinal section of FIG. 7A.
Figure 8:
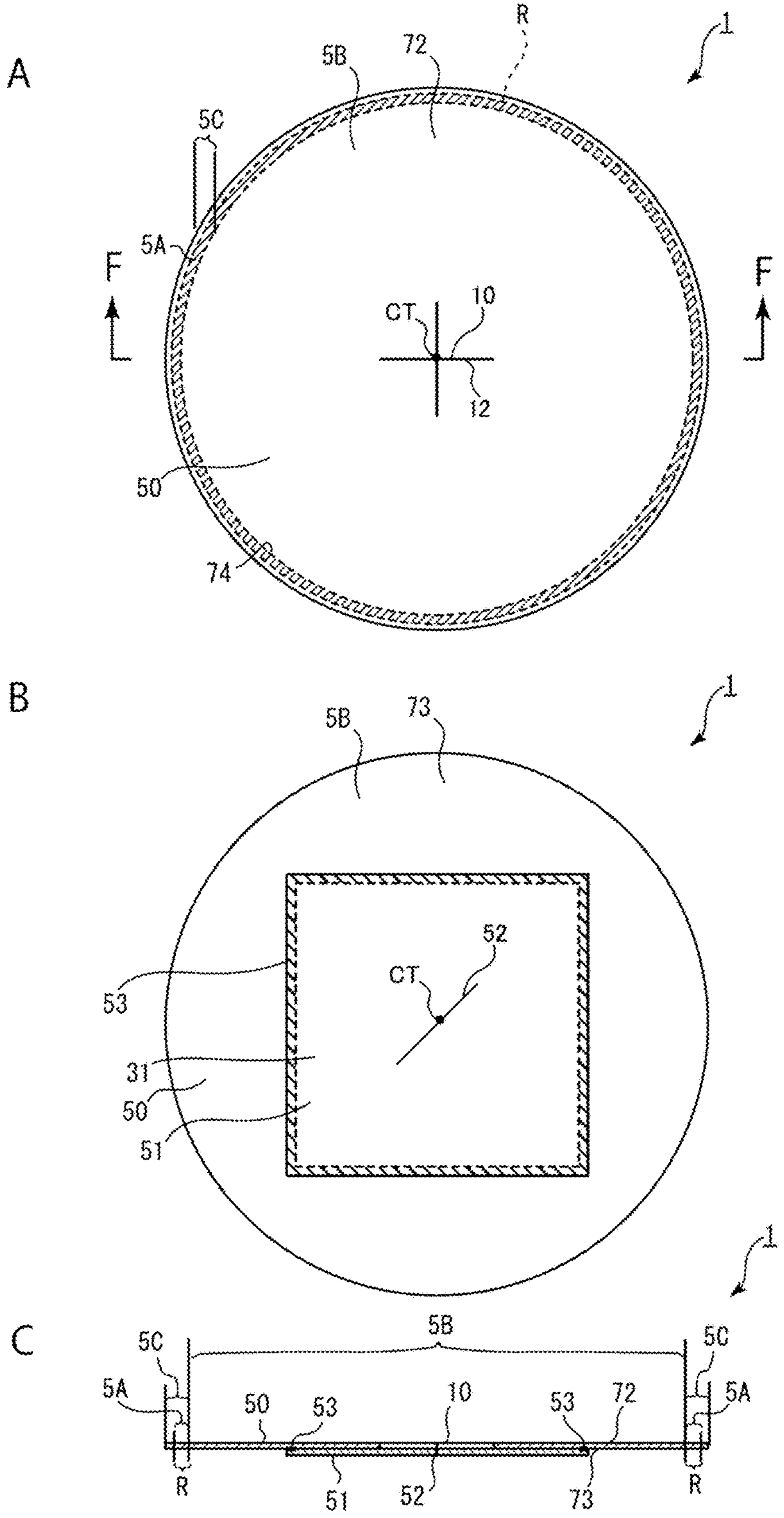
FIG. 8A is a plan view showing an example of a lid according to the first embodiment.
FIG. 8B is a bottom view showing an example of a lid according to the first embodiment.
FIG. 8C is a cross-sectional view schematically showing the state of the F-F line longitudinal section of FIG. 8A.
Figure 9:
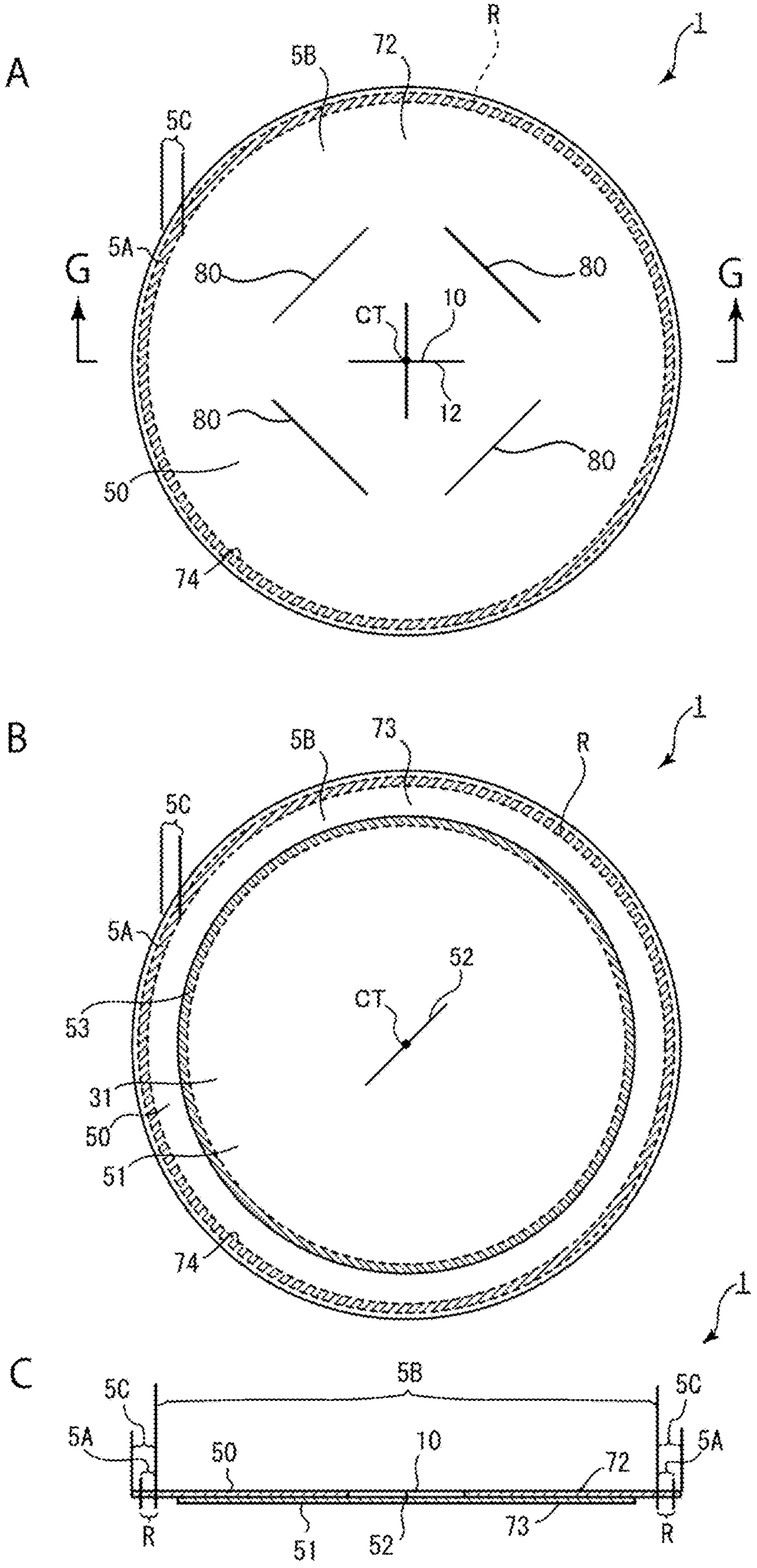
FIG. 9A is a plan view showing an example of a lid according to the first embodiment.
FIG. 9B is a bottom view showing an example of a lid according to the first embodiment.
FIG. 9C is a cross-sectional view schematically showing the state of the G-G line longitudinal section of FIG. 9A.
Figure 10:
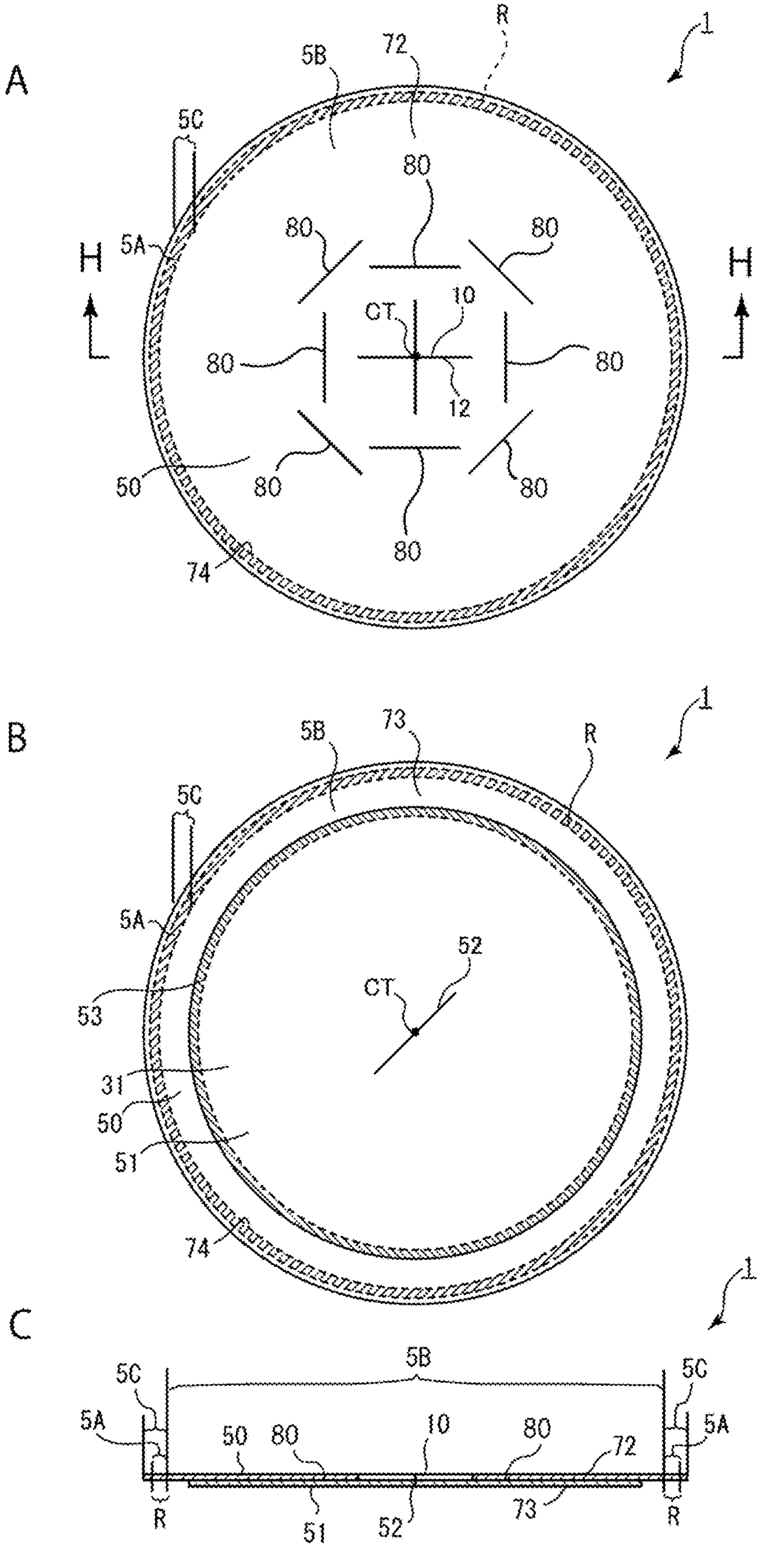
FIG. 10A is a plan view showing an example of a lid according to the first embodiment.
FIG. 10B is a bottom view showing an example of a lid according to the first embodiment.
FIG. 10C is a cross-sectional view schematically showing the state of the H-H line longitudinal section of FIG. 10A.
Figure 11:
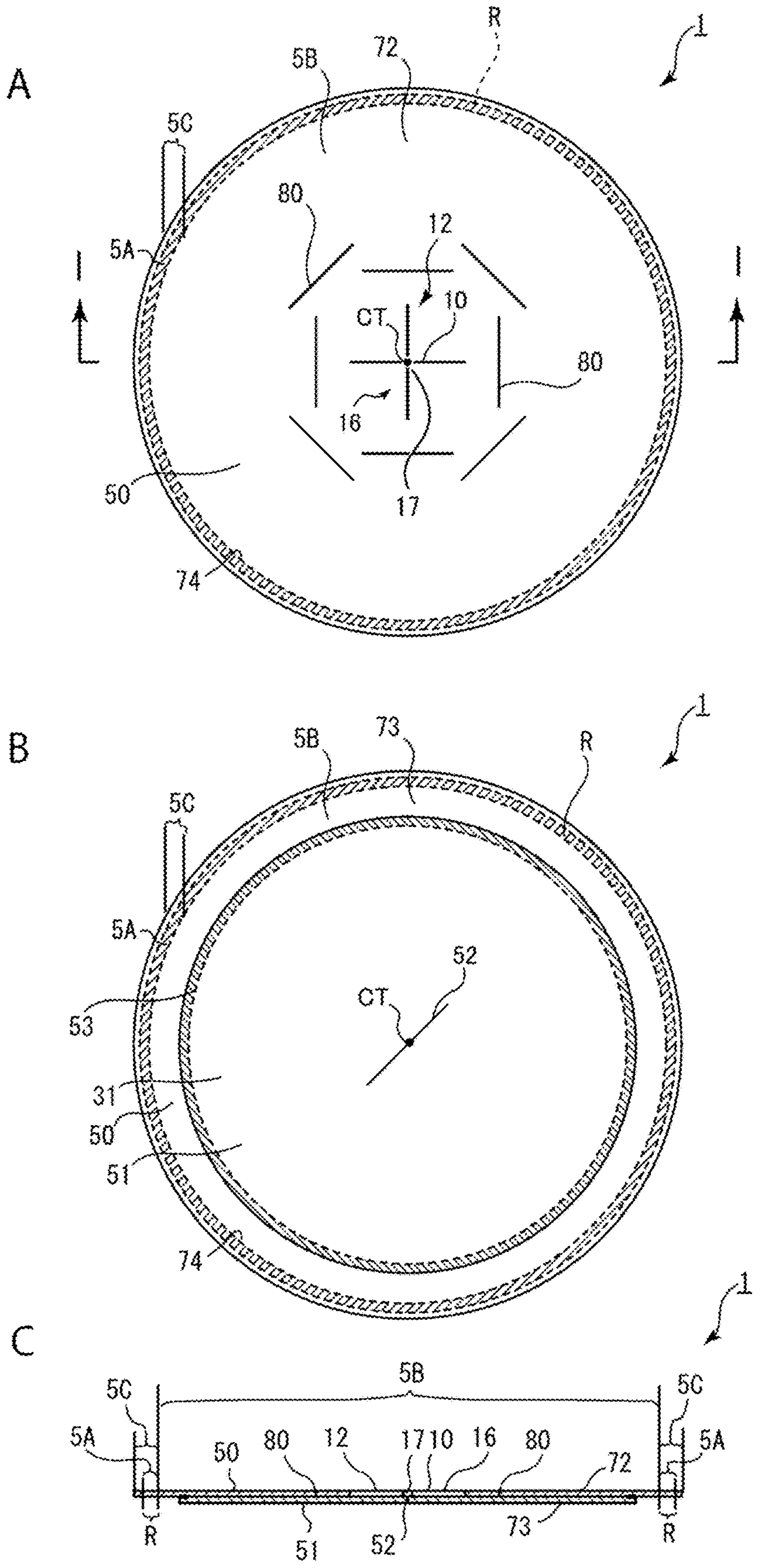
FIG. 11A is a plan view showing an example of a lid according to the first embodiment.
FIG. 11B is a bottom view showing an example of a lid according to the first embodiment.
FIG. 11C is a cross-sectional view schematically showing the state of the I-I line longitudinal section of FIG. 11A.
Figure 12:
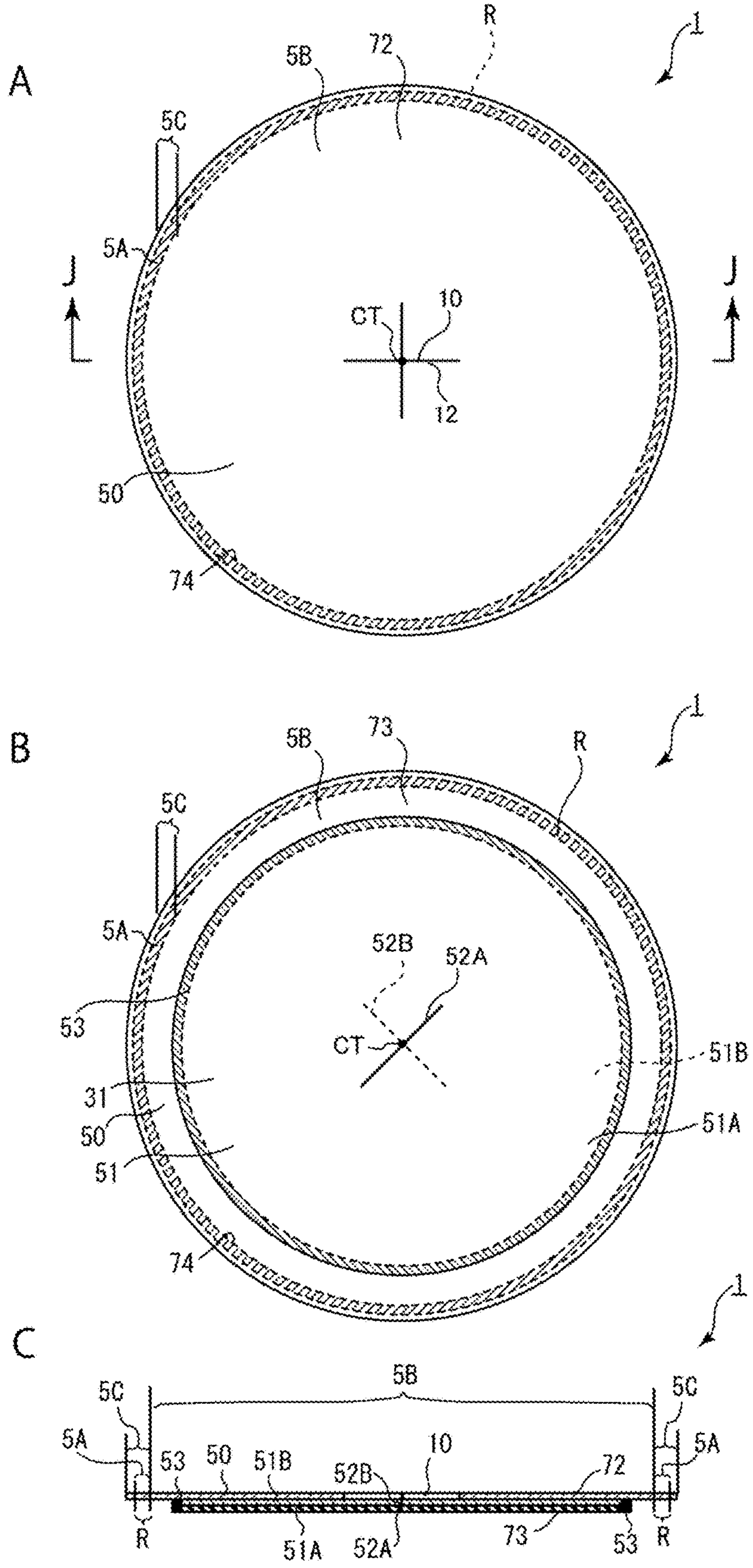
FIG. 12A is a plan view showing an example of a lid according to the first embodiment.
FIG. 12B is a bottom view showing an example of a lid according to the first embodiment.
FIG. 12C is a cross-sectional view schematically showing the state of the J-J line longitudinal section of FIG. 12A.
Figure 13:
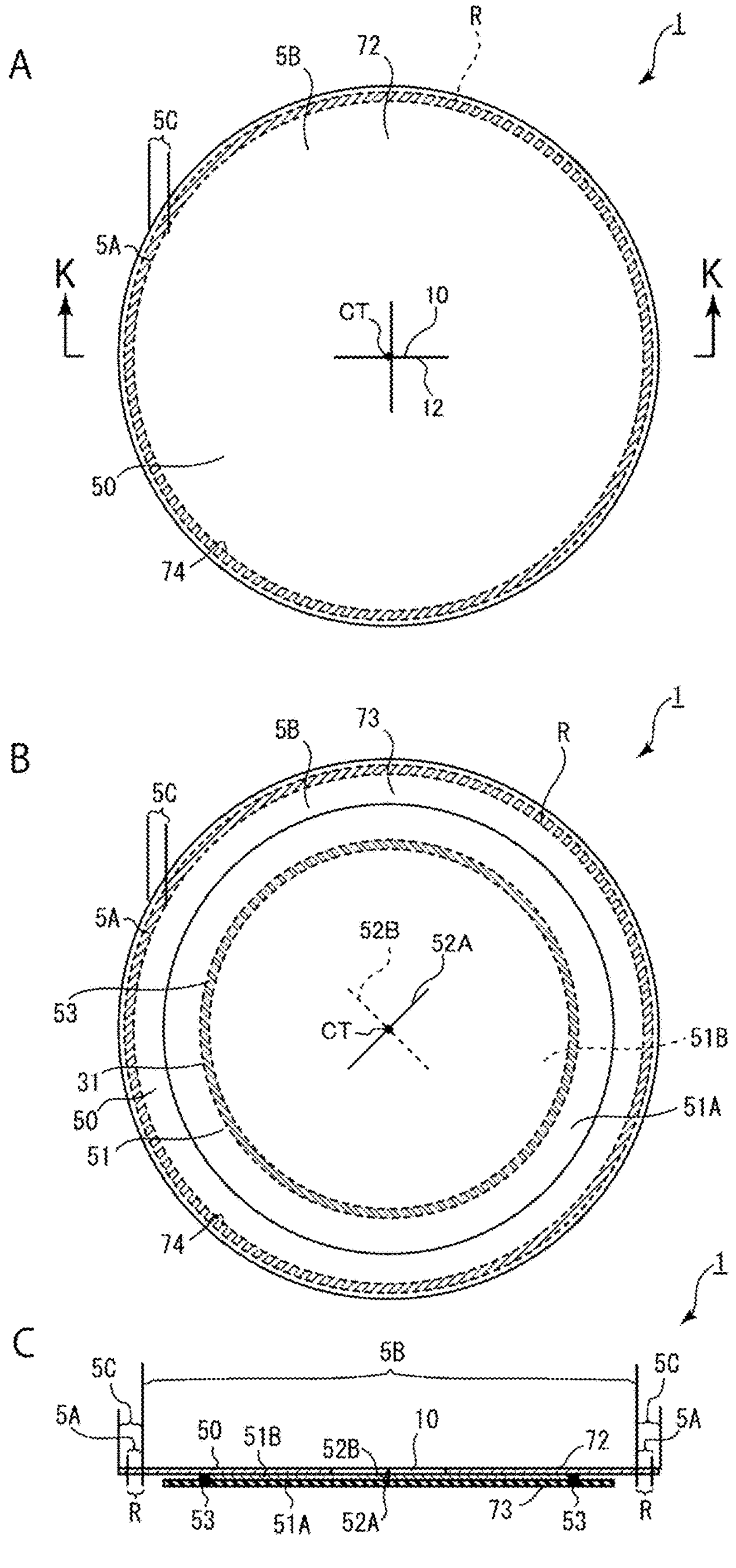
FIG. 13A is a plan view showing an example of a lid according to the first embodiment.
FIG. 13B is a bottom view showing an example of a lid according to the first embodiment.
FIG. 13C is a cross-sectional view schematically showing the state of the K-K line longitudinal section of FIG. 13A.
Figure 14:
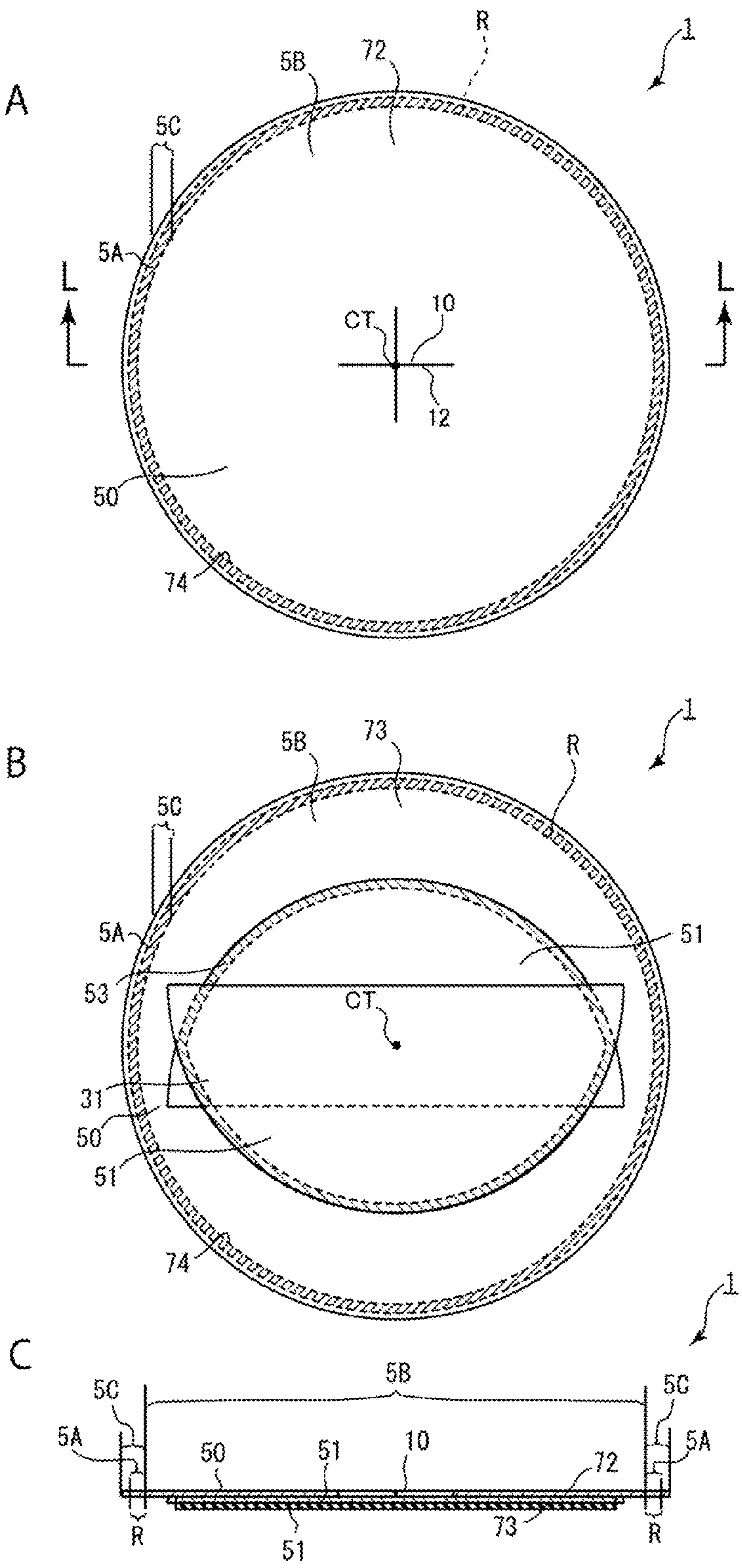
FIG. 14A is a plan view showing an example of a lid according to the first embodiment.
FIG. 14B is a bottom view showing an example of a lid according to the first embodiment.
FIG. 14C is a cross-sectional view schematically showing the state of the L-L line longitudinal section of FIG. 14A.
Figure 15:
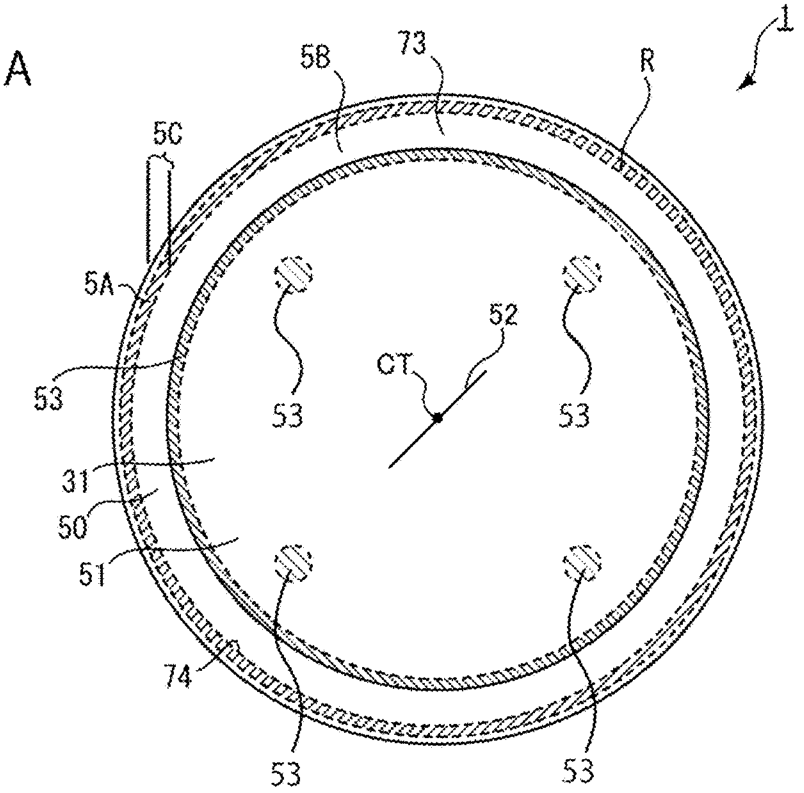
Figure 15:
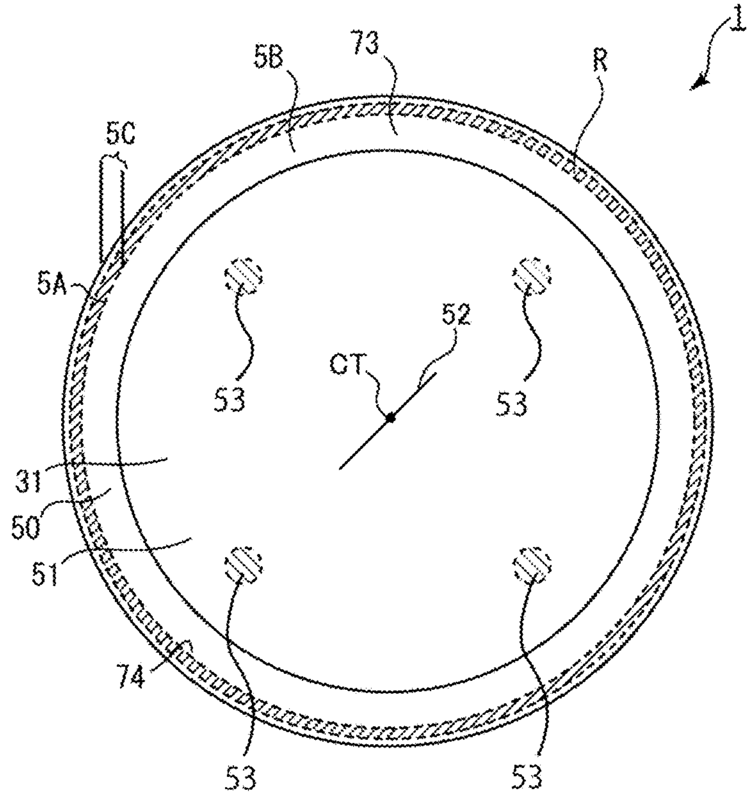

A through part 10 may be formed at the boundary position between the outer peripheral edge 3A of the small lid part 3 and the opening edge 6A of the small opening 6. The through part 10 may be a portion having a structure similar to that described in the second embodiment. At the boundary position between the outer peripheral edge 3A of the small lid part 3 and the opening edge 6A of the small opening 6, instead of the through part 10, a weakened part 16 may be formed as shown in FIG. 6. The weakened part 16 may be a portion having a structure similar to that described in the modification example of the first embodiment (a combination structure of the continuous part 17 and the through part 10).

In the lid 1 of the second embodiment, a knob part 21 may be provided on the upper surface side (exposed surface 72 side) of the small lid part 3. In the example of FIG. 5A, in the state where the small opening 6 is closed by the small lid part 3, the knob part 21 is provided on the upper surface side, which is the exposed surface (exposed surface 72 of the lid 1) side of the small lid part 3. The structure of the knob part 21 is not particularly limited, but it is preferably one that can rotate the small lid part 3 around the hinge part 4, and in the example of FIG. 5A, a tab member 23 is provided as the knob part 21.

(Tab Member)

In the state where the small opening 6 is closed by the small lid part 3, it is preferable that the tab member 23 has one end 23A joined to the small lid part 3 and the other end 23B as a free end. When the other end 23B is a free end, it includes cases where the other end 23B is fixed to the small lid part 3 with a peelable adhesive. The portion of the tab member 23 joined to the small lid part 3 is called the tab joint 28. The material of the tab member 23 may be the same as the material of the lid 1 described in the first embodiment and may be made of a paper-based material.

In the lid 1, the attachment position and direction of the tab member 23 on the small lid part 3 are not particularly limited, but in FIG. 5A, the tab member 23 is joined to the small lid part 3 at a position closer to the tip (i.e., near the front edge 3B) of the small lid part 3.

Various methods such as ultrasonic bonding, heat sealing, and adhesive bonding can be exemplified as methods for joining the tab member 23 to the small lid part 3 (i.e., the method for forming the tab joint 28). As a method for forming the tab joint 28, ultrasonic bonding is preferred from the perspective of ease of bonding and bonding strength among the aforementioned methods.

In the lid 1 according to the second embodiment, as shown in the examples of FIGS. 5A and 5B, it may have a holding structure forming part 24 that forms a holding structure to keep the small lid part 3 in an open state of the small opening 6 by rotating the small lid part 3 around the hinge part 4 relative to the base part 2.

(Holding Structure Forming Part)

The configuration of the holding structure forming part 24 is not particularly limited. For example, in the example of the lid 1 shown in FIG. 5A, the claw part 25 and the receiving part 26 form the holding structure forming part 24.

(Claw Part)

The claw part 25 may be any part that has a structure capable of being locked by hooking or inserting into the receiving part 26, which will be described later. In the example of FIG. 5A, the claw part 25 is provided on the tab member 23 as an example of the knob part 21. In this example, the claw part 25 is formed by a cut-out portion formed in a generally mountain-shaped contour at a predetermined position of the tab member 23. It should be noted that the claw part 25 in FIG. 5 is an example, and the configuration of the claw part 25 is not limited to this. The concept of the claw part 25 may include shapes different from the example in FIG. 5 and capable of being hooked or inserted into the receiving part 26.

(Receiving Part)

The receiving part 26 is formed in a shape that allows the claw part 25 to be hooked or inserted. In the example of FIG. 5A, the receiving part 26 is a through part 10 formed at a predetermined position of the base part 2. The through part 10 may have a structure similar to that described in the first embodiment. The receiving part 26 is formed in a position where it can face the claw part 25 when the tab member 23 is displaced to rotate the small lid part 3 around the hinge part 4 or its vicinity as an axis.

(Formation of Holding Structure)

In the example of FIG. 5A, when raising the small lid part 3 in the lid 1, the knob part 21 is lifted. At this time, by lifting the tab member 23 and bending or twisting a predetermined portion of the free end side (the other end 23B side) of the tab member 23, the claw part 25 takes a shape protruding downward or upward. Then, the tab member 23 is displaced to rotate the small lid part 3 until the claw part 25 of the small lid part 3 reaches a position facing the receiving part 26 or a position near that position. Then, the claw part 25 of the tab member 23 is hooked or inserted into the receiving part 26. This forms a holding structure that holds the small lid part 3 in a state where the small opening 6 is exposed.

In the above description, the case where the holding structure forming part 24 has the through part 10 formed as the receiving part 26 was explained, but the structure corresponding to the receiving part 26 is not limited to the through part 10.

(Vent Hole)

In the lid 1 according to the second embodiment, as shown in the examples of FIGS. 5A and 5B, a vent hole 80 may be formed at a predetermined position inside the lid region corresponding part 5B. The vent hole 80 can function as a steam vent hole when a high-temperature liquid such as hot coffee is contained inside the container 101. The vent hole 80 may be a perforated hole opened by a needle-like member or a punched hole corresponding to the contour shape of the vent hole 80. The vent hole 80 is not limited to functioning as a steam vent hole and may widely function as a gas vent hole for releasing gases such as carbon dioxide.

(Installation Area of Breathable Sheet)

Regarding the installation area of the breathable sheet 51 on the main body 50, as in the first embodiment, at least a part of at least one surface of the breathable sheet 51 faces at least a part of the surface of the lid region corresponding part 5B that faces the container 101 (the surface facing in the same direction as the opposite surface 73 of the lid 1).

In the example of FIG. 5A, the breathable sheet 51 is provided to cover the lid region corresponding part 5B while avoiding the small lid part 3, and is provided to cover the vent hole 80 and the receiving part 76. The vent hole 80 is opened to a size that makes it easier for steam to be discharged than between the small lid part 3 and the small opening 6, making it easy for liquid leakage to occur along with the steam. Therefore, by providing the breathable sheet 51 to cover the vent hole 80, it is possible to suppress the risk of liquid leaking along with the steam while maintaining the state where steam is discharged from the vent hole 80.

2-2. Operation and Effect

In the lid 1 according to the second embodiment, the same effect as the first embodiment can be obtained.

Next, a modification of the second embodiment will be described.

2-3. Modification

Modification 1

In the lid 1 according to the second embodiment, as shown in FIGS. 17A to 17C, the tab member 23 serving as the knob part 21 may be omitted. Such a form is referred to as Modification 1 of the second embodiment. FIGS. 17A to 17C are a plan view, a bottom view, and a cross-sectional view showing an example of the lid 1 according to Modification 1 of the second embodiment, respectively.

Figure 19:
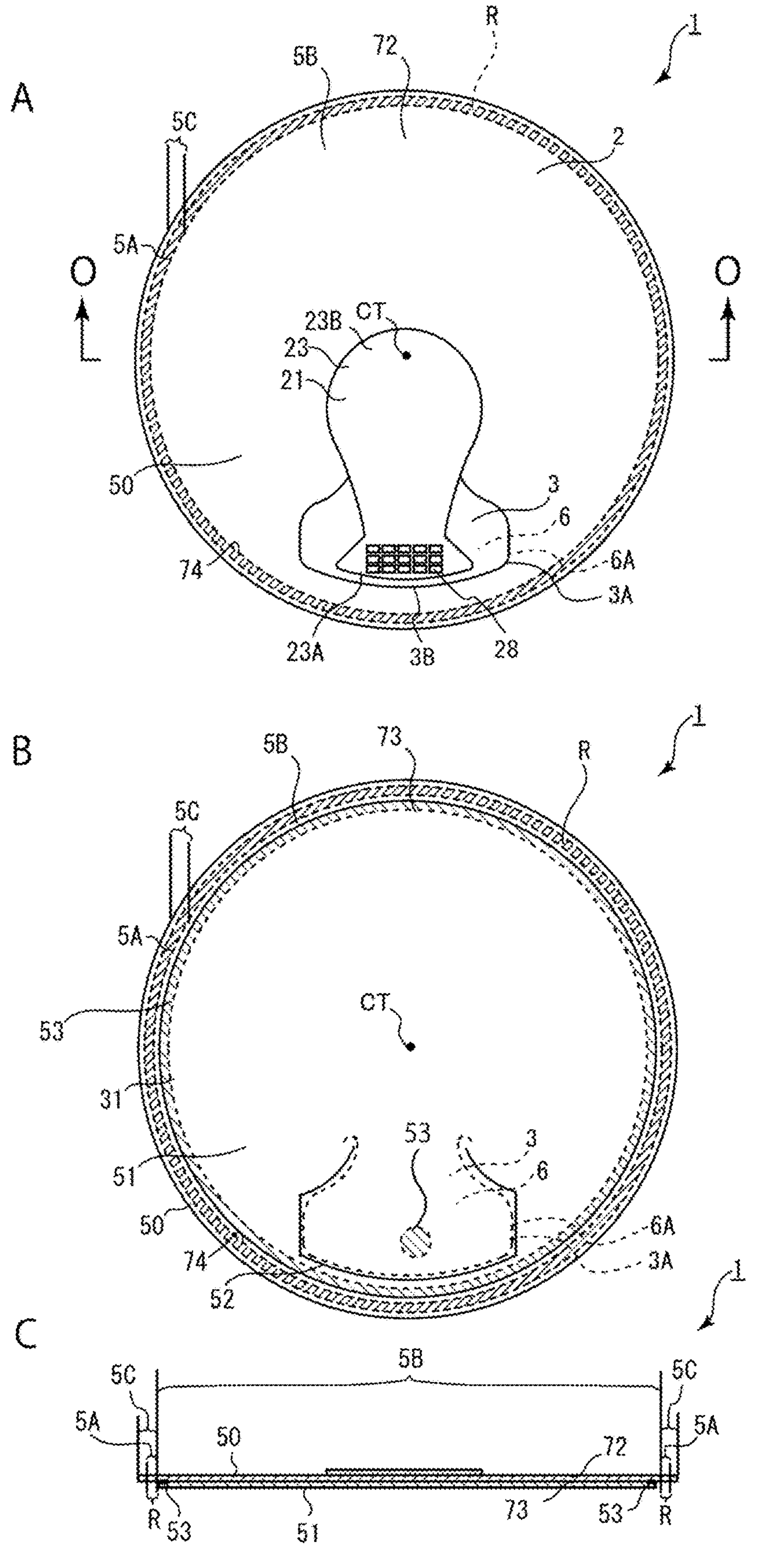
FIG. 19A is a plan view showing an example of a lid according to the second embodiment.
FIG. 19B is a bottom view showing an example of a lid according to the second embodiment.
FIG. 19C is a cross-sectional view schematically showing the state of the O-O line longitudinal section of FIG. 19A.

In the example of FIGS. 17A to 17C, the breathable sheet 51 is formed to cover the small lid part 3. In the previously mentioned FIG. 5B, it is illustrated that the breathable sheet 51 does not have a notch portion 52, but when the lid 1 has an opening forming part, it is preferable that the notch portion 52 is formed along the opening edge 6A of the small opening 6 (along the outer peripheral edge 3A of the small lid part 3) as shown in FIG. 17B. It should be noted that the notch portion 52 may be formed slightly outside the outer peripheral edge 3A of the small lid part 3 (at a position shifted from the position overlapping the boundary of the outer peripheral edge 3A of the small lid part 3 and the opening edge 6A of the small opening 6). In the examples shown in FIGS. 17B and 17C, it is preferable that the breathable sheet 51 is joined to the small lid part 3 (a joint part 53 is formed). The preference for the breathable sheet 51 being joined to the small lid part 3 is the same for each example shown in FIGS. 19B, 21B, and 23B. In the example of FIG. 19, the joint part 53 is described.

In Modification 1 of the second embodiment, in the examples shown in FIGS. 17B and 17C, the breathable sheet 51 covers the small lid part 3, but this is an example, and as shown in FIGS. 18A to 18C, the breathable sheet 51 may be formed to avoid the small lid part 3. FIGS. 18A to 18C are a plan view, a rear view, and a cross-sectional view showing another example of the lid 1 according to Modification 1 of the second embodiment, respectively.

In FIG. 18B, the breathable sheet 51 is formed to avoid the small lid part 3. In this case, the shape of the breathable sheet 51 is not particularly limited as long as it can be arranged in the part avoiding the small lid part 3, but it is preferable that it is a shape that covers up to the vicinity of the boundary between the outer peripheral edge 3A of the small lid part 3 and the opening edge 6A of the small opening 6.

Figure 17:
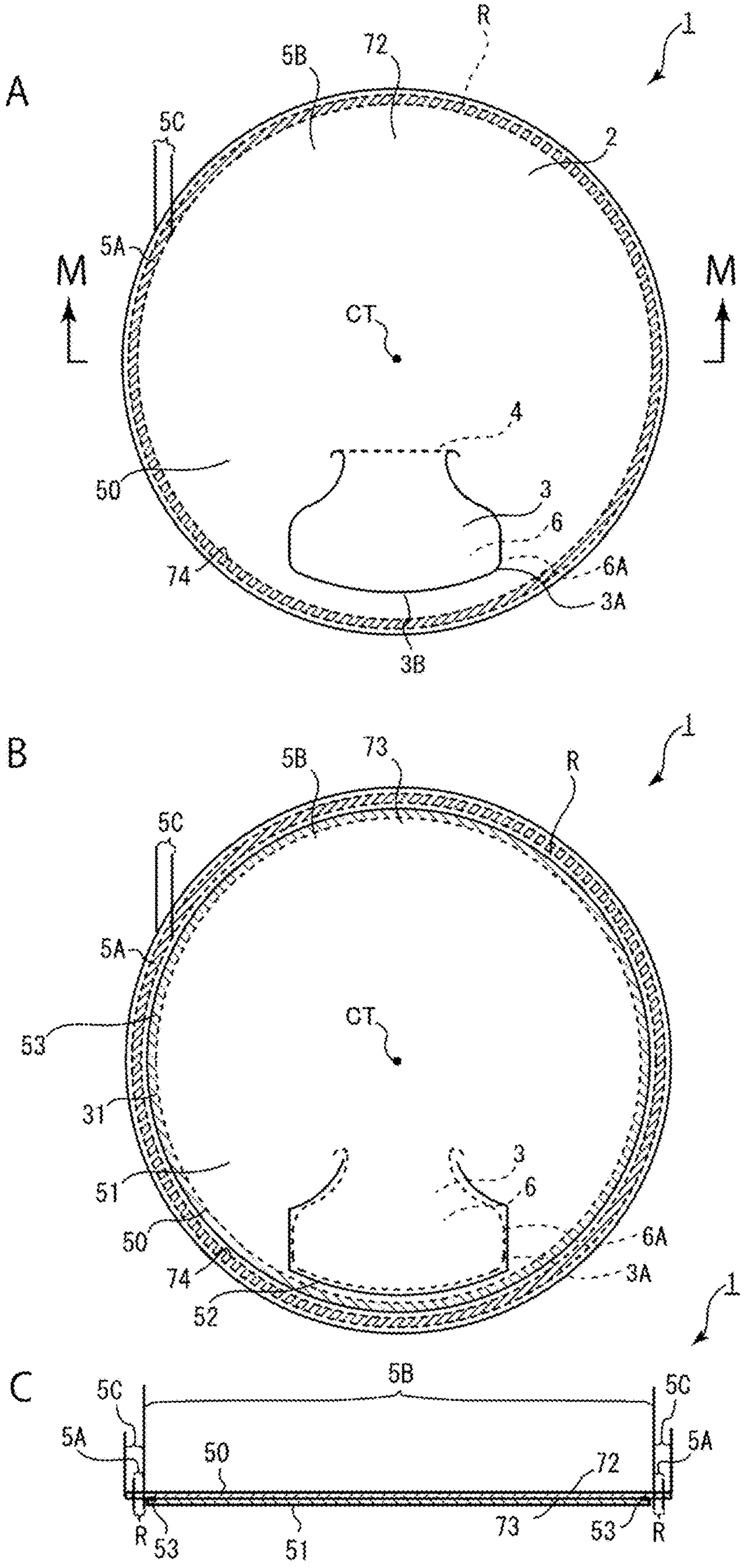
Figure 18:
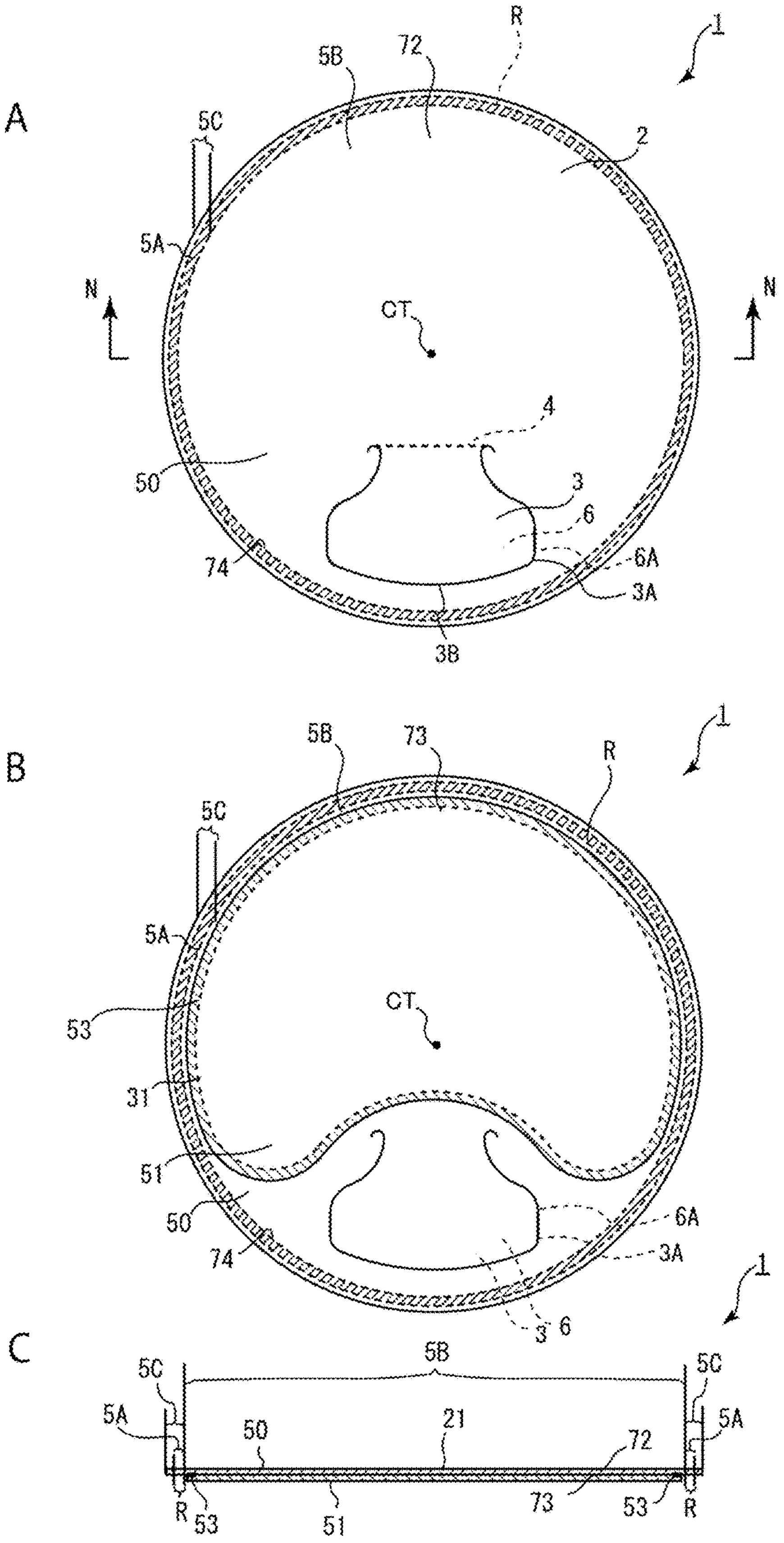
FIG. 18A is a plan view showing an example of a lid according to the second embodiment.
FIG. 18B is a bottom view showing an example of a lid according to the second embodiment.
FIG. 18C is a cross-sectional view showing the state of the N-N line longitudinal section of FIG. 18A.

In the examples of FIGS. 17 and 18, the vent hole 80 is omitted, but this is an example, and the vent hole 80 may be formed in Modification 1 of the second embodiment as well.

Modification 2

In the lid 1 according to Modification 1 of the second embodiment, as shown in FIGS. 19A to 19C, the knob part 21 may be provided. Such a form is referred to as Modification 2 of the second embodiment. FIGS. 19A to 19C are a plan view, a bottom view, and a cross-sectional view showing an example of the lid 1 according to Modification 2 of the second embodiment, respectively. In the example of FIG. 19A, the tab member 23 is provided as the knob part 21. In FIG. 19B, the breathable sheet 51 is formed to cover the small lid part 3. The breathable sheet 51 may be formed in the same manner as described in Modification 1 of the second embodiment. It is preferable that the breathable sheet 51 has a notch portion 52 formed as shown in FIG. 19B.

In Modification 2 of the second embodiment, in the examples shown in FIGS. 19B and 19C, the breathable sheet 51 covers the small lid part 3, but this is an example, and as shown in FIGS. 20A to 20C, the breathable sheet 51 may be formed to avoid the small lid part 3. FIGS. 20A to 20C are a plan view, a bottom view, and a cross-sectional view showing another example of the lid 1 according to Modification 2 of the second embodiment, respectively.

Figure 20:
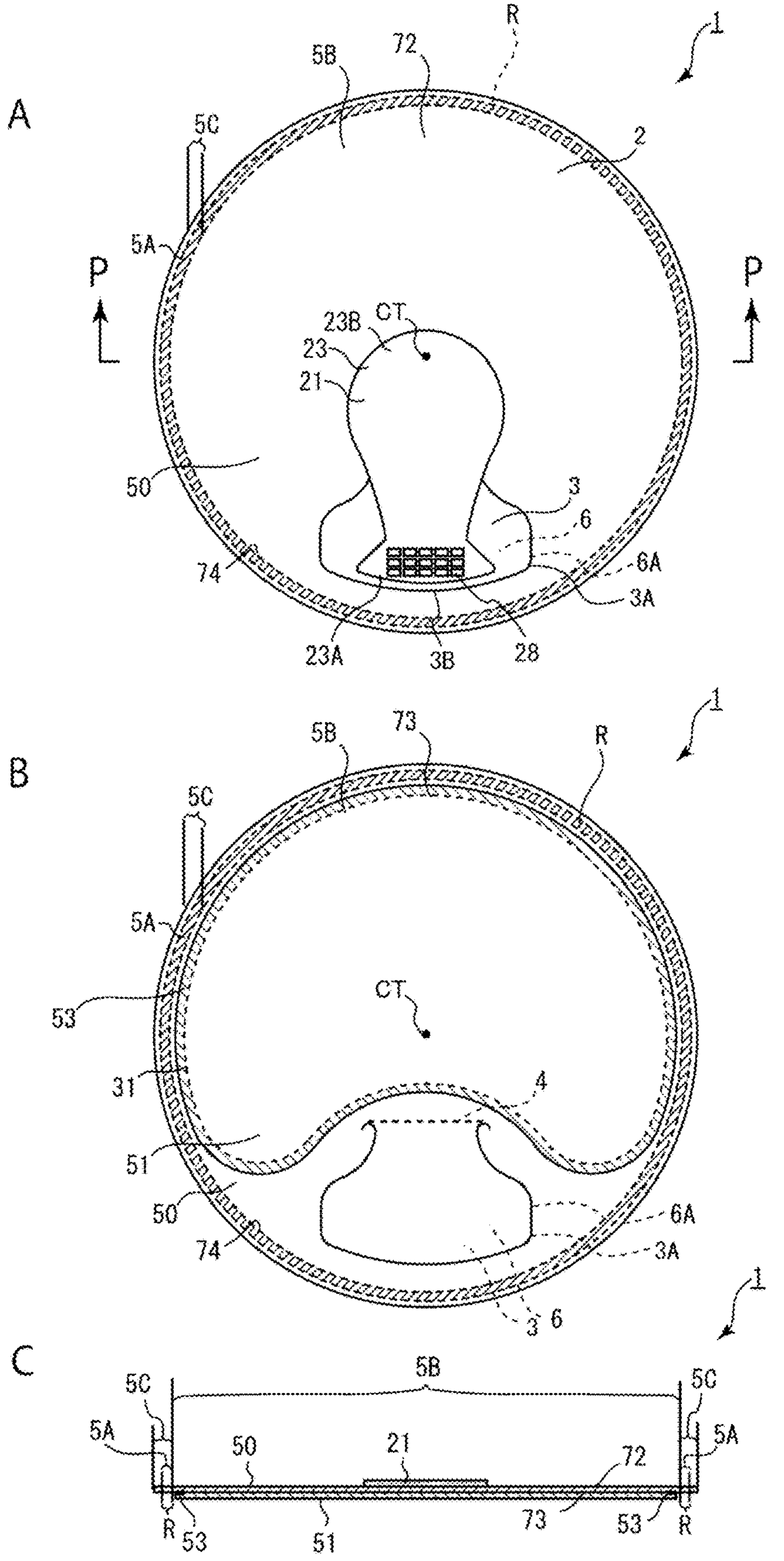
FIG. 20A is a plan view showing an example of a lid according to the second embodiment.
FIG. 20B is a bottom view showing an example of a lid according to the second embodiment.
FIG. 20C is a cross-sectional view schematically showing the state of the P-P line longitudinal section of FIG. 20A.
Figure 21:
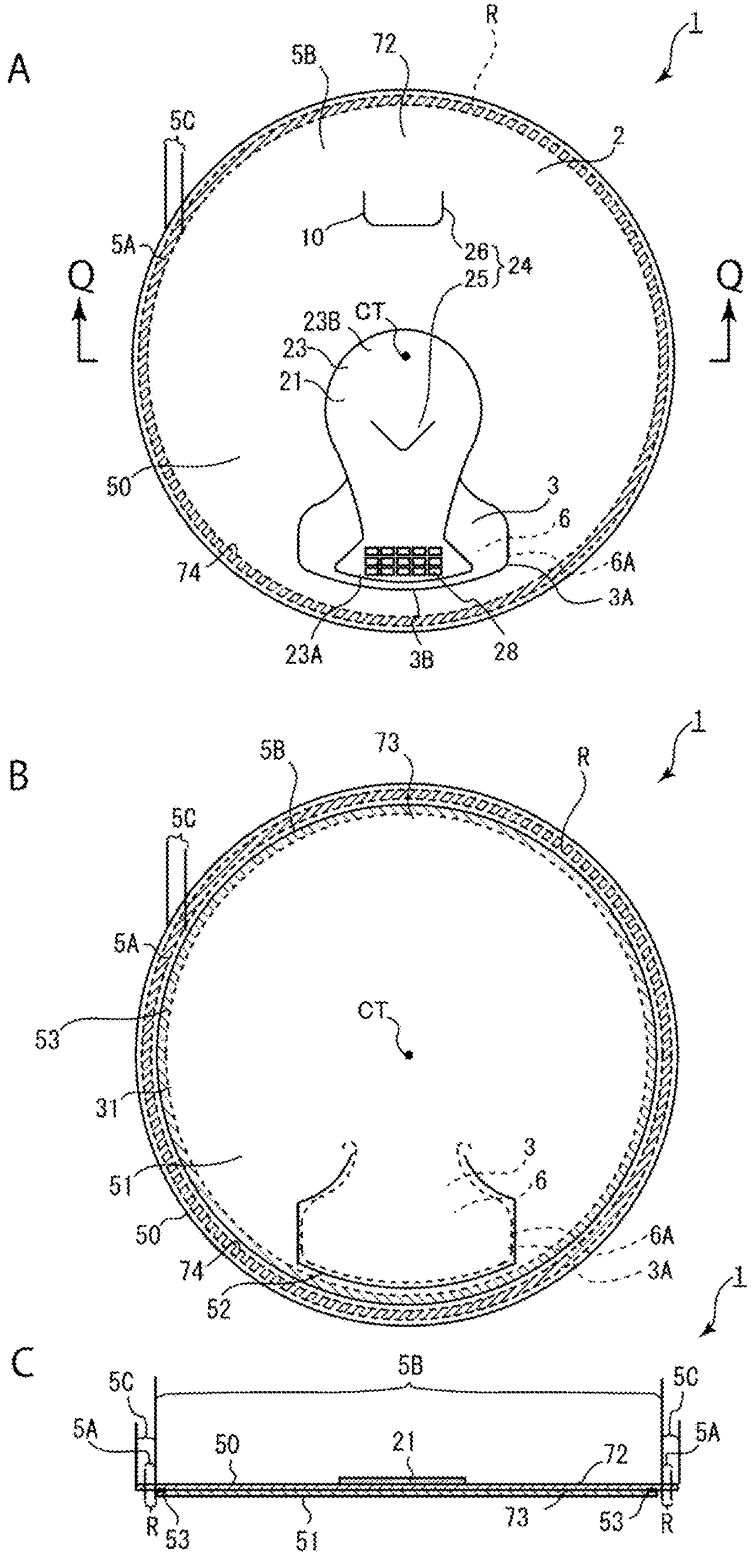
FIG. 21A is a plan view showing an example of a lid according to the second embodiment.
FIG. 21B is a bottom view showing an example of a lid according to the second embodiment.
FIG. 21C is a cross-sectional view schematically showing the state of the Q-Q line longitudinal section of FIG. 21A.
Figure 22:
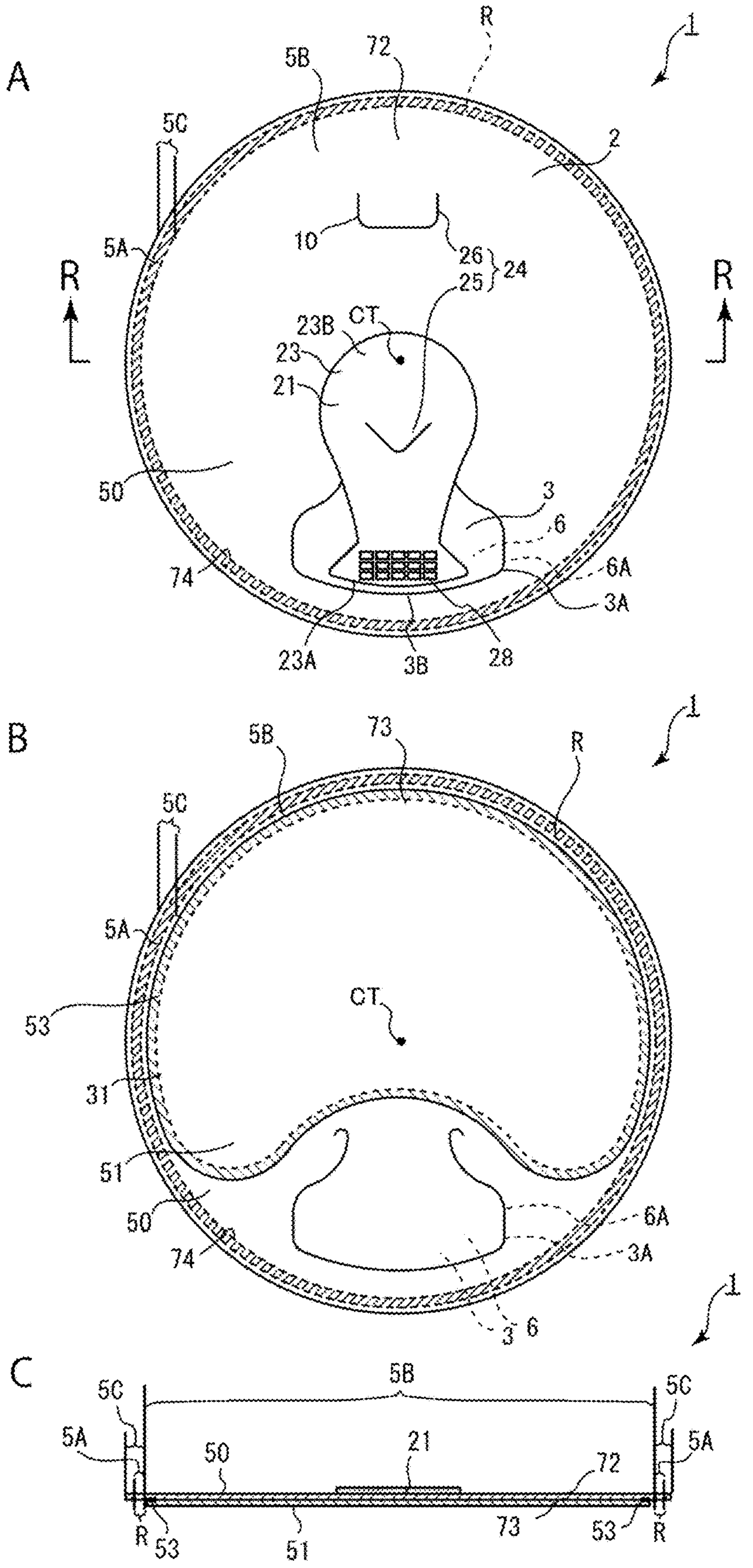
FIG. 22A is a plan view showing an example of a lid according to the second embodiment.
FIG. 22B is a bottom view showing an example of a lid according to the second embodiment.
FIG. 22C is a cross-sectional view schematically showing the state of the R-R line longitudinal section of FIG. 22A.
Figure 23:
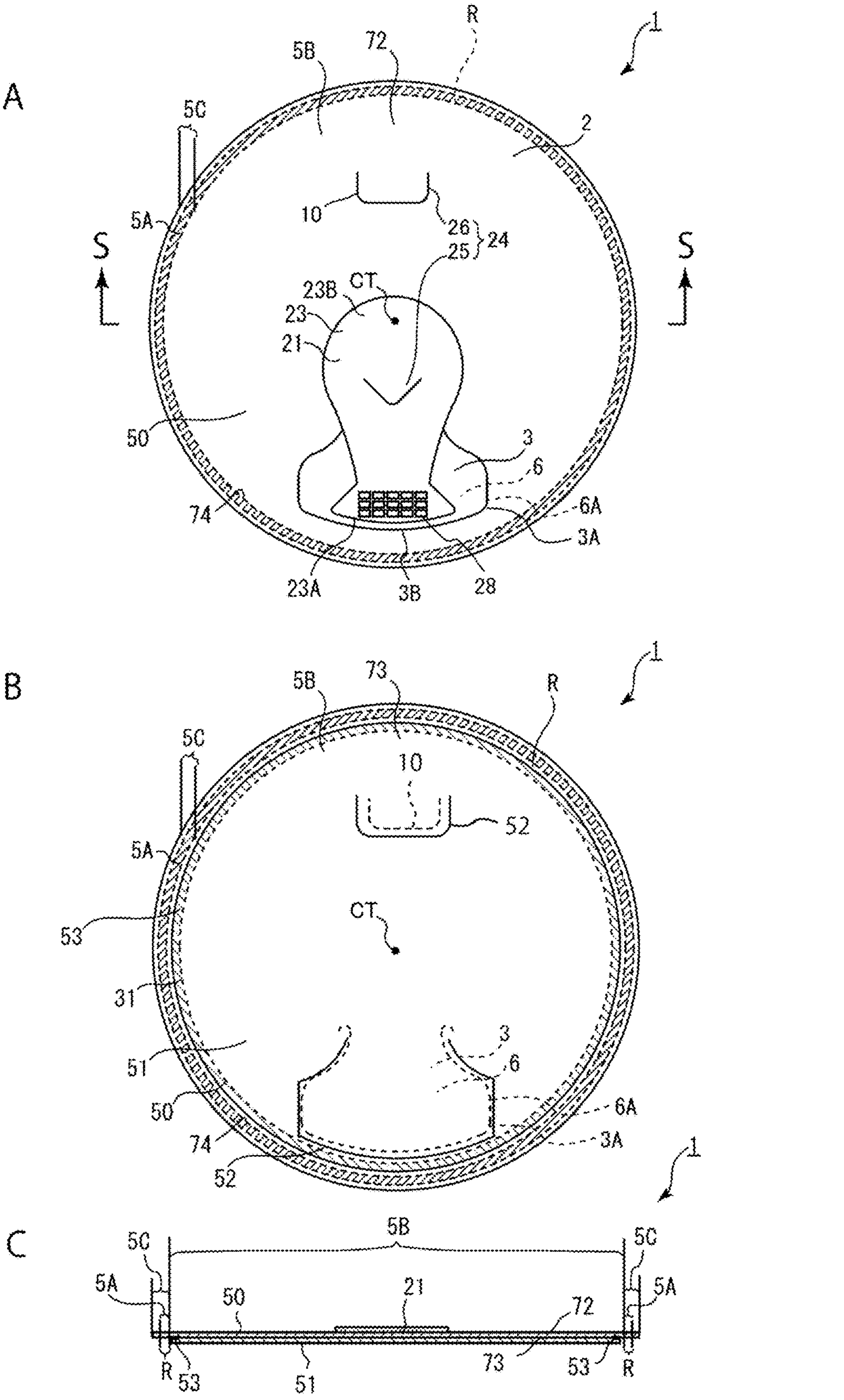
FIG. 23A is a plan view showing an example of a lid according to the second embodiment.
FIG. 23B is a bottom view showing an example of a lid according to the second embodiment.
FIG. 23C is a cross-sectional view schematically showing the state of the S-S line longitudinal section of FIG. 23A.
Figure 24:
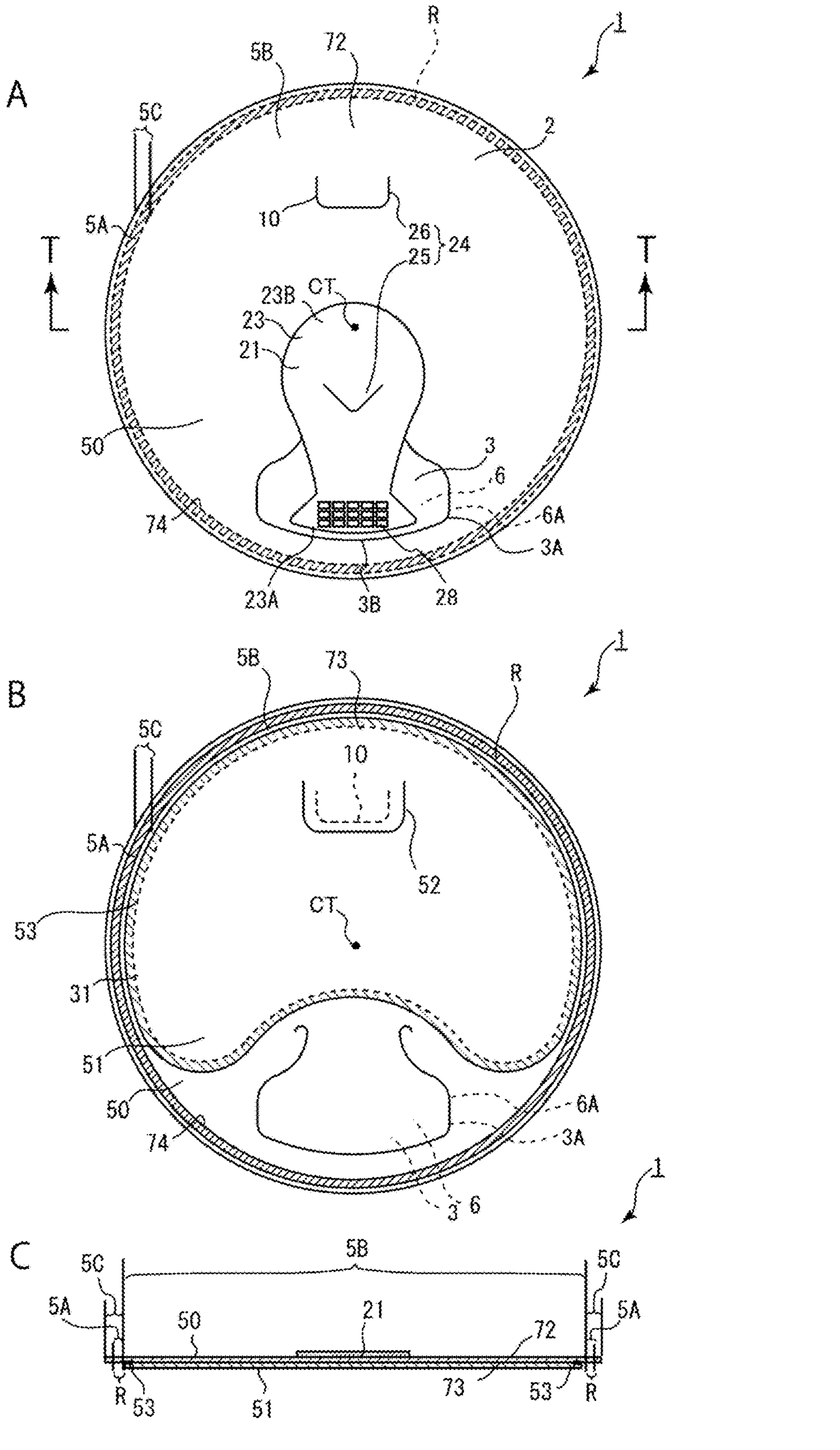
FIG. 24A is a plan view showing an example of a lid according to the second embodiment.
FIG. 24B is a bottom view showing an example of a lid according to the second embodiment.
FIG. 24C is a cross-sectional view schematically showing the state of the T-T line longitudinal section of FIG. 24A.
Figure 25:
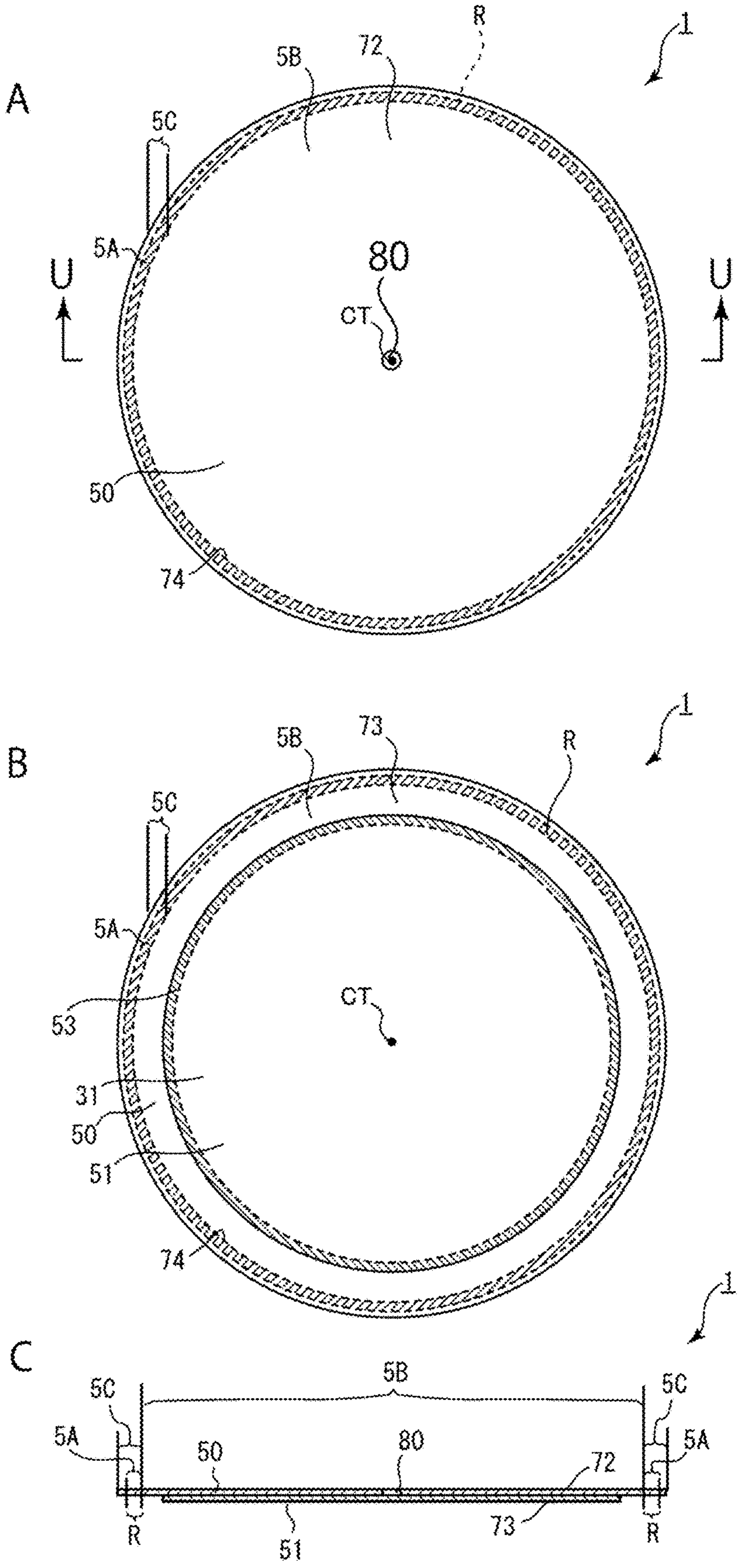
FIG. 25A is a plan view showing an example of a lid according to the fourth embodiment.
FIG. 25B is a bottom view showing an example of a lid according to the fourth embodiment.
FIG. 25C is a cross-sectional view schematically showing the state of the U-U line longitudinal section of FIG. 25A.
Figure 26:
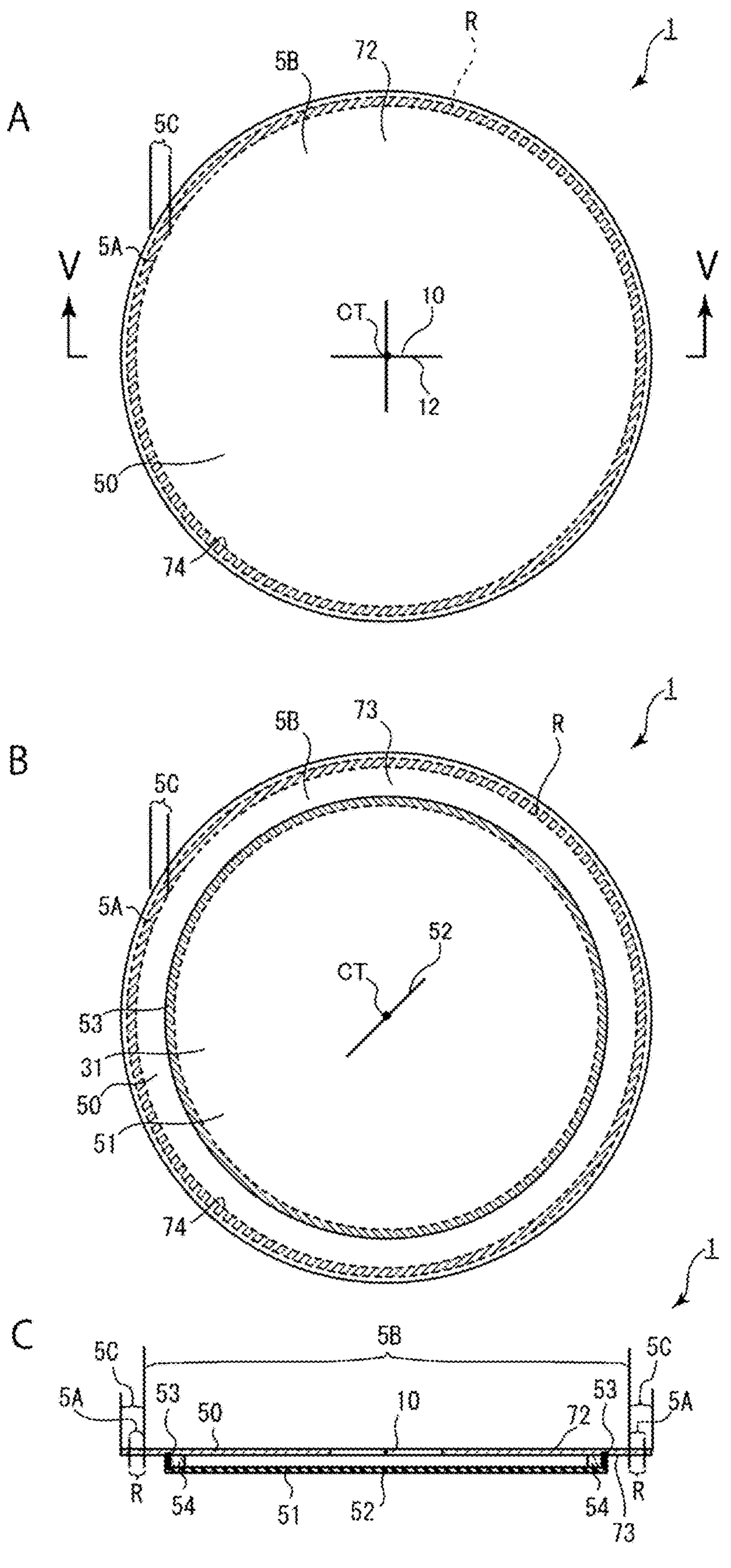
FIG. 26A is a plan view showing an example of a lid according to the fifth embodiment.
FIG. 26B is a bottom view showing an example of a lid according to the fifth embodiment.
FIG. 26C is a cross-sectional view schematically showing the state of the V-V line longitudinal section of FIG. 26A.
Figure 27:
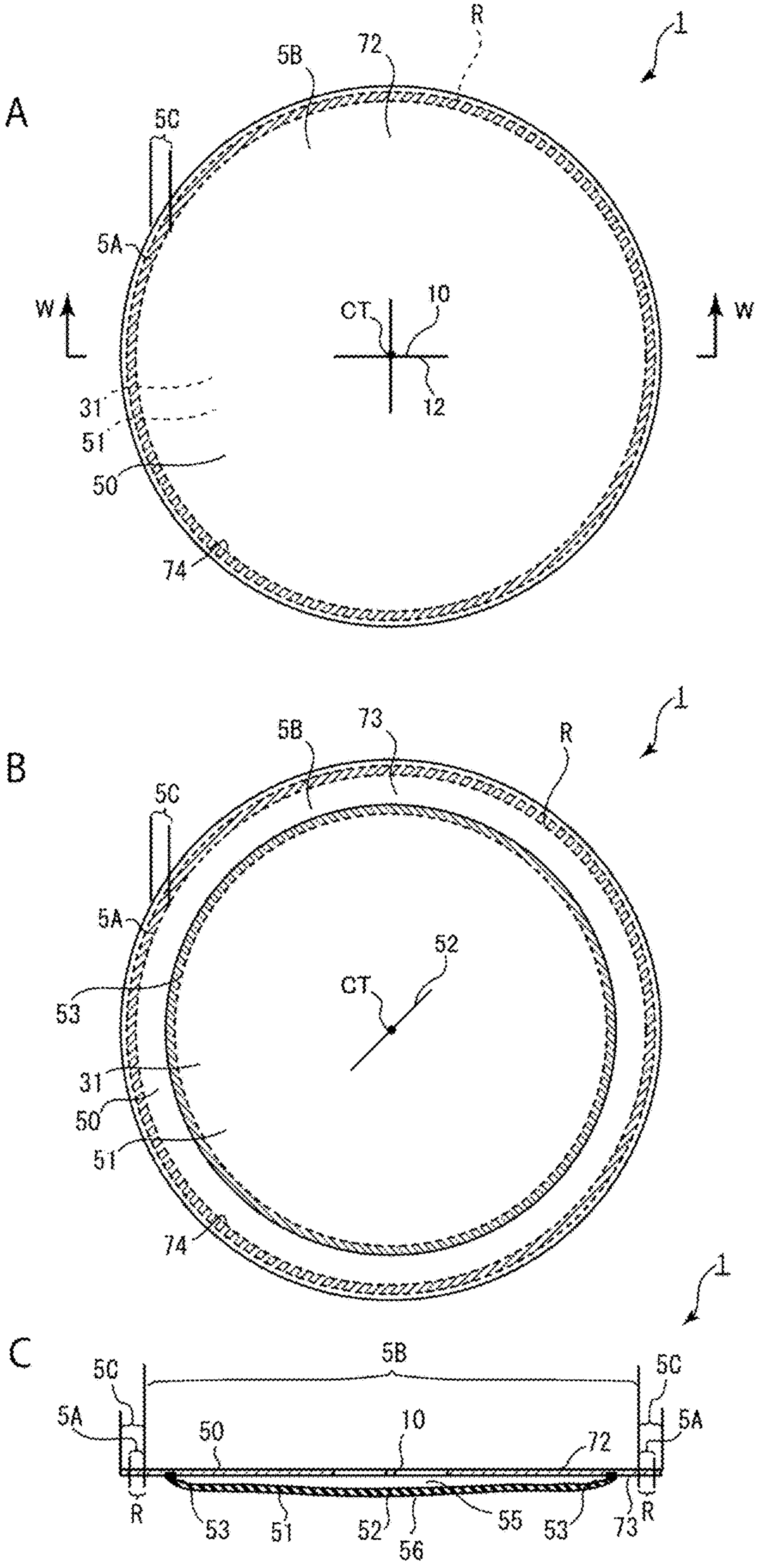
FIG. 27A is a plan view showing an example of a lid according to the first embodiment.
FIG. 27B is a bottom view showing an example of a lid according to the first embodiment.
FIG. 27C is a cross-sectional view schematically showing the state of the W-W line longitudinal section of FIG. 27A.
Figure 28:
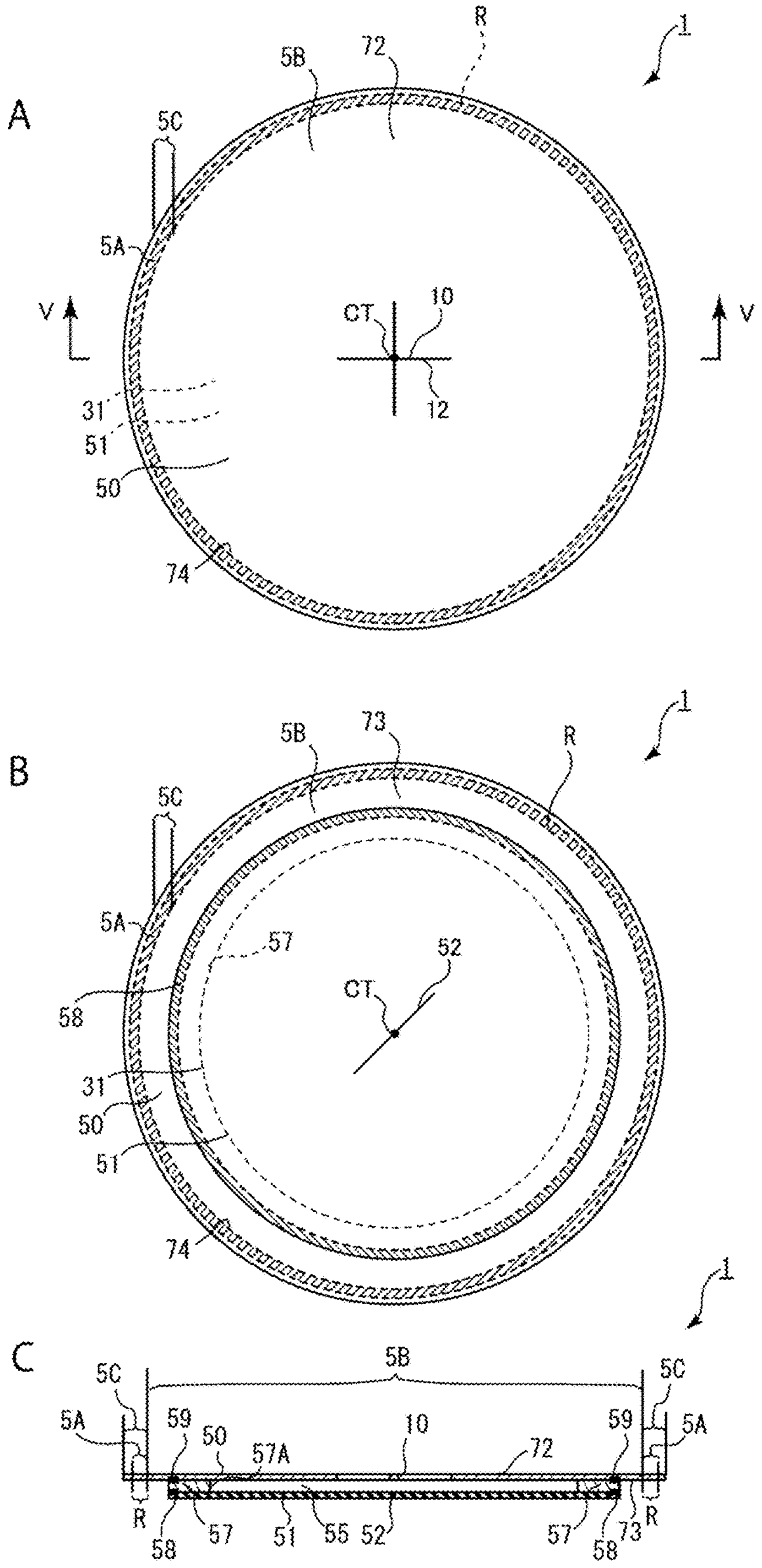
FIG. 28A is a plan view showing an example of a lid according to the sixth embodiment.
FIG. 28B is a bottom view showing an example of a lid according to the sixth embodiment.
FIG. 28C is a cross-sectional view schematically showing the state of the V-V line longitudinal section of FIG. 28A.
Figure 29:
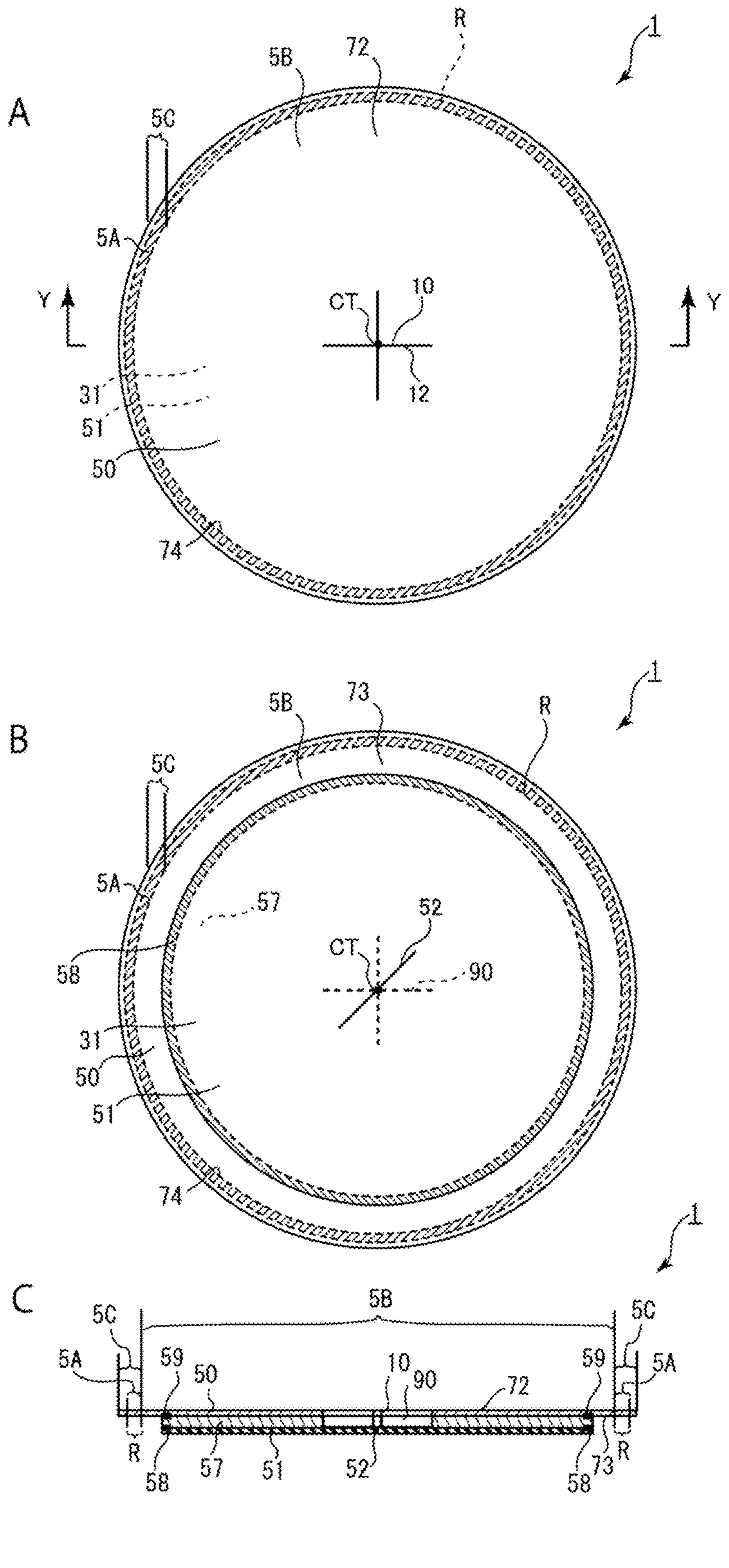
FIG. 29A is a plan view showing an example of a lid according to the sixth embodiment.
FIG. 29B is a bottom view showing an example of a lid according to the sixth embodiment.
FIG. 29C is a cross-sectional view schematically showing the state of the Y-Y line longitudinal section of FIG. 29A.
Figure 30:
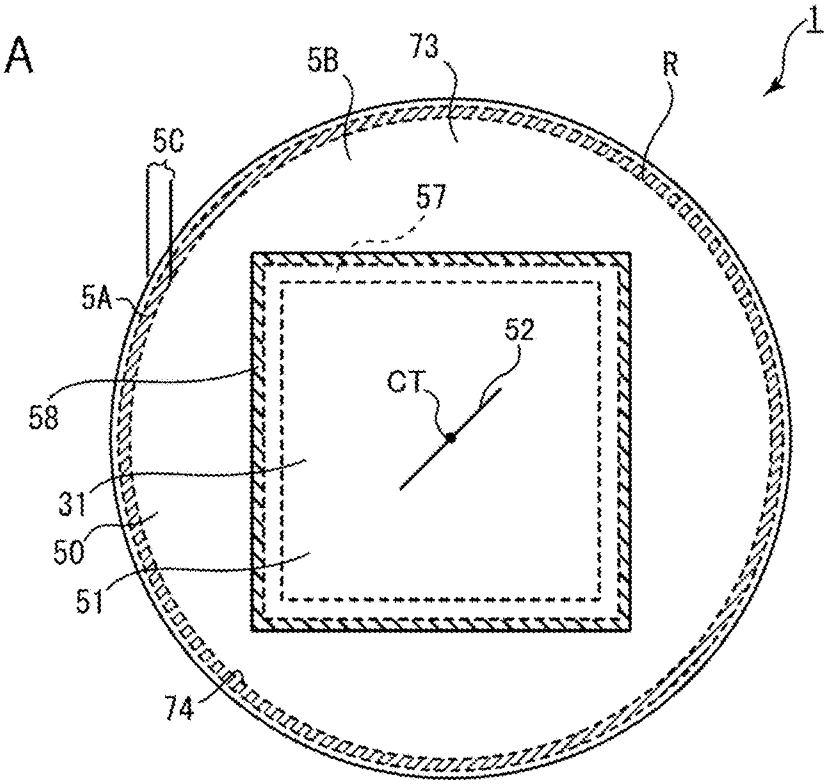
FIGS. 30A and 30B are bottom views each showing an example of a lid according to the sixth embodiment.
Figure 30:
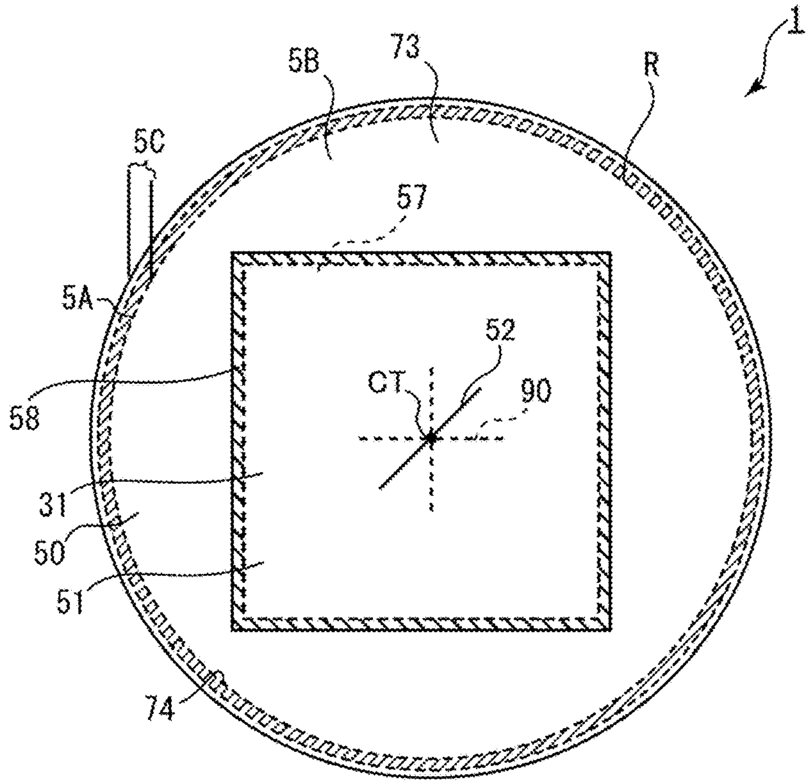
Figure 31:
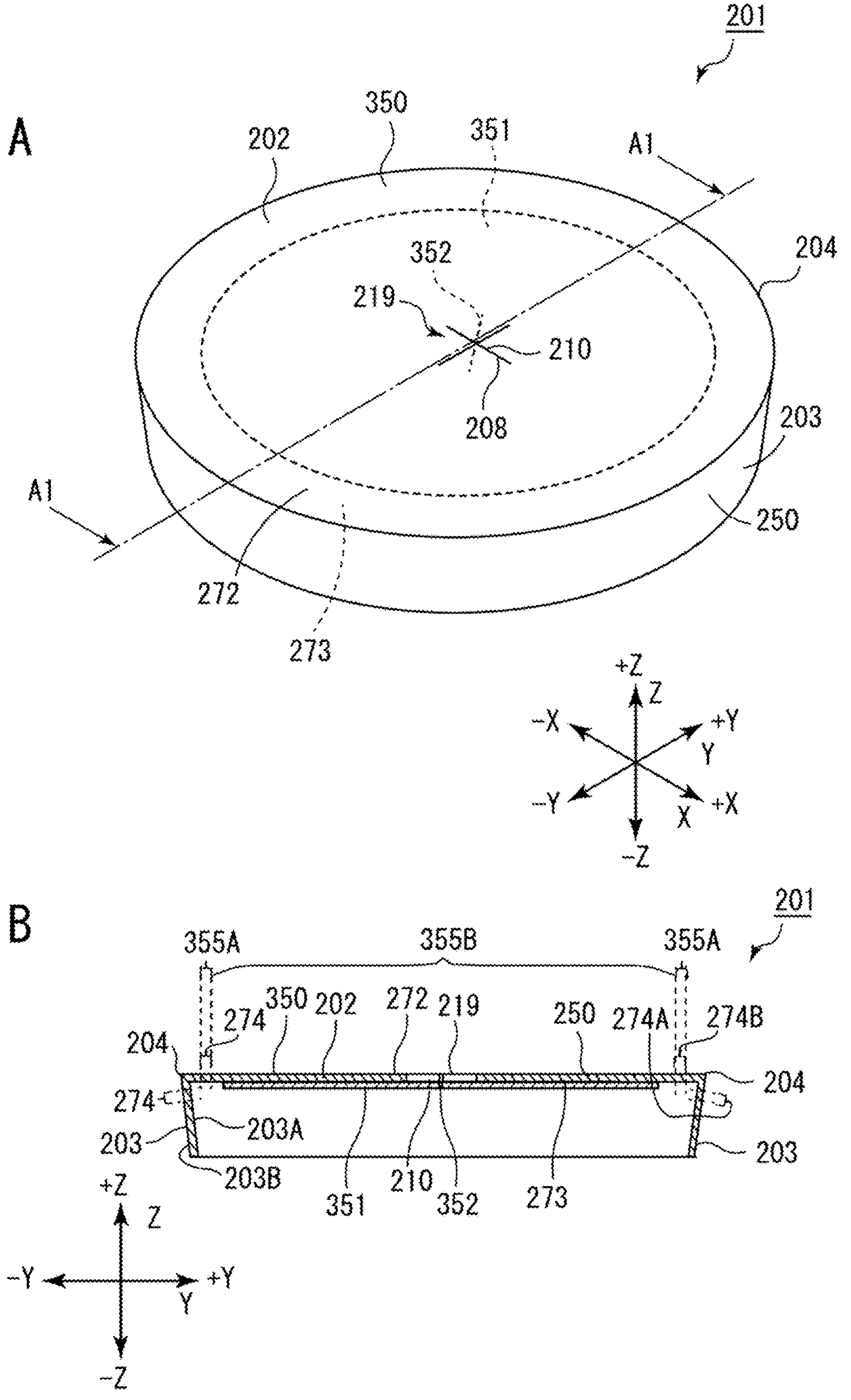
FIG. 31A is an external perspective view showing an example of a lid according to the seventh embodiment.
FIG. 31B is a cross-sectional view schematically showing the state of the A1-A1 line longitudinal section of FIG. 31A.
Figure 32:
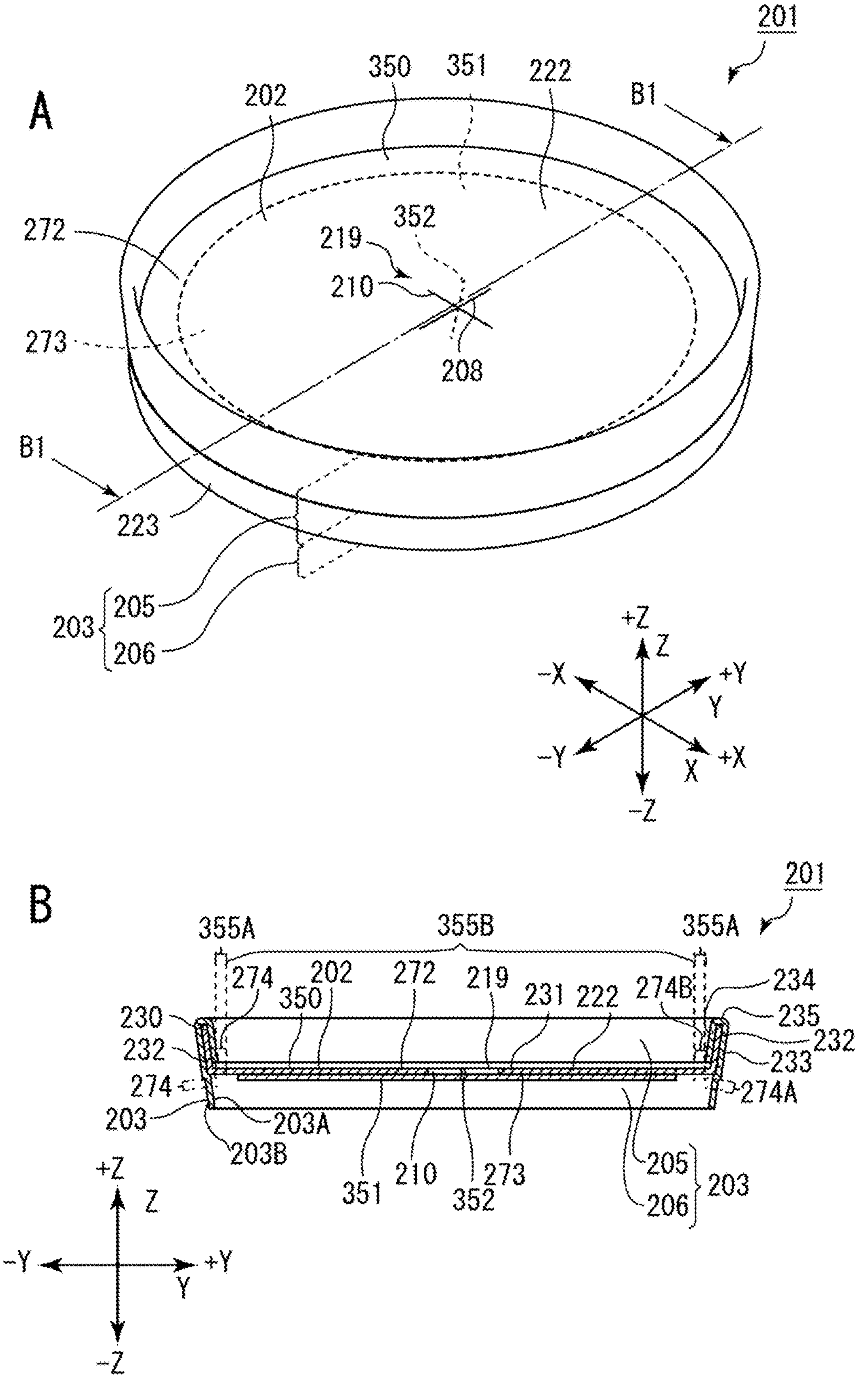
FIG. 32A is an external perspective view showing an example of a lid according to the eighth embodiment.
FIG. 32B is a cross-sectional view schematically showing the state of the B1-B1 line longitudinal section of FIG. 32B.
Figure 33:
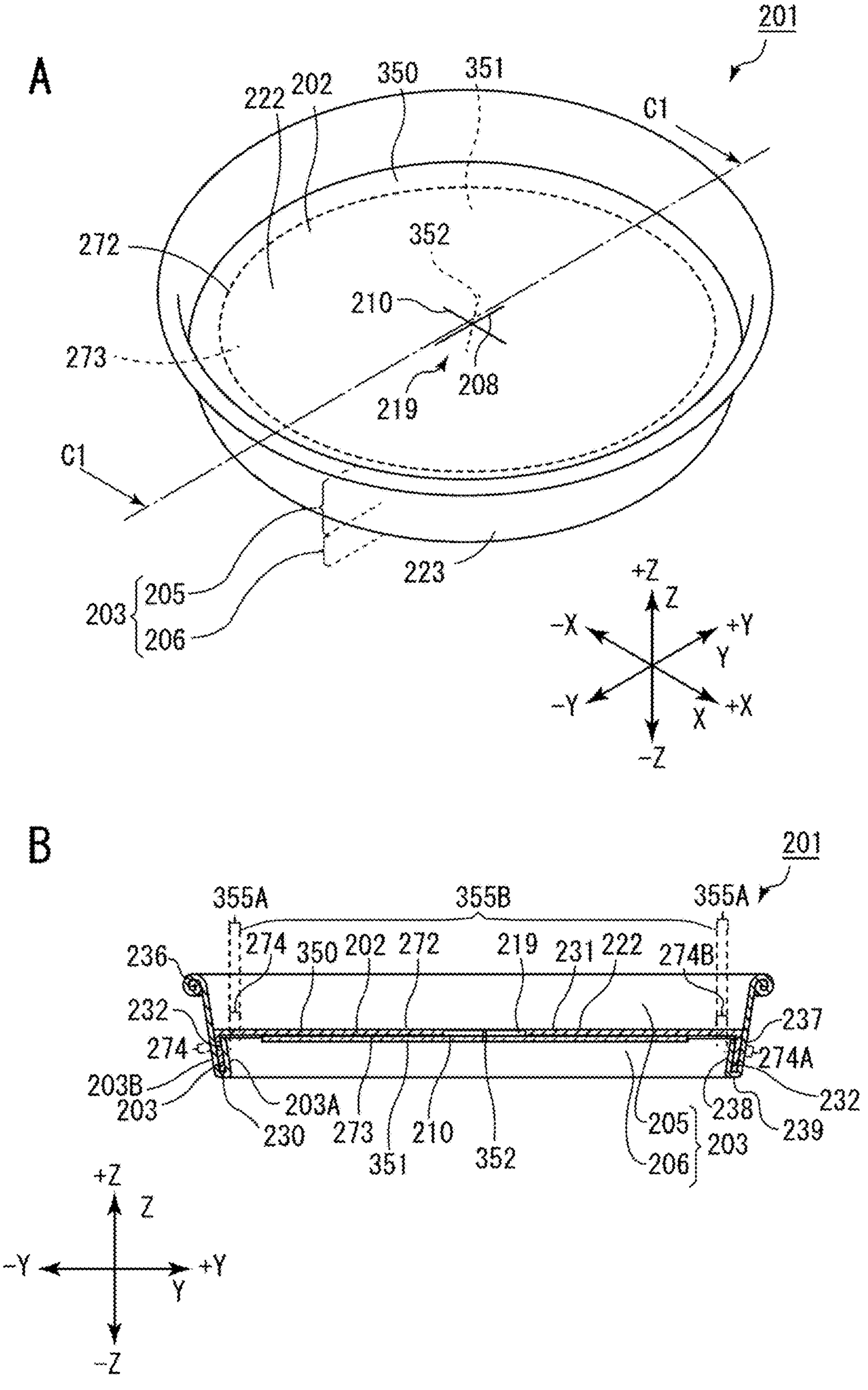
FIG. 33A is an external perspective view showing an example of a lid according to the ninth embodiment.
FIG. 33B is a cross-sectional view schematically showing the state of the C1-C1 line longitudinal section of FIG. 33A.

In the examples of FIGS. 19 and 20, the vent hole 80 is omitted, but this is an example, and the vent hole 80 may be formed in Modification 2 of the second embodiment as well.

Modification 3

In the lid 1 according to Modification 2 of the second embodiment, as shown in FIGS. 21A to 21C, the holding structure forming part 24 may be provided. Such a form is referred to as Modification 3 of the second embodiment. FIGS. 21A to 21C are a plan view, a bottom view, and a cross-sectional view showing an example of the lid 1 according to Modification 3 of the second embodiment, respectively. In the lid 1 according to Modification 3 of the second embodiment, the tab member 23 is provided as the knob part 21, and further, the holding structure forming part 24 is provided. As the holding structure forming part 24, the claw part 25 and the receiving part 26 are provided. The claw part 25 is provided on the tab member 23, and the receiving part 26 is formed on the lid region corresponding part 5B. The receiving part 26 may be formed by the through part 10. In FIG. 21B, the breathable sheet 51 is formed to cover the small lid part 3 and the receiving part 26.

In the lid 1 according to Modification 3 of the second embodiment, as shown in FIGS. 23A to 23C, it is preferable that the breathable sheet 51 is provided with a notch portion 52. It is preferable that the notch portion 52 is formed along the receiving part 26 in a plan view of the lid 1. FIGS. 23A to 23C are a plan view, a bottom view, and a cross-sectional view showing another example of the lid 1 according to Modification 3 of the second embodiment, respectively. In FIG. 23B, the breathable sheet 51 is formed to cover the small lid part 3, and the notch portion 52 is formed at a position corresponding to the receiving part 26.

In the third modification of the second embodiment, in the examples shown in FIGS. 21B and 21C, the breathable sheet 51 covers the small lid portion 3, but this is just one example, and as shown in FIGS. 22A to 22C, the breathable sheet 51 may be formed to avoid the small lid portion 3. FIGS. 22A to 22C are a plan views, a bottom views, and a sectional view showing another embodiment of the lid 1 according to the third modification of the second embodiment.

In the lid 1 shown in the examples of FIGS. 22A to 22C, it is preferable that the breathable sheet 51 includes a cut portion 52, as shown in FIGS. 24A to 24C. In the lid 1 shown in the examples of FIGS. 24B and 24C, the cut portion 52 of the breathable sheet 51 is formed along the receiving portion 26 in a plan view of the lid 1.

3 THIRD EMBODIMENT

In the lid according to the first and second embodiments, as shown in FIGS. 3A and 3B, a plurality of extension portions 60 are provided on the outer peripheral edge 75 of the outer region corresponding part 5C, and a display portion 61 may be provided at a predetermined position from at least some of the extension portions 60 toward the inside of the lid region corresponding part 5B, and at a position inside the outer peripheral edge 75. Such a configuration is referred to as the third embodiment. In FIGS. 3A and 3B, the display portion 61 is identified as a portion surrounded by a chain line, as an example. In FIGS. 3A and 3B, an example of the lid 1 according to the third embodiment is illustrated, where the extension portion 60 and the display portion 61 are provided in the lid 1 according to the first embodiment. The explanation will continue based on this example. Note that other configurations in which the extension portion 60 and the display portion 61 are provided are the same as in the first and second embodiments, so the explanation is omitted.

3-1. Structure (Extension Portion)

In the lid 1, the extension portion 60 can function as a label portion 62 in combination with the display portion. The size and shape of the extension portion 60 are not particularly limited as long as they have a shape that protrudes to an extent that can be used as a label. A plurality of extension portions 60 may be formed so that their intervals are uniform. The number of extension portions 60 formed is not particularly limited, but it is preferable to be two or more. In FIG. 3A, two extension portions 60 are formed, and in FIG. 3B, three extension portions 60 are formed.

The extension portion 60 is formed to be bendable about the base end 60A. The base end of the extension portion 60 is defined as a portion determined by a straight line connecting two positions (protrusion start positions N1, N2) where the protrusion generally starts along the outer peripheral edge 60B of the extension portion 60. Also, the base end 60A is assumed to be located at the outer peripheral edge 75.

Figure 3:
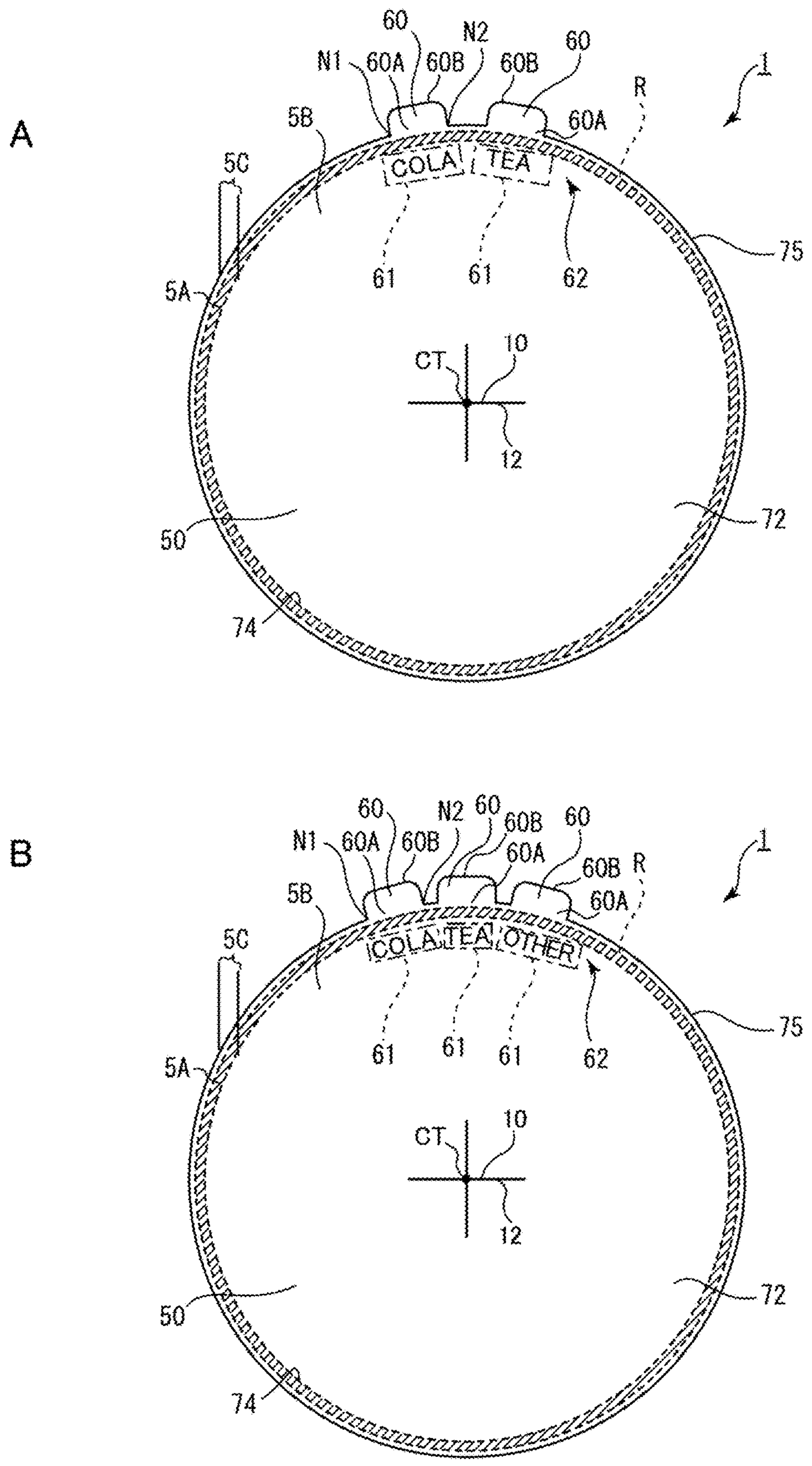
FIGS. 3A and 3B are plan views showing an example of a lid according to the third embodiment.
Figure 4:
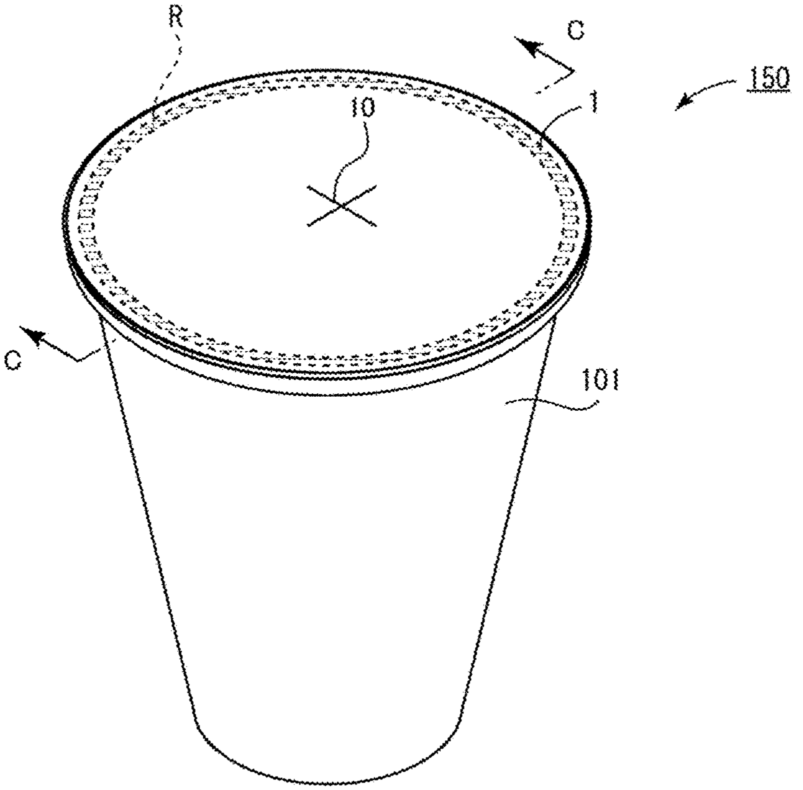
FIG. 4A is an external perspective view showing an example of a container with a lid.
FIG. 4B is a cross-sectional view schematically showing the state of the C-C line longitudinal section of FIG. 4A.
Figure 4:
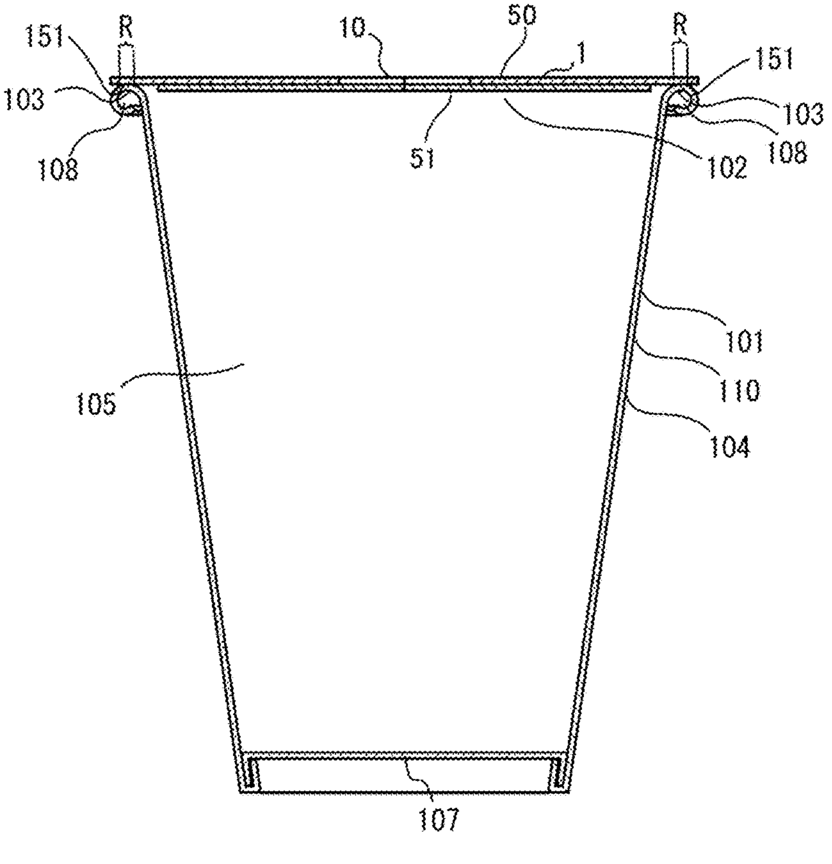

The display portion 61 may be any of characters, figures, shaped forms, colors, symbols, or combinations thereof. The display portion 61 may be connected to each other. The display portion 61, being separated from each other, makes it easy to use as an identification label for the contents in combination with the extension portion 60. In the example of FIG. 3A, the display portion 61 is composed of characters. That is, each display portion 61 forms the characters COLA and TEA. The display portion 61 may be a printed portion or a portion with an embossed or other shaped uneven surface. In the example of FIG. 3, the display portion 61 is a printed portion. In this example, the printed portion is the part where the characters are printed.

Regarding the position of the display portion 61, it is preferable that at least a part of the display portion 61 is formed in the outer region corresponding part 5C. However, this does not prohibit the display portion 61 from being entirely formed in the outer region corresponding part 5C. It is preferable that the display portions 61 are formed at predetermined positions from the respective formation positions of the plurality of extension portions 60 toward the center of the lid region corresponding part 5B, and at positions inside the outer peripheral edge 75.

In the state of the container 150 with the lid, where the lid 1 is joined to the container 101, by bending the extension portion 60 about the base end 60A, it is possible to know what the contents inside the container 101 are. In this case, since the extension portion 60 is formed and the display portion 61 is formed at a position corresponding to the extension portion 60, when the extension portion 60 is bent downward, the display portion 61 is not covered by the extension portion 60, and it is possible to know what the contents inside the container are.

With the extension portion 60 formed on the lid 1, it becomes easy to pinch the lid 1 using the extension portion 60 as a grip. In this case, since the user can pinch and carry the lid 1 without touching the lid region corresponding part 5B of the lid 1, it is possible to suppress contamination of the lid region corresponding part 5B of the lid 1.

4 FOURTH EMBODIMENT

The lid 1 of the fourth embodiment, as shown in FIGS. 25A to 25C, includes a main body 50 and a breathable sheet 51, and is provided with a vent hole 80 in the main body 50. The lid 1 of the fourth embodiment omits the insertion opening 12 and the cut portion 52 from the lid 1 of the first embodiment and has a configuration with the vent hole 80, otherwise it is the same as the first embodiment. Such a configuration is referred to as the fourth embodiment. FIGS. 25A to 25C are a plan views, a bottom view, and a sectional view showing an embodiment of the lid 1 according to the fourth embodiment.

The vent hole 80 may be formed similarly to the vent hole 80 described in the second embodiment. In FIG. 25B, the breathable sheet 51 is formed to cover the vent hole 80. Since the vent hole 80 is formed and the breathable sheet 51 is provided to cover the vent hole 80, it is possible to maintain a state where gases such as steam are discharged from the vent hole 80 while suppressing the risk of liquid leaking out along with the gases.

5 FIFTH EMBODIMENT

The lid 1 of the fifth embodiment, as shown in FIGS. 26A to 26C, is provided with a spacer 54 between the breathable sheet 51 and the main body 50. Such a configuration is referred to as the fifth embodiment. FIGS. 26A to 26C are a plan view, a bottom view, and a sectional view showing an embodiment of the lid 1 according to the fifth embodiment. Regarding the fifth embodiment, the configurations of the breathable sheet 51 and the main body 50 are the same as in the first embodiment, so the explanation is omitted. In the fifth embodiment, the breathable sheet 51 is indirectly joined to the lid region corresponding part 5B via the spacer 54.

(Spacer)

The spacer 54 ensures a gap between the breathable sheet 51 and the main body 50. In the example of FIG. 26B, the spacer 54 is formed in an annular shape along the outer periphery of the breathable sheet 51. As shown in FIG. 26C, the spacer 54 is joined at one end (one end when the end is defined in the direction along the thickness of the main body 50) to the main body 50, and the other end of the spacer 54 is joined to the breathable sheet 51. In the example of FIG. 26C, the breathable sheet 51 in the lid 1 of the fifth embodiment is not directly joined to the main body 50, but this is just one example, and the breathable sheet 51 may be directly joined to the main body 50.

The placement position of the spacer 54 is not limited to a position corresponding to the outer periphery of the breathable sheet 51, and may be a position corresponding to the interior of the breathable sheet 51.

The material of the spacer 54 is not particularly limited to paper-based materials, resins, etc., but it is preferable from the viewpoint that differences in strength, etc., are less likely to occur if it is a paper-based material or includes a paper-based material, similar to the main body 50.

According to the lid 1 of the fifth embodiment, since the spacer 54 is provided, it is possible to ensure a gap between the breathable sheet 51 and the main body 50, and in the state of the container 150 with the lid, it is possible to suppress the risk of liquid leaking out along with gases, etc., to the outside of the container 101.

6 SIXTH EMBODIMENT

The lid 1 of the sixth embodiment, as shown in FIGS. 28A to 28C, is provided with a resin sheet 57 between the breathable sheet 51 and the main body 50. Such a configuration is referred to as the sixth embodiment. FIGS. 28A to 28C are a plan view, a bottom view, and a sectional view showing an embodiment of the lid 1 according to the sixth embodiment. Regarding the sixth embodiment, the configurations of the breathable sheet 51 and the main body 50 are the same as in the first embodiment, so the explanation is omitted.

(Resin Sheet)

The resin sheet 57 is not particularly limited in its material and may be a synthetic resin such as polyethylene (PE), polyethylene terephthalate (PET), or various resins that can be used as the material of the breathable sheet 51. However, it is preferable that the resin forming the resin sheet 57 is a resin that can be bonded to both the lid 1 and the breathable sheet 51.

The shape of the resin sheet 57 is formed in an annular shape along the outer peripheral edge of the breathable sheet 51 in FIGS. 28A to 28C, but this is just one example. For example, as shown in FIGS. 29A to 29C, it may be formed in a shape that matches the shape of the breathable sheet 51 (in FIGS. 29A to 29C, a disc shape or circular shape). FIGS. 29A to 29C are a plan view, a bottom view, and a sectional view showing another embodiment of the lid 1 according to the sixth embodiment. In this case, it is configured so that the main body 50 and the breathable sheet 51 do not directly face each other. If the resin sheet 57 is formed in a shape that matches the shape of the breathable sheet 51, such as a disc shape, as shown in FIGS. 29A to 29C, the resin sheet 57 is arranged to cover the through portion 10, but from the viewpoint of making it easier for the through portion 10 to function as an insertion opening 12, it is preferable that a cut (in-sheet cut 90) penetrating the resin sheet 57 is provided in the portion corresponding to the insertion opening 12 or its vicinity.

The shape of the resin sheet 57 is not limited to circular or annular, and may be formed in a rectangular annular shape as shown in FIG. 30A, or in a rectangular shape as shown in FIG. 30B. FIGS. 30A and 30B are bottom views showing another embodiment of the lid 1 according to the sixth embodiment.

(Joint Part Between Resin Sheet and Breathable Sheet)

The joint part between the resin sheet 57 and the breathable sheet 51 (inter-sheet joint part 58) is formed annularly surrounding the through part 10 under the plan view of the main body 50, as shown in the FIGS. 28A to 28C and FIG. 30A. The inter-sheet joint part 58 between the resin sheet 57 and the breathable sheet 51 may be formed over the entire surface of the resin sheet 57 under the plan view of the main body 50, or as shown in FIG. 28C, the inter-sheet joint part 58 may be formed annularly on a part of the surface of the resin sheet 57. The inter-sheet joint part 58 is preferably formed annularly and it applies to the resin sheet 57 formed in a circular as shown in FIGS. 29A to 29C, or in a rectangular as shown in FIG. 30B.

(Joint Part Between Resin Sheet and Main Body)

The joint part between the resin sheet 57 and the main body 50 (main body joint part 59) is formed annularly surrounding the through part 10 in the plan view of the main body 50, as shown in the FIGS. 28A to 28C and FIG. 30A. The main body joint part 59 between the resin sheet 57 and the breathable sheet 51 may be formed over the entire surface of the resin sheet 57 in the plan view of the main body 50, or as shown in FIG. 28B, the main body joint part 59 may be formed annularly on part of the surface of the resin sheet 57. The preference for the main body joint part 59 to be formed annularly applies similarly when the resin sheet is formed in a rectangular shape as shown in FIGS. 29A to 29C, or when the resin sheet 57 is formed in a rectangular shape as shown in FIG. 30B.

As shown in FIGS. 28B and 28C, when the resin sheet 57 is formed annularly and the inter-sheet joint part 58 and the main body joint part 59 are formed annularly on part of the surface of the resin sheet 57, the inner end 57A of the resin sheet 57 becomes a free end.

According to the lid 1 of the sixth embodiment, the resin sheet 57 enables a more reliable joining between the main body 50 and the breathable sheet 51, even if they are in lower level of heat-sealability, by the interposition of the resin sheet 57.

According to the lid 1 of the sixth embodiment, the provision of the resin sheet 57 allows for the securing of a gap 55 between the breathable sheet 51 and the main body 50, thereby suppressing the risk of liquid leaking out along with gas, etc., from the container 101 in the state of the container with lid 150. Additionally, when the inner end 57A of the resin sheet 57 is a free end or when the main body 50 and the breathable sheet 51 are configured not to opposite each other, the resin sheet 57 is able to be interposed in a part of the gap 55 (i.e., gaps between the resin sheet 57 and the breathable sheet 51, and between the breathable sheet 51 and the main body 50 are able to be created, which forms gap layers), the risk of liquid leaking out along with gas, etc., from the container 101 is suppressed. For convenience to explain, the description of the gap between the resin sheet 57 and the breathable sheet 51, and the gap between the breathable sheet 51 and the main body 50 is omitted to be shown in FIGS. 28C and 29C.

The lid 1 described in the first to sixth embodiments above forms a state of contact with the container 101 in the state of the container with lid 150, which will be described later, forming a joint part 151 at the contact portion between the lid 1 and the container 101. The joint part 151 is the part where the container 101 and the lid 1 are mutually adhered (including adhesion), and to separate the lid 1 from the container 101, the joint part 151 must be separated or destroyed. The lid 1 is not limited to such a configuration, and as will be described next, it may also be configured such that the lid fits onto the container, forming a state of contact between the lid and the container.

7 SEVENTH EMBODIMENT

7-1 Configuration

The lid 201 according to the seventh embodiment has a main body 350 and a breathable sheet 351, as illustrated in FIGS. 31A and 31B. The main body 350 is formed to be contactable with a container 501 having an opening 502 formed at the upper end and an edge 503 forming the outer periphery of the opening 502, as will be described later using FIG. 37, etc. Regarding the state where the lid 201 and the container 501 are in contact, the lid 201 is formed to be fittable onto a container 501 having an opening 502 formed at the upper end and the edge 503 forming the outer periphery of the opening 502. Additionally, the main body 350 has a cover wall part 202. Furthermore, the lid 201 has at least one breathable sheet 351 with water repellency. FIG. 31A is a schematic perspective view showing an embodiment of the lid according to the seventh embodiment. FIG. 31B is a schematic cross-sectional view showing an embodiment of the lid according to the seventh embodiment. Note that FIG. 31B shows the state of the A1-A1 line longitudinal section of FIG. 31A. FIG. 37 is a cross-sectional view showing an example of a container with lid 500 where the lid 201 shown in FIGS. 31A and 31B is joined to the container 501. The breathable sheet 351 is configured similarly to the breathable sheet 51 described in the first to sixth embodiments above, so a detailed description is omitted.

As shown in the examples of FIGS. 31A and 31B, it is preferable that the main body 350 of the lid 201 has a cover wall part 202 covering the opening 502 when the lid 201 is attached to the container 501, and a side wall part 203 surrounding the cover wall part 202. Additionally, as shown in the examples of FIGS. 31A and 31B, it is preferable that the main body 350 of the lid 201 has a bending part 204. The bending part 204 connects the cover wall part 202 and the side wall part 203, and in the examples of FIGS. 31A and 31B, the bending part 204 and the side wall part 203 are formed continuously (integrally).

(Cover Wall Part)

The cover wall part 202, as shown in FIG. 37, covers the opening 502 of the container 501 when the lid 201 is attached (mounted) to the container 501. The shape of the cover wall part 202 may be determined according to the shape of the container 501, and examples include circular, elliptical, triangular, rectangular, polygonal, and chamfered shapes.

(Contact Region Corresponding Part)

The cover wall part 202 has a contact region corresponding part 355A that corresponds to the region where it contacts the edge 503 of the container 501 from above along the edge 503 of the container 501. A second contact part 274B is formed as a contact part 274, which will be described later, in the contact region corresponding part 355A. In the examples of FIGS. 31A and 31B, the second contact part 274B is formed on the opposite surface 273 side.

(Lid Region Corresponding Part)

The cover wall part 202 has a lid region corresponding part 355B, which is composed of the inner part from the contact region corresponding part 355A. The lid region corresponding part 355B is the part that covers the opening 502. The lid region corresponding part 355B may be configured similarly to the lid region corresponding part 5B described in the first to sixth embodiments above. At least part of the breathable sheet 351 faces at least a part of the lid region corresponding part 355B. It is preferable that a notch portion 352 is formed in the breathable sheet 351. In the examples of FIGS. 31A and 31B, the breathable sheet 351 faces the surface on the opposite surface 273 side of the lid region corresponding part 355B. The notch portion 352 of the breathable sheet 351 may be configured similarly to the notch portion 52 described in the first embodiment, etc. Regarding the position of the through part 210 and the breathable sheet 351, the breathable sheet 351 is arranged to cover the through part 210 in the case where the notch portion 352 of the breathable sheet 351 is omitted. Note that the configuration of the arrangement and a joint part of the breathable sheet 351 with respect to the lid region corresponding part 355B can apply the configuration of the lid region corresponding part 5B and the breathable sheet 51 described in the first to sixth embodiments.

(Bending Part)

The bending part 204 is formed to surround the outer peripheral edge of the cover wall part 202 and forms the boundary between the cover wall part 202 and the side wall part 203. The bending part 204 is formed such that the side wall part 203 faces the side wall 104 or the edge 103 of the container 101 when the lid 201 is attached to the container 101. In the examples of FIGS. 31A to 31B, the bending part 204 has a bent structure, but as will be described later, the bending part 204 is not limited to having a bent structure. Additionally, "the part forming the boundary between the cover wall part 202 and the side wall part 203" includes cases where the part itself forms the boundary, or where the boundary is defined inside or at the end of the part (including cases where part of the cover wall part 202 and/or the side wall part 203 also serves as the bending part 204). The boundary between the cover wall part 202 and the side wall part 203 is defined at the center of the bending part 204. When the bending part 204 has a curved structure (for example, as shown in FIGS. 36A to 36B, which illustrate an example of modification 4 of the seventh embodiment described later), the bending part 204 is composed of the part specified in the curved range, and the boundary between the cover wall part 202 and the side wall part 203 is defined approximately at the center of the bending part 204.

(Side Wall Part)

The side wall part 203 is formed annularly along the outer peripheral edge of the cover wall part 202.

(Contact Part)

The lid 201 has a contact portion 274 that contacts the container 501 when fitted to the container 501. The contact portion 274 is formed on a predetermined part of the side wall part 203 (first contact portion 274A). Furthermore, it is preferable that the contact portion 274 is formed on the part corresponding to a predetermined region on the opposite surface 273 side of the cover wall part 202, as shown in FIG. 31B (second contact portion 274B). When the lid 201 is fitted to the container 101, the formation of the contact portion 274 can suppress the risk of the contents of the container 501 leaking to the outside. It is preferable that the first contact portion 274A is formed over the entire circumference of the outer edge of the container's edge 503, and it is also preferable that it is formed in an annular shape. It is preferable that the second contact portion 274B is formed over the entire circumference of the upper edge of the container's edge 503, and it is also preferable that it is formed in an annular shape. The first contact portion 274A and the second contact portion 274B may be separate from each other or may be connected. The contact portion 274 shown in the seventh embodiment (including the first contact portion 274A and the second contact portion 274B) is also applicable to the eighth, ninth, and eleventh embodiments described later.

(Through Part)

Also, a through part 210 is formed at a predetermined position of the cover wall part 202. In the examples of FIGS. 31A and 31B, the through part 210 is formed in the lid region corresponding part 355B of the cover wall part 202. An insertion port 219 is formed as this through part 210. The through part 210 is formed by a cut portion 208. In the example of FIG. 31A, the cut portion 208 is a cross cut. The insertion port 219 and the through part 210 may be formed similarly to the insertion port 12 and the penetration 10 described in the first embodiment. The through part 210 is a portion that penetrates the cover wall part 202 from the exposed surface 272 to the opposite surface 273.

The material of the lid 201 according to the seventh embodiment may be formed of the same material as the lid 1 shown in the description of the first to sixth embodiments.

(Blank Material)

The lid 201 can be formed by shaping the blank material 250 into a shape corresponding to the shape of the lid 201. As the blank material 250, a circular sheet punched out from a sheet material serving as a raw material can be exemplified.

The lid 201 according to the seventh embodiment can be obtained by integrally forming the blank material 250 for forming the lid 201 to integrally form the cover wall part 202, the bending part 204, the side wall part 203, and the cover wall part 202. As a method for integrally forming the blank material 250, methods such as hot pressing can be exemplified.

7-2 Operation and Effect

According to the lid 201 of the seventh embodiment, it is possible to suppress the risk of leakage of contents from the through part 210, similar to the first to sixth embodiments.

When the blank material for forming a lid with a bending part (a lid with a side wall part, a bending part, and a cover wall part) is made of a paper-based material and is shaped into the shape of the lid (three-dimensional shape), many fine wrinkles and folds occur near the bending part and the side wall part. When the blank material is made of a paper-based material, a state may occur where the restoring force acts on the fibers constituting the lid after shaping, and furthermore, such fine wrinkles and folds may be affected by forces applied to the lid when handling the lid or when attaching the lid to a container, causing the shape to revert. In this case, dimensional errors are likely to occur between the lid and the container, and there is a risk that the adhesion between the lid and the container will decrease. For this reason, when the contents of the container adhering to the opposite surface side of the lid are particularly liquid, the contents may move outward along the opposite surface of the lid due to vibrations during carrying the container with the lid, and there is a particularly high possibility that the contents will leak from the gap between the lid and the container. In this regard, according to the lid 201 of the seventh embodiment, since the breathable sheet 351 is provided, the risk of the contents of the container 501 adhering to the opposite surface 273 of the lid 201 and moving outward to leak outside is reduced.

7-3 Modification Example

Modification Example 1 of the Seventh Embodiment

In the lid 201 according to the seventh embodiment, as shown in FIGS. 34A and 34B, the cover wall part 202 and the side wall part 203 may be formed as separate members (Modification Example 1 of the Seventh Embodiment). Modification Example 1 of the seventh embodiment includes cases where a part of the member forming the cover wall part 202 forms a part of the side wall part 203, and where a part of the member forming the side wall part 203 forms a part of the cover wall part 202. FIGS. 34A and 34B show an example where a part of the member forming the cover wall part 202 forms a part of the side wall part 203.

For the formation example of the lid 201 according to Modification Example 1 of the seventh embodiment shown in FIGS. 34A and 34B, for example, a cover wall part forming member 222 having a first portion 231 (FIGS. 35A and 35B) as a part for forming the cover wall part 202 and a side wall part forming member 223 for forming the side wall part 203 are prepared. A joining margin 230 configured to be joinable to the side wall part forming member 223 as a second part 232 is extended at the outer end (outer edge end) of the first portion 231 of the cover wall part forming member 222. In FIG. 35A, the boundary between the first portion 231 and the second part 232 is indicated by a dashed line. By bonding the joining margin 230 of the cover wall part forming member 222 to the upper end of the side wall part forming member 223, the cover wall part forming member 222 and the side wall part forming member 223 are joined to form the bending part 204. In this case, as the blank material, a blank material for forming the cover wall part forming member 222 and the side wall part forming member 223 (referred to as the first blank material 251 and the second blank material 252, respectively) as shown in FIGS. 35A and 35B can be used. The first blank material 251 for forming the cover wall part forming member 222 may be a sheet material formed in a shape that combines the joining margin 230 with the shape of the cover wall part 202. In the first blank material 251, a breathable sheet 351 is arranged to face a predetermined region of the portion corresponding to the lid region corresponding part 355B. In FIG. 35A, the contour of the portion defined as the part where the breathable sheet 351 is to be arranged is indicated by a chain line REA, and in the example shown in FIG. 35A, the breathable sheet 351 is arranged in the region inside the chain line REA. However, FIG. 35A is an example and does not limit the region where the breathable sheet 351 is arranged. The second blank material 252 is shaped according to the shape of the side wall part 203, and for example, when the side wall part 203 is shaped to taper or expand toward the tip, a sheet material formed in a fan shape (formed in a partial fan shape) may be used. By joining the edge portions 253, 253 at both ends of the second blank material 252, a side wall part forming member 223 for forming the side wall part 203 can be obtained.

In Modification Example 1 of the seventh embodiment, the materials of the first blank material 251 and the second blank material 252 are the same as the material of the lid 201 described above.

Modification Example 2 of the Seventh Embodiment

In the examples of FIGS. 31A and 31B, the side wall part 203 is formed to taper downward (−Z direction) (the cross-sectional inner diameter becomes smaller (reduces)), but this is a preferable example, and the side wall part 203 may be formed to expand downward (the cross-sectional inner diameter becomes larger (expands)). Also, the side wall part 203 may be formed not to expand or taper downward (the cross-sectional inner diameter remains constant), and the side wall part 203 may be formed to have a portion that expands or tapers downward (a portion where the cross-sectional inner diameter changes) (Modification Example 2 of the fifth embodiment). What is shown in Modification Example 2 of the fifth embodiment is also applicable to the sixth to eighth embodiments described later. Note that the cross-section shows the cut surface of the side wall part when assuming a state where the side wall part is cut by a plane with the vertical direction as the normal. The cross-sectional inner diameter indicates the diameter on the inner peripheral surface side when the cut surface (cross-section) is generally annular.

Modification Example 3 of the Seventh Embodiment

The cover wall part 202 of the lid 201 according to the seventh embodiment may be configured as described in the second to sixth embodiments (Modification Example 3 of the Seventh Embodiment). Therefore, in Modification Example 3 of the seventh embodiment, the cover wall part 202 may have a configuration corresponding to the opening forming part (corresponding to the second embodiment), a configuration corresponding to the display part 61 (corresponding to the third embodiment), a configuration corresponding to the vent hole 80 (corresponding to the fourth embodiment), a configuration corresponding to the spacer 54 (corresponding to the fifth embodiment), a configuration corresponding to the resin sheet 57 (corresponding to the sixth embodiment), or a combination of these configurations (a combination of the second to sixth embodiments). Also, it is not prohibited to provide the lid 201 according to the seventh embodiment with configurations corresponding to the modification examples shown in the first to sixth embodiments. What is shown in Modification Example 3 of the seventh embodiment is also applicable to the eighth and ninth embodiments described later. In the lid 201 according to Modification Example 3 of the seventh embodiment, if the configuration of the insertion port 12 may be omitted in the second to sixth embodiments, the configuration of the insertion port 219 may also be omitted similarly to the second to sixth embodiments.

Modification Example 4 of the Seventh Embodiment

In the lid 201 according to the seventh embodiment, as shown in FIGS. 36A to 36B, the bending part 204 may be constituted by the protruding portion 226. Additionally, a protrusion 225 may be formed at or near the end (outer end 228B) of the protruding portion 226 that is closer to the side wall part 203. The case where the lid 201 according to the seventh embodiment has the protruding portion 226 is referred to as Modification Example 4 of the seventh embodiment.

(Protruding Portion)

In one example of the lid 201 according to Modification Example 4 of the seventh embodiment shown in FIGS. 36A to 36B, the protruding portion 226 is formed as a structure (protruding structure) where a predetermined region on the outer peripheral edge side of the cover wall part 202 protrudes obliquely upward, but the protruding direction of the protruding portion 226 may be upward or lateral (in the planar direction of the cover wall part 202). Additionally, the inner surface 226A side of the protruding portion 226 is a recessed portion (recessed portion 227). The shape of the recessed portion 227 corresponds to the shape of the protruding portion 226. This can be realized according to the shape of the mold when forming the lid 201 from the blank material 250. The size of the recessed portion 227 is preferably such that it can fit the edge 103 of the container 101. When the size of the recessed portion 227 is such, when using the lid 201 as a container with a lid 500, the edge 503 generally enters the recessed portion 227, and it is possible to bring the outer end portion of the edge 503 (in the example of FIG. 37, the outer peripheral surface portion 511 of the edge 503) into surface contact with the recessed portion 227, making it easy to securely attach the lid 201 to the edge 503 of the container 501.

(Protrusion)

As shown in the example of FIGS. 36A to 36B, a protrusion 225 may be formed on the side wall part 203. The protrusion 225 is defined, for example, as a portion protruding inward (in the direction of the center CT (indicated by a one-dot chain line in FIG. 36B), from the outer peripheral surface 203B to the inner peripheral surface 203A of the side wall part 203) at a predetermined position of the side wall part 203. The protrusion 225 is preferably a ridge portion formed in a strip shape so as to encircle the inner peripheral surface of the side wall part 203. A convex structure of the protrusion 225 is formed on the inner peripheral surface side of the side wall part 203, and a concave portion 224 may be formed at a position corresponding to the position where the convex structure is formed on the outer peripheral surface 203B side of the side wall part 203. By forming such a structure, the shape of the side wall part 203 can be further stabilized.

(Contact Region Corresponding Part)

The contact region corresponding part 355A corresponds to the part defined as the portion of the contact part 274 that contacts the edge 503, and is defined as the portion of the contact part 274 that corresponds to the inner end 228A of the protruding portion 226 to the bending part 204. In this case as well, the contact part 274 is formed on the opposite surface 273 side.

(Lid Region Corresponding Part)

The cover wall part 202 has a lid region corresponding part 355B, which is composed of the inner portion from the contact region corresponding part 355A. The lid region corresponding part 355B is a part that covers the opening 502. The lid region corresponding part 355B may be configured similarly to the lid region corresponding part 5B described in the first to sixth embodiments mentioned above. The lid region corresponding part 355B is formed in the inner portion of the cover wall part 202, generally from the inner end 228A of the protruding portion 226.

Modification Example 5 of the Seventh Embodiment

In the lid 201 according to the seventh embodiment, as shown in FIGS. 38A to 38B, the breathable sheet 351 may be further disposed on the side wall part 203 (Modification Example 5 of the seventh embodiment). In the examples of FIGS. 38A and 38B, in the lid 201, the breathable sheet 351 provided on the side wall part 203 and the breathable sheet 351 disposed on the lid region corresponding part 355B are provided separately. This is an example, and in the lid 201, as shown in FIG. 39A, the breathable sheet 351 provided on the side wall part 203 and the breathable sheet 351 disposed on the lid region corresponding part 355B may be integrated. In this case, the breathable sheet 351 is also disposed in the contact region corresponding part 355A and the bending part 204. In the examples of FIGS. 38A and 38B, when the breathable sheet 351 is further disposed on the side wall part 203, the breathable sheet 351 is adhered to the side wall part 203. Also, in the examples of FIGS. 38A and 38B, the breathable sheet 351 is disposed to face the region including the region corresponding to the first contact part 274A, but this is an example. As shown in FIG. 39B, the breathable sheet 351 may be joined to the side wall part 203 in a region avoiding the first contact part 274A. In the example of FIG. 39B, the breathable sheet 351 is adhered in the region below the first contact part 274A on the inner peripheral surface 203A of the side wall part 203. In this case, if the contents of the container 501 leak downward from the first contact part 274A along the inner peripheral surface 203A of the side wall part 203, they can be trapped by the breathable sheet 351, preventing the contents from sagging and falling from the side wall part 203. Additionally, from the perspective of making it easier to trap the contents with the breathable sheet 351 attached to the side wall part 203, it is preferable that the upper end side of the breathable sheet 351 is a free end (the upper end side of the breathable sheet 351 is in a non-adhered state to the side wall part 203). In this case, as shown in FIG. 39B, a gap 356 is likely to form between the upper end side of the breathable sheet 351 and the side wall part 203, and the gap 356 is likely to be in an open state upward (a state where the distance between the breathable sheet 351 and the inner peripheral surface 203A of the side wall part 203 becomes larger as the position is higher). Therefore, it becomes easier to capture (trap) the contents that have leaked onto the inner peripheral surface 203A of the side wall part 203 with the gap 356.

In the examples of FIGS. 38A and 38B, the breathable sheet 351 may be partially provided on the side wall part 203 along its inner surface, but from the perspective of preventing the contents of the container 501 from leaking out of the lid 201, it is preferable that the breathable sheet 351 is provided annularly on the peripheral surface of the side wall part 203 along its inner surface.

8 EIGHTH EMBODIMENT

8-1 Configuration

The lid 201 according to the eighth embodiment, as shown in FIGS. 32A and 32B, has a main body 350 with a cover wall part 202, a point where the main body 350 has a side wall part 203, a point where it can be fitted to a container 501, and a point where it has a breathable sheet 351, similar to the seventh embodiment. The lid 201 according to the eighth embodiment has a configuration in which a part of the side wall part 203 extends above and below the cover wall part 202. The side wall part 203 has an annular (including cylindrical) shape and includes an upper wall 205 and a lower wall 206. The lower wall 206 is a portion extending below the cover wall part 202, and the upper wall 205 is composed of the portion of the side wall part 203 excluding the lower wall 206. In the examples of FIGS. 32A and 32B, the side wall part 203 is formed to taper downward. Also, in the examples of FIGS. 32A and 32B, a through part 210 is formed at a predetermined position of the cover wall part 202, which is an example of the conditions such as the shape and arrangement position of the through part 210.

(Members Forming the Cover Wall Part and Side Wall Parts)

In the eighth embodiment, as shown in Modification Example 1 of the seventh embodiment, the main body 350 has a cover wall part 202 and a side wall part 203, and these cover wall part 202 and side wall part 203 are formed of separate members. In the examples of FIGS. 32A and 32B, the lid 201 has a cover wall part forming member 222 and a side wall part forming member 223 as separate members mentioned above, and has a joint for joining the cover wall part forming member 222 and the side wall part forming member 223.

(Cover Wall Part Forming Member)

The cover wall part forming member 222 has a first portion corresponding to the cover wall part 202 (first portion 231 of the cover wall part forming member 222) and a second part extending from the outer peripheral edge of the first portion 231 (second part 232 of the cover wall part forming member 222), and the second part 232 is the joining margin 230 shown in Modification Example 1 of the seventh embodiment. In the example of FIG. 32A, the second part 232 of the cover wall part forming member 222 is a portion (rising portion) rising obliquely upward or directly upward from the outer peripheral edge of the first portion 231 in the state of the lid 201, and in the state where the second part 232 is joined to the side wall part forming member 223, the second part 232 becomes a part of the side wall part 203. The contact region corresponding part 355A and the lid region corresponding part 355B are formed on the first portion 231, and the breathable sheet 351 is disposed so that at least a part of the breathable sheet 351 faces at least a part of the lid region corresponding part 355B.

(Side Wall Part Forming Member)

The side wall part forming member 223 is formed in an annular shape (including cylindrical) and has a portion forming the upper wall 205 (upper forming part) and a portion forming the lower wall 206 (lower forming part). The upper forming part has a portion (first contact wall part 233) that contacts at least the outer surface side of the joining margin 230, which becomes the second part 232 of the cover wall part forming member 222.

In the examples of FIGS. 32A and 32B, the upper wall 205 (upper forming part) has a first contact wall part 233, a portion (second contact wall part 234) that contacts the inner surface side of the joining margin 230, which becomes the second part 232 of the cover wall part forming member 222, and a continuous part 235 connecting the first contact wall part 233 and the second contact wall part 234, and the continuous part 235 covers the upper end surface of the joining margin 230, which becomes the second part of the cover wall part forming member 222. The lower end of the second contact wall part 234 is located on the upper surface side of the first portion 231 of the cover wall part forming member 222, and in the examples of FIGS. 32A and 32B, it is slightly spaced from the first portion 231. However, this is an example, and the lower end of the second contact wall part 234 may be in contact with the upper surface side of the first portion 231 of the cover wall part forming member 222.

In the examples of FIGS. 32A and 32B, the lower wall 206 (lower forming portion) extends downward (in a diagonally downward direction in FIGS. 32A and 32B) from the lower end of the first contact wall part 233 as a base end. The lower wall 206 (lower forming portion) is preferably located, for example, below the lower surface of the first portion 231 of the cover wall part forming member 222 in terms of vertical position.

(Blank Material)

The lid 201 according to the eighth embodiment can be formed by processing a blank material. As the blank material, a blank material for forming the cover wall part forming member 222 and the side wall forming member 223 (referred to as the first blank material and the second blank material, respectively, as described in Modification Example 1 of the seventh embodiment) can be used. The material of at least one blank material selected from the group consisting of the first blank material and the second blank material may be formed similarly to the material of the lid 1 shown in the description of the first embodiment as described in Modification Example 1 of the seventh embodiment.

The first blank material for forming the cover wall part forming member 222 may be similar to the first blank material 251 described in Modification Example 1 of the seventh embodiment, and a sheet material formed in a shape further combined with the joining margin 230 to the shape of the cover wall part 202 may be used. The cover wall part forming member 222 is preferably formed by bending and forming the first blank material to form a first portion 231 corresponding to the cover wall part 202 and a rising portion (a second part 232 serving as a joining margin). That is, the second part 232 is preferably formed by bending the first blank material upward at the peripheral position of the first portion 231 (the base end of the joining margin 230). The breathable sheet 351 is preferably disposed on the first portion 231 before the first portion 231 and the rising portion are formed. However, it is not prohibited for the breathable sheet 351 to be disposed on the first portion 231 after the rising portion is formed.

The second blank material for forming the side wall forming member 223 may be similar to the second blank material 252 described in Modification Example 1 of the seventh embodiment, and a sheet material formed in a fan shape may be used. By joining the edge portions of the second blank material to form an annular body, and folding the upper end portion of the annular body inward at a position corresponding to the continuous part 235, the first contact wall part 233, the second contact wall part 234, and the continuous part 235 can be formed, and the upper forming portion (a structural portion corresponding to the upper wall 205) can be formed, and further, the lower forming portion (a structural portion corresponding to the lower wall 206) can be formed. By forming the upper forming portion and the lower forming portion, the side wall forming member 223 is formed. Note that at least the first contact wall part 233 and the second contact wall part 234 are adhered to the joining margin 230. In the example of FIG. 32B, the first contact wall part 233, the second contact wall part 234, and the continuous part 235 are adhered to the joining margin 230, forming an adhesive portion.

In the manufacture of the lid 201, it is preferable that the above-described annular body formed from the second blank material is adhered to the cover wall part forming member 222. The lower end of the joining margin 230 (second part 232) of the cover wall part forming member 222 is aligned with the boundary position of the lower forming portion and the upper forming portion (the boundary position of the upper wall 205 and the lower wall 206) on the inner peripheral surface of the annular body, and the joining margin 230 is opposed to the inner peripheral surface of the annular body. Further, as described above, by folding the upper end portion of the annular body inward at a position corresponding to the continuous part 235 in the annular body, the joining margin 230 is covered from the upper end side. Then, the joining margin 230 is joined to the annular body serving as the side wall forming member 223 so as to be sandwiched between the first contact wall part 233 and the second contact wall part 234. As a result, the side wall forming member 223 is formed. And if the breathable sheet 351 is adhered to the cover wall part forming member 222, the lid 201 is obtained.

8-2 Operation and Effect

According to the lid 201 of the eighth embodiment, the same effect as the seventh embodiment can be obtained.

9 NINTH EMBODIMENT

9-1 Configuration

The lid 201 according to the ninth embodiment, as shown in FIGS. 33A and 33B, has a main body 350 having a c cover wall part 202, the main body 350 having a side wall part 203, being capable of fitting into a container 501, and having a breathable sheet 351, is similar to the seventh embodiment. The lid 201 according to the ninth embodiment has a configuration in which a part of the side wall part 203 extends above and below the cover wall part 202. The side wall part 203 has an annular (including cylindrical) shape and includes an upper wall 205 and a lower wall 206. The lower wall 206 is a portion extending below the cover wall part 202, and the upper wall 205 is composed of a portion of the side wall part 203 excluding the lower wall 206. In the examples of FIGS. 33A and 33B, the side wall part 203 is formed to taper downward. Also, in the examples of FIGS. 33A and 33B, a through part 210 is formed at a predetermined position of the cover wall part 202, but this is an example.

(Members Forming the Cover Wall Part and the Side Wall Part Respectively)

In the ninth embodiment, as shown in Modification Example 1 of the seventh embodiment and the eighth embodiment, the main body 350 has the cover wall part 202 and the side wall part 203, and the art 202 and the side wall part 203 are formed of separate members. In the examples of FIGS. 33A and 33B, the lid 201 has the cover wall part forming member 222 and the side wall forming member 223 as the above-described separate members, and has a joint for joining the cover wall part forming member 222 and the side wall forming member 223.

(Cover Wall Part Forming Member)

The cover wall part forming member 222 has a first portion (first portion 231 of the cover wall part forming member 222) corresponding to the cover wall part 202 and a second part (second part 232 of the cover wall part forming member 222) extending from the outer peripheral end of the first portion 231, and the second part 232 serves as the joining margin 230 shown in Modification Example 1 of the fifth embodiment. In the example of FIG. 33A, the second part of the cover wall part forming member 222 is a portion (hanging portion) extending obliquely downward or directly downward from the outer peripheral end of the first portion 231, and the second part 232 is a part of the side wall part 203 in a state where the second part 232 is joined to the side wall forming member 223. Further, a contact region corresponding part 355A and a lid region corresponding part 355B are formed on the first portion 231, and the breathable sheet 351 is disposed so that at least a part of the breathable sheet 351 faces at least a part of the lid region corresponding part 355B.

(Side Wall Forming Member)

The side wall forming member 223 is formed in an annular shape (including cylindrical) and has a portion forming the upper wall 205 (upper forming portion) and a portion forming the lower wall 206 (lower forming portion). The lower forming portion has a portion (lower first contact wall part 237) that contacts at least the outer surface side of the joining margin 230 serving as the second part 232 of the cover wall part forming member 222.

In the examples of FIGS. 33A and 33B, the lower forming portion has a lower first contact wall part 237, a portion (lower second contact wall part 238) that contacts the inner surface side of the joining margin 230 serving as the second part 232 of the cover wall part forming member 222, and a lower end side continuous part 239 connecting the lower first contact wall part 237 and the lower second contact wall part 238, and the lower end side continuous part 239 covers the lower end surface of the joining margin 230 serving as the second part 232 of the cover wall part forming member 222. The upper end of the lower second contact wall part 238 is located on the lower surface (opposite surface 273) side of the first portion 231 of the cover wall part forming member 222, and in the examples of FIGS. 33A and 33B, it is preferably spaced apart from the first portion 231. It is also preferable that the edge 503 of the container 501 (for example, a part of the outer peripheral surface of the curl portion) can enter between the first portion and the upper end of the lower second contact wall part 238.

In the examples of FIGS. 33A and 33B, the upper wall 205 (upper forming portion) extends upward (in a diagonally upward direction in FIG. 33B) from the upper end of the lower first contact wall part 237 as a base end. The upper wall 205 (upper forming portion) is preferably located, for example, above the upper surface of the first portion 231 of the cover wall part forming member 222 in terms of vertical position. As shown in the examples of FIGS. 33A and 33B, it is preferable that the upper forming portion has a curl portion (side wall upper end curl portion 236) formed on its upper end side. In this case, it is possible to suppress the formation of a state in which the end surface of the blank material (the second blank material for forming the side wall forming member 223) is exposed at the upper end of the upper forming portion, and even when the user places their mouth on the end surface of the blank material to consume the contents in the container 501, it is possible to suppress the discomfort associated with the user contacting the end surface of the blank material with their mouth. Also, by forming the side wall upper end curl portion 236, it becomes difficult for liquid to contact the portion corresponding to the end surface of the blank material in the side wall part 203.

(Blank Material)

The lid 201 according to the ninth embodiment can be formed by processing a blank material. As the blank material, a blank material for forming the cover wall part forming member 222 and the side wall forming member 223 (referred to as the first blank material and the second blank material, respectively, as described in Modification Example 1 of the fifth embodiment) can be used. The material of at least one blank material selected from the group consisting of the first blank material and the second blank material may be formed similarly to the material of the above-described lid 201 as described in Modification Example 1 of the seventh embodiment (that is, the same material as the material of the lid 1 described in the first embodiment).

The first blank material for forming the cover wall part forming member 222 may be similar to the first blank material 251 described in the first modification of the seventh embodiment, and a sheet material formed in a shape that combines the shape of the cover wall part 202 with the joining margin 230 may be used. It is preferable that the cover wall part forming member 222 is formed by bending the first blank material to form a first portion 231 corresponding to the cover wall part 202 and a second part 232 serving as the joining margin 230. That is, it is preferable that the second part 232 is formed by bending the first blank material downward at the peripheral position of the first portion 231. It is preferable that the breathable sheet 351 is disposed on the first portion 231 before the first blank material is bent downward at the peripheral position of the first portion 231. However, it is not prohibited for the breathable sheet 351 to be disposed on the first portion 231 after the first blank material is bent downward at the peripheral position of the first portion 231.

The second blank material for forming the side wall forming member 223 may be similar to the second blank material 252 described in the first modification of the seventh embodiment, and a sheet material formed in a fan shape may be used. By joining the edge portions of the second blank material to form an annular body, and folding the lower end side portion of the annular body inward at a position corresponding to the lower end side continuous part 239, the lower first contact wall part 237, the lower second contact wall part 238, and the lower end side continuous part 239 can be formed, and the lower forming portion (lower wall 206) can be formed, and further the upper forming portion (upper wall 205) can be formed. The side wall forming member 223 is formed by forming the lower forming portion and the upper forming portion.

In the manufacture of the lid 201, it is preferable to use the above-mentioned annular body formed from the second blank material. The upper end of the joining margin 230 (second part 232) of the cover wall part forming member 222 is aligned with the boundary position of the lower forming portion and the upper forming portion (boundary position of the upper wall 205 and the lower wall 206) on the inner peripheral surface of the annular body, and the joining margin 230 is faced to the inner peripheral surface of the annular body. Furthermore, as described above, by folding the lower end side portion of the annular body inward at a position corresponding to the lower end side continuous part 239, the joining margin 230 is covered from the lower end side. Then, the joining margin 230 is joined (adhered) to the lower forming portion (annular body forming the side wall forming member 223) so as to be sandwiched between the lower first contact wall part 237 and the lower second contact wall part 238. As a result, the side wall forming member 223 is formed. And if the breathable sheet 351 is joined to the cover wall part 202, the lid 201 is obtained.

9-2 Operation and Effect

According to the lid 201 of the ninth embodiment, the same effect as the seventh embodiment can be obtained.

In the first to sixth embodiments described above, the breathable sheet 51 was disposed on the surface side of the main body 50 facing the opposite surface 73 side. In the seventh to ninth embodiments, the breathable sheet 351 was disposed on the surface side of the main body 350 facing the opposite surface 273 side. In the present invention, as shown in the following tenth embodiment, the breathable sheet 51 may be disposed on the surface side of the main body 50 facing the exposed surface 72 side. Also, as described in the eleventh embodiment, the breathable sheet 351 may be disposed on the surface side of the main body 350 facing the exposed surface 272 side.

10 TENTH EMBODIMENT

10-1 Configuration

The lid 1 of the tenth embodiment is formed in the same manner as the first to sixth embodiments, except that the breathable sheet 451 is disposed on the exposed surface 72 side of the main body 50, as shown in FIGS. 40A to 40C. Such a form is referred to as the tenth embodiment. FIGS. 40A to 40C are a plan view, a bottom view, and a cross-sectional view showing an example of the lid 1 according to the tenth embodiment, respectively. FIGS. 40A to 40C show an example in which the lid 1 according to the first embodiment is formed in the same manner, except that the breathable sheet 451 is disposed on the exposed surface 72 side of the main body 50. For the tenth embodiment, the configuration of each part of the main body 50 is the same as in the first to sixth embodiments, so the description is omitted.

(Breathable Sheet)

The breathable sheet 451 may be made of the same material as the breathable sheet 51 described in the first to sixth embodiments. In the example of FIGS. 40A to 40C, the breathable sheet 451 has a notch portion 452. The notch portion 452 may be configured similarly to the notch portion 52 of the breathable sheet 51 described in the first to sixth embodiments.

When the breathable sheet 451 is joined to the exposed surface 72 side of the lid region corresponding part 5B, it is preferable that a joint part 453 between the breathable sheet 451 and the main body 50 is formed in an annular shape surrounding the periphery of the penetration portion 10 (in the example of FIGS. 40A to 40C, the joint part 453 is the joint part between the breathable sheet 451 and the lid region corresponding part 5B). In this case, a gap can be formed between the exposed surface 72 of the main body 50 and the breathable sheet, and since the joint part 453 is formed at the outer edge of the gap, it is possible to suppress the risk of the contents trapped in the gap passing through the penetration portion 10 from the container 101 leaking out of the gap while moving on the exposed surface 72 in the state of the container 150 with the lid.

The strength of the joint 453 between the breathable sheet 451 and the main body 50 is not particularly limited, and the strength of the joint 453 may be such that the breathable sheet 451 can be peeled off from the main body 50. However, if the contents are likely to be ejected vigorously with gas in an outward direction such as carbonated gas, it is preferable that the joint 453 is firmly joined so that the breathable sheet 451 does not separate from the main body 50 due to the pressure of the ejection of the contents.

10-2 Modification

Modification 1

The lid 1 according to the tenth embodiment may be configured as a through-hole for the penetration portion 10, as shown in FIGS. 41A, 41B, and 41C, with the breathable sheet 451 disposed to cover the through-hole, and a surface sheet 454 may be provided to cover the breathable sheet 451. Such a form is referred to as Modification 1 of the tenth embodiment. FIGS. 40A to 40C are a plan view, a bottom view, and a cross-sectional view showing an example of the lid 1 according to Modification 1 of the tenth embodiment, respectively.

In the example of FIGS. 41A to 41C, the penetration portion 10 is a through-hole having a diameter large enough to allow a straw or the like to pass through. In the example of FIGS. 41A to 41C, the shape of the through-hole forming the penetration portion 10 is circular, but this is an example, and as shown in the example of FIGS. 42A to 42C, it may be rectangular, polygonal, or irregular. In the example of FIGS. 42A to 42C, an example is shown in which the breathable sheet 451, the surface sheet 454, and the penetration portion 10 are all rectangular. The shapes of the breathable sheet 451, the surface sheet 454, and the penetration portion 10 may be aligned or may be different. The breathable sheet 451 has a notch portion 452, and the breathable sheet 451 is disposed on the exposed surface 72 side of the lid region corresponding part 5B so that the notch portion 452 is positioned above the position of the penetration portion 10. The surface sheet 454 has a surface sheet notch portion 455 formed therein, and in the example of FIGS. 41A to 41C, it is a cross-shaped notch. As shown in the example of FIGS. 41A to 41C, the extending direction of the notch constituting the surface sheet notch portion 455 and the extending direction of the notch portion 452 may be inconsistent. However, this does not preclude the possibility that one extending direction of the notch constituting the surface sheet notch portion 455 and the extending direction of the notch portion 452 are aligned, as shown in the example of FIGS. 42A to 42C. In the example of FIGS. 42A to 42C, the notch portion 452 overlaps one of the notches constituting the surface sheet notch portion 455. Further, the surface sheet 454 is disposed to cover the breathable sheet 451, and in the example of FIGS. 41A to 41C, the outer peripheral edge of the surface sheet 454 is generally aligned with the outer peripheral edge of the breathable sheet 451. However, this is an example, and the surface sheet 454 may be smaller in size than the breathable sheet 451 so that the outer peripheral edge of the surface sheet 454 is inside the outer peripheral edge of the breathable sheet 451. Alternatively, the surface sheet 454 may be larger in size than the breathable sheet 451 so that the outer peripheral edge of the surface sheet 454 is outside the outer peripheral edge of the breathable sheet 451. The surface sheet 454 may be formed of the same material as the main body 50.

Modification 2

The lid 1 according to the tenth embodiment may have an opening forming portion in the lid region corresponding part 5B, and the breathable sheet 451 may be provided to cover the opening forming portion, as shown in FIGS. 43A to 43C. Such a form is referred to as Modification 2 of the tenth embodiment. The opening forming portion includes a base portion 2 having a small opening 6 with a smaller opening area than the opening 102 of the container 101, a small lid portion 3 for opening and closing the small opening 6, and a hinge portion 4 connecting the base portion 2 and the small lid portion 3, and the small lid portion 3 is configured to be rotatable with respect to the base portion 2 about the hinge portion 4, as shown in the description of the lid 1 according to the second embodiment. FIGS. 43A to 43C are a plan view, a bottom view, and a cross-sectional view showing an example of the lid 1 according to Modification 2 of the tenth embodiment, respectively. In the example of FIGS. 43A to 43C, a tab member 23 is provided on the surface of the breathable sheet. The tab member 23 is adhered to both the breathable sheet 51 and the small lid portion 3, forming a tab joint 28 at the joint part. The tab joint 28 can be achieved by methods such as ultrasonic welding or heat sealing. The breathable sheet 51 is joined (adhered or glued) to the base part 2 of the main body 50 outside the opening forming part (outside the small opening 6), and it is preferable that the bonding strength between the breathable sheet 51 and the base part 2 is weaker than that of the tab joint. It is preferable that the bonding strength between the breathable sheet 51 and the base part 2 is such that the breathable sheet 51 can be peeled off from the base part 2 of the main body 50. In this case, when the tab member 23 is lifted, the breathable sheet 51 can be peeled off from the base part 2 while lifting the small lid portion 3, thereby forming a state where the small opening 6 is exposed.

11 ELEVENTH EMBODIMENT

11-1 Configuration

The lid 201 of the eleventh embodiment is formed similarly to the seventh to ninth embodiments, except that the breathable sheet 451 is arranged on the exposed surface 272 side of the cover wall part 202 of the main body 350, as shown in FIGS. 44A to 44C. This form is referred to as the eleventh embodiment. FIGS. 44A to 44C are a plan view, a bottom view, and a cross-sectional view showing an example of the lid 201 according to the eleventh embodiment, respectively. FIGS. 44A to 44C show an example where the breathable sheet 451 is formed similarly to the lid 201 according to the sixth embodiment, except that it is arranged on the exposed surface 272 side of the cover wall part 202 of the main body 350. For the eleventh embodiment, the configuration of each part of the main body 350 is the same as in the seventh to ninth embodiments, so the explanation is omitted. The configuration in which the breathable sheet 451 is arranged on the exposed surface 272 side of the cover wall part 202 may be the same as the configuration in which the breathable sheet 51 is arranged on the exposed surface 272 side of the main body 50 in the tenth embodiment described above. In the eleventh embodiment, as shown below, the configurations of the first and second modifications of the tenth embodiment may be applied. The cases where the configurations of the first and second modifications of the tenth embodiment are applied to the eleventh embodiment are referred to as the first and second modifications of the eleventh embodiment, respectively.

11-2 Modifications

Modification 1

The lid 201 according to the eleventh embodiment may be configured with a through-hole as the through part 210, with the breathable sheet 451 arranged to cover the through-hole, and a surface sheet 454 provided to cover the breathable sheet 451, as shown in FIGS. 45A to 45C (Modification 1 of the eleventh embodiment). FIGS. 45A to 45C are a plan view, a bottom view, and a cross-sectional view showing an example of the lid 1 according to Modification 1 of the eleventh embodiment, respectively. In Modification 1 of the eleventh embodiment, the through-hole forming the through part 210 is circular, but this is just an example, and as in Modification 1 of the tenth embodiment, it may be rectangular, polygonal, or irregular, as shown in the examples in FIGS. 46A to 46C. The examples in FIGS. 46A to 46C show cases where the breathable sheet 451, the surface sheet 454, and the through part 10 are all rectangular.

Modification 2

The lid 201 according to the eleventh embodiment may have an opening forming part in the lid region corresponding part 355B, with the breathable sheet 451 provided to cover the opening forming part, as shown in FIGS. 47A to 47C (Modification 2 of the eleventh embodiment). The opening forming part may be configured similarly to the opening forming part described in Modification 2 of the eleventh embodiment. That is, the opening forming part includes a base part 402 with a small opening 406 having a smaller opening area than the opening 502 of the container 501, a small lid part 403 for opening and closing the small opening 406, and a hinge part 404 connecting the base part 402 and the small lid part 403, with the small lid part 403 configured to be rotatable relative to the base part 402 about the hinge part 404. The small opening 406, base part 402, small lid part 403, and hinge part 404 are configured similarly to the small opening 6, base part 2, small lid part 3, and hinge part 4 described in the second embodiment and also shown in the tenth embodiment. The breathable sheet 451 may be configured similarly to the breathable sheet 51 shown in Modification 2 of the tenth embodiment. In the examples in FIGS. 43A to 43C, a tab member 423 is provided on the surface of the breathable sheet 451. The tab member 423 may be configured similarly to the tab member 23 shown in the second embodiment and the tenth embodiment, etc.

12 APPLICATION EXAMPLES

Example 1

The lid 1 described in the first embodiment can be used for a container with a lid 150, as shown in FIGS. 4A and 4B. FIG. 4A is a perspective view showing an example where the lid 1 is joined to the edge 103 forming the outer periphery of the opening 102 of the container 101 with an opening 102 formed at the top end, thereby bringing the container 101 and the lid 1 into contact (contacting the edge 103 with the opposite surface part). FIG. 4B is a cross-sectional view schematically showing the state of the C-C line longitudinal section of FIG. 4A. The explanation of the container with a lid 150 continues using FIGS. 4A and 4B.

(Container with Lid)

The container with a lid 150 has a joint 151 where the container 101 and the lid 1 are joined, and the area of the lid 1 forming the joint 151 becomes the joint region R. The method of joining the lid 1 and the container 101 is not particularly limited and can be appropriately used with joining methods such as crimping or heat fusion (heat sealing). Below, the case where the lid 1 according to the first embodiment is used for the container with a lid 150 is described as an example.

The container 101 has a cylindrical side wall 104 and a bottom 107 that widen upward (taper downward), forming a space 105 inside, and an opening 102 at the top end (top end of the side wall 104) of the container body 110. Not shown, but the opening 102 of the container 101 is formed in a circular shape. However, the container 101 shown here is just an example and does not limit the configuration of the container 101. For example, the container 101 may have the opening 102 formed in a rectangular shape. The container 101 may be any that can cover the opening 102 with the lid 1. Also, what is stored inside the container 101 (space 105) is not particularly limited and can include, for example, liquids, solids, or combinations thereof.

In the container 101 shown in FIG. 4A, etc., the edge 103 forming (surrounding) the opening 102 has a flange part. The flange part formed on the edge 103 may be a curl part 108 where the member forming the container body 110 is wound outward, or it may be formed as a part extending outward on a plane (flange part).

Also, the lid 1 may be combined with the container 101 having the opening 102.

Example 2

The lid 201 according to the seventh embodiment can be used for a container with a lid 500, as shown in FIG. 37, for example. FIG. 37 is a cross-sectional view showing an example where the lid 201 according to the seventh embodiment is fitted to the edge 503 forming the outer periphery of the opening 502 of the container 501 with an opening 502 formed at the top end, thereby bringing the container 501 and the lid 201 into contact (contacting the edge 503 with the part of the cover wall part 202). The container 501 is configured similarly to the container 101 of the first example, having a cylindrical side wall 504 and a bottom 507 that widen upward (taper downward), forming a space 505 inside, and an opening 502 at the top end (top end of the side wall 504) of the container body 510.

The container with a lid 500 can be obtained by fitting the lid 201 to the edge 503 to cover the opening 502 of the container 501. In the example of FIG. 37, the lid 201 is externally fitted to the container 501, with the inner peripheral surface 203A of the side wall part 203 of the lid 201 facing the outer peripheral surface part 511 side of the container 501.

Also, the lid 201 according to the seventh embodiment may be combined with the container 501 having the opening 502.

What is shown in (Example 1) of [5 Application Examples] above is not limited to the case where the lid 1 according to the first embodiment is used. The second to sixth embodiments and the tenth embodiment can also be used for the container with a lid 150 joined to the container 101 similarly to the lid 1 according to the first embodiment (not shown).

What is shown in (Example 2) of [5 Application Examples] above is not limited to the case where the lid 201 according to the seventh embodiment is used. The eighth to ninth embodiments and the eleventh embodiment can also be used for the container with a lid 500 joined to the container 501 similarly to the lid 201 according to the seventh embodiment (not shown).

As described so far, the lid 1 according to the present invention can be applied to many such forms of lids 1, 201. It is also possible to apply it to forms of lids 1, 201 other than those described above. The lid according to the present invention has been described in detail above, but the above is merely an illustration of the lid according to the present invention and is not limited thereto. Therefore, appropriate changes may be made without departing from the spirit of the present invention. Also, the configuration of the lid described above may be used independently for each example of the lid configuration, or may be applied by appropriately combining the configurations of the lids in each example.

Based on the above description of this specification, the present invention may adopt the configurations shown in [E1] to [E59] below.

[E1]

A lid comprising a body formed to be in contact with a container having an opening and an edge that forms an outer periphery of the opening, at least one breathable sheet with water repellency, wherein the body has a contact region corresponding part corresponding to the region contacted by the container along the peripheral edge of the container, and a lid region corresponding part configured on an inner part surrounded by the contact region corresponding part, wherein the lid region corresponding part has a penetration part, and at least a part of at least one of the breathable sheets faces at least a part of the surface of the lid region corresponding part.

[E2]

The lid according to [E1], wherein the breathable sheet is horizontally provided with respect to an opposite surface to the container in the lid region corresponding part.

[E3]

The lid according to [E1] or [E2], wherein a surface roughness of the breathable sheet is a greater than that of at least a part of the lid region corresponding part.

[E4]

The lid according to any one of [E1] to [E3], wherein there is a gap between the breathable sheet and the lid region corresponding part.

[E5]

The lid according to any one of [E1] to [E4], wherein the breathable sheet is a nonwoven fabric sheet.

[E6]

The lid according to claim [E5], wherein the fibers constituting the nonwoven fabric sheet have pulp fibers.

[E7]

The lid according to any one of [E1] to [E6], wherein the breathable sheet is a fiber sheet treated with a water-repellent treatment.

[E8]

The lid according to any one of [E1] to [E7], wherein multiple breathable sheets are provided, and multiple breathable sheets are laminated.

[E9]

The lid according to any one of [E1] to [E8], wherein the breathable sheets are provided in a plurality, the plurality of breathable sheets have overlapping portions in the lid region corresponding part, and the plurality of breathable sheets are provided in positions offset from each other.

[E10]

The lid according to any one of [E1] to [E9], wherein a notch portion is formed in the breathable sheet to overlap with at least a part of the position corresponding to the penetration part.

[E11]

The lid according to [E10], wherein the notch portion is formed in a straight line.

[E12]

The lid according to any one of [E1] to [E11], wherein the breathable sheet is provided to cover at least a part of the penetration part.

[E13]

The lid according to any one of [E1] to [E12], wherein the breathable sheet is partially joined directly or indirectly to the lid region corresponding part.

[E14]

The lid according to any one of [E1] to [E13], wherein the breathable sheet further covers at least a part of the contact region corresponding part.

[E15]

The lid according to any one of [E1] to [E14], wherein an insertion port is provided in the lid region corresponding part, the penetration part forms the insertion port.

[E16]

The lid according to any one of [E1] to [E15], wherein multiple penetration parts are provided, an insertion port is provided in the lid region corresponding part, in the insertion port, a weakened part guiding the division position in the lid region corresponding part is formed, the weakened part has multiple penetration parts and at least one continuous part formed between at least two of the penetration parts.

[E17]

The lid according to claim [E16], wherein the weakened part forms multiple penetration parts radially around the continuous part.

[E18]

The lid according to any one of [E1] to [E17], wherein the penetration part is formed in a slit shape.

[E19]

The lid according to any one of [E1] to [E18], wherein at least the lid region corresponding part and the contact region corresponding part are formed of paper-based material.

[E20]

The lid according to any one of [E1] to [E19], wherein the joint between the breathable sheet and the lid region corresponding part is an ultrasonic welding part.

[E21]

The lid according to any one of [E1] to [E20], wherein the breathable sheet is configured such that when stress is applied to peel the center of the breathable sheet from the lid region corresponding part, the rupture of the breathable sheet occurs before the destruction of the joint between the breathable sheet and the lid region corresponding part.

[E22]

The lid according to any one of [E1] to [E21], wherein the breathable sheet faces the non-opposite surface of the container among the lid region corresponding parts.

[E23]

The lid according to any one of [E1] to [E22], wherein the lid region corresponding part includes a base part with a small opening having a smaller opening area than the opening of the container, a small lid part for opening and closing the small opening, and a hinge part connecting the base part and the small lid part, the small lid part is configured to be rotatable with respect to the base part around the hinge part, the penetration part is formed at the boundary position between the outer peripheral edge of the small lid part and the opening edge of the small opening.

[E24]

The lid according to [E23], wherein a knob part is provided on the upper surface side of the small lid part.

[E25]

The lid according to any one of [E1] to [E24], wherein the breathable sheet has multiple fibers.

[E26]

The lid according to any one of [E1] to [E25], wherein the breathable sheet is arranged so that it can flex in a direction away from the body from the outer peripheral edge of the breathable sheet towards the inside of the breathable sheet.

[E27]

The lid according to any one of [E1] to [E26], wherein a spacer is provided between the breathable sheet and the main body.

[E28]

The lid according to any one of [E1] to [E27], wherein a resin sheet is provided between the breathable sheet and the main body.

[E29]

A lid having a body formed to be contactable with a container having an opening and an edge forming the outer periphery of the opening, and having at least one water-repellent breathable sheet, wherein the body has a cover wall part covering the opening when the body is attached to the container and a side wall part surrounding the cover wall part, the cover wall part having a contact region corresponding part that contacts the edge of the container from above along the edge of the container, and a lid region corresponding part formed from the inside of the contact region corresponding part, the lid region corresponding part having a through portion, and at least a part of at least one of the breathable sheets faces at least a part of the area of the surface of the lid region corresponding part.

[E30]

The lid according to [E29], wherein the breathable sheet faces the opposite surface of the container among the lid region corresponding parts.

[E31]

The lid according to [E29] or [E30], wherein the breathable sheet has a greater surface roughness than at least a part of the lid region corresponding part.

[E32]

The lid according to any one of [E29] to [E31], wherein there is a gap between the breathable sheet and the lid region corresponding part.

[E33]

The lid according to any one of [E29] to [E32], wherein the breathable sheet is a nonwoven fabric sheet.

[E34]

The lid according to claim [E33], wherein the fibers constituting the nonwoven fabric sheet have pulp fibers.

[E35]

The lid according to any one of [E29] to [E34], wherein the breathable sheet is a fiber sheet subjected to water-repellent treatment.

[E36]

The lid according to any one of [E29] to [E35], wherein multiple breathable sheets are provided, multiple breathable sheets are laminated.

[E37]

The lid according to any one of [E29] to [E36], wherein multiple breathable sheets are provided, in the lid region corresponding part, multiple breathable sheets have overlapping parts and are provided at positions provided in positions offset from each other.

[E38]

The lid according to any one of [E29] to [E37], wherein a notch portion is formed in the breathable sheet to overlap with at least a part of the position corresponding to the penetration part.

[E39]

The lid according to [E38], wherein The notch portion is formed in a straight line.

[E40]

The lid according to any one of [E29] to [E39], wherein the breathable sheet is provided to cover at least a part of the penetration part.

[E41]

The lid according to any one of [E29] to [E40], wherein the breathable sheet is partially joined directly or indirectly to the lid region corresponding part.

[E42]

The lid according to any one of [E29] to [E41], wherein The breathable sheet further covers at least a part of the contact region corresponding part.

[E43]

The lid according to any one of [E29] to [E42], wherein an insertion port is provided in the lid region corresponding part, The penetration part forms the insertion port.

[E44]

The lid according to any one of [E29] to [E43], wherein multiple penetration parts are provided, an insertion port is provided in the lid region corresponding part, in the insertion port, a weakened part guiding the division position in the lid region corresponding part is formed, the weakened part has multiple penetration parts and at least one continuous part formed between at least two of the penetration parts.

[E45]

The lid according to claim [E44], wherein the weakening part forms multiple penetration parts radially around the continuous part.

[E46]

The lid according to any one of [E29] to [E45], wherein The penetration part is formed in a slit shape.

[E47]

The lid according to any one of [E29] to [E46], wherein at least the lid region corresponding part and the contact region corresponding part are formed of paper-based material.

[E48]

The lid according to any one of [E29] to [E47], wherein the joint between the breathable sheet and the lid region corresponding part is an ultrasonic welding part.

[E49]

The lid according to any one of [E29] to [E48], wherein the breathable sheet is configured such that when stress is applied to peel the center of the breathable sheet from the lid region corresponding part, the rupture of the breathable sheet occurs before the destruction of the joint between the breathable sheet and the lid region corresponding part.

[E50]

The lid according to any one of [E29] to [E49], wherein the breathable sheet faces the non-opposite surface of the container among the lid region corresponding parts.

[E51]

The lid according to any one of [E29] to [E50], wherein the lid region corresponding part includes a base part with a small opening having a smaller opening area than the opening of the container, a small lid part for opening and closing the small opening, and a hinge part connecting the base part and the small lid part, the small lid part is configured to be rotatable with respect to the base part around the hinge part, the penetration part is formed at the boundary position between the outer peripheral edge of the small lid part and the opening edge of the small opening.

[E52]

The lid according to [E51], wherein a knob part is provided on the upper surface side of the small lid part.

[E53]

The lid according to any one of [E29] to [E52], wherein the breathable sheet has multiple fibers.

[E54]

The lid according to any one of [E29 to [E53], wherein the breathable sheet is arranged so that it can flex in a direction away from the body from the outer peripheral edge of the breathable sheet towards the inside of the breathable sheet.

[E55]

The lid according to any one of [E29] to [E54], wherein a spacer is provided between the breathable sheet and the main body.

[E56]

The lid according to any one of [E29] to [E55], wherein a resin sheet is provided between the breathable sheet and the main body.

[E57]

The lid according to[E29], or [E55] wherein the breathable sheet is further provided on the side wall part.

[E58]

A container with a lid, comprising:

the lid according to any one of [E1] to [E57], the container having the opening formed at the upper end, the lid is joined to the container.

[E59]

A combination of a lid and a container, comprising:

the lid according to any one of [E1] to [E57]; and the container having the opening formed at the upper end.

REFERENCE SIGNS LIST

1: Lid
2: Base part
3: Small lid part
3A: Outer peripheral edge
3B: Front edge part
4: Hinge part
5A: Joining region corresponding part
5B: Lid region corresponding part
5C: Outer region corresponding part
6: Small opening
6A: Opening edge
10: Penetration part
12: Insertion port
16: Weakened part
17: Continuous part
21: Knob part
23: Tab member
23A: One end part
23B: Other end part
24: Holding structure forming part
25: Claw part
26: Receiving part
28: Tab joint part
31: Fiber sheet
50: Body
51: Breathable sheet
52: Notch portion
53: Joint part
54: Spacer
55: Gap
56: Convex surface
57: Resin sheet
57A: Inner end
58: Sheet joint part
59: Body joint part
60: Extension part
60A: Base end
60B: Outer peripheral edge
61: Display part
62: Label part
63: Small lid part
64: Hinge part
72: Exposed surface
73: Opposite surface
74: Peripheral edge
75: Outer peripheral edge
76: Receiving part
80: Vent hole
90: In-sheet cut
101: Container
102: Opening
103: Edge part
104: Side wall
105: Space part
107: Bottom part
108: Curl part
110: Container body
111: Outer peripheral surface part
150: Container with lid
151: Joint part
201: Lid
202: Cover wall part
203: Side wall part
203A: Inner peripheral surface
203B: Outer peripheral surface
204: Bending part
205: Upper wall
206: Lower wall
208: Notch portion
210: Through part
219: Insertion port
222: Cover wall part forming member
223: Side wall part forming member
224: Concave portion
225: Protrusion
226: Protruding portion
226A: Inner surface
227: Recessed portion
228A: Inner end
228B: Outer end
230: Joining margin
231: First part
232: Second part
233: First contact wall part
234: Second contact wall part
235: Continuous part
236: Side wall upper end curl portion
237: Lower first contact wall part
238: Lower second contact wall part
239: Lower end side continuous part
250: Blank material
251: First blank material
252: Second blank material
253: Edge portions

272: Exposed surface
273: Opposite surface
274: Contact part
274A: First contact part
274B: Second contact part
350: Body
351: Breathable sheet
352: Notch portion
355A: Contact region corresponding part
355B: Lid region corresponding part
451: Breathable sheet
452: Notch portion
453: Joint part
454: Surface sheet
500: Container with lid
501: Container
502: Opening
503: Edge
CT: Center
N1: Protrusion start position
N2: Protrusion start position
R: Joint region
Rz: Maximum height
SA: Area

The invention claimed is:

1. A lid comprising
a body formed to be in contact with a container having an opening and an edge that forms an outer periphery of the opening,
at least one breathable sheet with water repellency, wherein
the body has a contact region corresponding part corresponding to a region contacted by the container along the peripheral edge of the container, and a lid region corresponding part configured on an inner part surrounded by the contact region corresponding part, wherein
the lid region corresponding part has a penetration part, and at least a part of the at least one breathable sheet faces at least a part of the surface of the lid region corresponding part.

2. The lid according to claim 1, wherein
the breathable sheet is horizontally provided with respect to an opposite surface to the container in the lid region corresponding part.

3. The lid according to claim 1, wherein
a surface roughness of the breathable sheet is a-greater than that of at least a part of the lid region corresponding part.

4. The lid according to claim 1, wherein
there is a gap between the breathable sheet and the lid region corresponding part.

5. The lid according to claim 1, wherein
the breathable sheet is a nonwoven fabric sheet.

6. The lid according to claim 5, wherein
fibers constituting the nonwoven fabric sheet have pulp fibers.

7. The lid according to claim 1, wherein
the breathable sheet is a fiber sheet treated with a water-repellent treatment.

8. The lid according to claim 1, wherein
multiple breathable sheets are provided, and
the multiple breathable sheets are laminated.

9. The lid according to claim 1, wherein
the breathable sheets are provided in a plurality, the plurality of breathable sheets have overlapping portions in the lid region corresponding part, and the plurality of breathable sheets are provided in positions offset from each other.

10. The lid according to claim 1, wherein
a notch portion is formed in the breathable sheet to overlap with at least a part of the position corresponding to the penetration part.

11. The lid according to claim 10, wherein
the notch portion is formed in a straight line.

12. The lid according to claim 1, wherein
the breathable sheet is provided to cover at least a part of the penetration part.

13. The lid according to claim 1, wherein
the breathable sheet is partially joined to the lid region corresponding part.

14. The lid according to claim 1, wherein
the breathable sheet further covers at least a part of the contact region corresponding part.

15. The lid according to claim 1, wherein
an insertion port is provided in the lid region corresponding part,
the penetration part forms the insertion port.

16. The lid according to claim 1, wherein
multiple penetration parts are provided,
an insertion port is provided in the lid region corresponding part,
in the insertion port, a weakening part guiding the division position in the lid region corresponding part is formed,
the weakening part has multiple penetration parts and at least one continuous part formed between at least two of the penetration parts.

17. The lid according to claim 16, wherein
the weakening part forms multiple penetration parts radially around the continuous part.

18. The lid according to claim 1, wherein
the penetration part is formed in a slit shape.

19. The lid according to claim 1, wherein
at least the lid region corresponding part and the contact region corresponding part are formed of paper-based material.

20. The lid according to claim 1, wherein
a joint between the breathable sheet and the lid region corresponding part is an ultrasonic welding part.

21. The lid according to claim 1, wherein
the breathable sheet is configured such that when stress is applied to peel the center of the breathable sheet from the lid region corresponding part, the rupture of the breathable sheet occurs before the destruction of the joint between the breathable sheet and the lid region corresponding part.

22. The lid according to claim 1, wherein
the breathable sheet faces a non-opposite surface of the container among the lid region corresponding parts.

23. The lid according to claim 1, wherein
the lid region corresponding part includes a base part with a small opening having a smaller opening area than the opening of the container, a small lid part for opening and closing the small opening, and a hinge part connecting the base part and the small lid part,
the small lid part is configured to be rotatable with respect to the base part around the hinge part,
the penetration part is formed at the boundary position between the outer peripheral edge of the small lid part and the opening edge of the small opening.

24. The lid according to claim 23, wherein
a knob part is provided on the upper surface side of the small lid part.

25. The lid according to claim 1, wherein the breathable sheet has multiple fibers.

26. The lid according to claim 1, wherein the breathable sheet is arranged so that it can flex in a direction away from the body from the outer peripheral edge of the breathable sheet towards the inside of the breathable sheet.

27. The lid according to claim 1, wherein the body has a cover wall part covering the opening when the body is attached to the container and a side wall part surrounding the cover wall part, the cover wall part having the contact region corresponding part.

28. The lid according to claim 27, wherein when stress is applied to peel the center of the breathable sheet from the lid region corresponding part, it is configured such that the rupture of the breathable sheet occurs before the destruction of the joint between the breathable sheet and the lid region corresponding part.

29. The lid according to claim 27, wherein the breathable sheet is further provided on the side wall part.

30. A container with a lid, comprising:

the lid according to claim 1, the container having the opening formed at the upper end, the lid is joined to the container.

31. A combination of a lid and a container, comprising:

the lid according to claim 1; and the container having the opening formed at the upper end.

* * * * *